US012612023B2

(12) United States Patent
Yang et al.

(10) Patent No.: US 12,612,023 B2
(45) Date of Patent: Apr. 28, 2026

(54) HYDRAULIC CONTROL UNIT, BRAKING SYSTEM, AND CONTROL METHOD

(71) Applicant: Shenzhen Yinwang Intelligent Technologies Co., Ltd., Shenzhen (CN)

(72) Inventors: Weimiao Yang, Shanghai (CN); Yongsheng Zhang, Shanghai (CN); Yuhao Lu, Shanghai (CN); Guangyi Wang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 434 days.

(21) Appl. No.: 17/992,384

(22) Filed: Nov. 22, 2022

(65) Prior Publication Data

US 2023/0092225 A1     Mar. 23, 2023

Related U.S. Application Data

(63) Continuation of application No. PCT/CN2020/092514, filed on May 27, 2020.

(51) Int. Cl.
B60T 13/68          (2006.01)
B60T 7/04           (2006.01)
(Continued)

(52) U.S. Cl.
CPC ............ B60T 13/686 (2013.01); B60T 7/042 (2013.01); B60T 8/4081 (2013.01); B60T 8/94 (2013.01);
(Continued)

(58) Field of Classification Search
CPC ........ B60T 7/042; B60T 13/168; B60T 13/66; B60T 13/745; B60T 13/147
See application file for complete search history.

(56) References Cited

U.S. PATENT DOCUMENTS 9,162,660 B2 * 10/2015 Koo ...................... B60T 8/4081
10,583,819 B2 * 3/2020 Kim ...................... B60T 8/4081
(Continued)

FOREIGN PATENT DOCUMENTS

CN          102781740 A      11/2012
CN          107031582 A       8/2017
(Continued)

OTHER PUBLICATIONS

WO-2016/146692-A1 (Year: 2016).*
DE-102014117727-A1 (Year: 2016).*
WO-2016-146692, Sep. 22, 2016.*

*Primary Examiner* — Thomas J Williams
(74) *Attorney, Agent, or Firm* — WOMBLE BOND DICKINSON (US) LLP

(57)          ABSTRACT

A hydraulic control unit is provided, including a hydraulic control apparatus with a bidirectional pressurization function, where the hydraulic control apparatus includes a second hydraulic chamber and a first hydraulic chamber. The second hydraulic chamber provides a braking force for a first group of wheel cylinders through a first brake line provided with a first control valve. The first hydraulic chamber provides a braking force for a second group of wheel cylinders through a second brake line provided with a second control valve.

19 Claims, 13 Drawing Sheets

(51) Int. Cl.
  *B60T 8/40*        (2006.01)
  *B60T 8/94*        (2006.01)
  *B60T 13/16*       (2006.01)
  *B60T 13/66*       (2006.01)
  *B60T 13/74*       (2006.01)

(52) U.S. Cl.
  CPC ............ *B60T 13/168* (2013.01); *B60T 13/66*
     (2013.01); *B60T 13/662* (2013.01); *B60T*
     *13/745* (2013.01); *B60T 2270/402* (2013.01)

(56)          References Cited

U.S. PATENT DOCUMENTS

| | | | | |
|---|---|---|---|---|
| 2010/0259096 A1* | 10/2010 | Rieth | .................... | B60T 8/4081 |
| | | | | 303/116.1 |
| 2016/0159332 A1 | 6/2016 | Yang et al. | | |
| 2016/0311422 A1* | 10/2016 | van Zanten | ......... | G01M 3/2869 |
| 2017/0158180 A1* | 6/2017 | Kim | ...................... | B60T 13/146 |
| 2017/0210369 A1* | 7/2017 | Lim | ........................ | B60T 13/04 |
| 2017/0232948 A1* | 8/2017 | Leiber | ................... | B60T 13/146 |
| | | | | 303/11 |
| 2018/0050670 A1* | 2/2018 | Feigel | ................... | B60T 13/662 |
| 2018/0111594 A1 | 4/2018 | Kim et al. | | |
| 2018/0339690 A1 | 11/2018 | Kim et al. | | |
| 2018/0339692 A1 | 11/2018 | Jeong | | |
| 2019/0092300 A1 | 3/2019 | Jeong et al. | | |
| 2019/0092301 A1 | 3/2019 | Jeong et al. | | |
| 2019/0100186 A1* | 4/2019 | Jeong | .................... | B60T 13/145 |
| 2019/0100187 A1* | 4/2019 | Jeong | ...................... | B60T 7/042 |
| 2023/0071109 A1* | 3/2023 | Zhang | .................... | B60T 11/20 |
| 2023/0077277 A1* | 3/2023 | Yang | .................... | B60T 8/4081 |
| 2023/0092225 A1* | 3/2023 | Yang | ...................... | B60T 7/042 |
| | | | | 303/6.01 |

FOREIGN PATENT DOCUMENTS

| | | | | |
|---|---|---|---|---|
| CN | 108773369 A | 11/2018 | | |
| CN | 108791254 A | 11/2018 | | |
| CN | 108928333 A | 12/2018 | | |
| CN | 108928334 A | 12/2018 | | |
| CN | 109455174 A | 3/2019 | | |
| CN | 109562749 A | 4/2019 | | |
| CN | 109572650 A | 4/2019 | | |
| CN | 109760656 A | 5/2019 | | |
| CN | 110116718 A | 8/2019 | | |
| CN | 110155012 A | 8/2019 | | |
| CN | 110682900 A | 1/2020 | | |
| CN | 110758365 A | 2/2020 | | |
| DE | 102014117726 A1 * | 6/2016 | ........... | B60T 13/745 |
| DE | 102014117727 A1 * | 6/2016 | ........... | B60T 13/745 |
| EP | 4147928 A1 | 3/2023 | | |
| KR | 20190023827 A | 3/2019 | | |
| WO | 2012073353 A1 | 6/2012 | | |
| WO | WO-2016146692 A1 * | 9/2016 | ............... | B60T 1/10 |

* cited by examiner (a)                                                    (b)

1410

A controller generates a control instruction

1420

The controller sends the control instruction to a drive apparatus 15

Control apparatus 1500

Processing unit 1510

Sending unit 1520

Controller 1600

Memory 1610

Processor 1620

Communication interface 1630

HYDRAULIC CONTROL UNIT, BRAKING SYSTEM, AND CONTROL METHOD

CROSS-REFERENCE TO RELATED APPLICATIONS

This application is a continuation of International Application No. PCT/CN2020/092514, filed on May 27, 2020, the disclosure of which is hereby incorporated by reference in its entirety.

TECHNICAL FIELD

This application relates to the field of automobiles, and more specifically, to a hydraulic control unit, a braking system, and a control method.

BACKGROUND

A braking system of an automobile is a system for applying a braking force to wheels of the automobile, so as to exert a degree of forcible braking on the automobile. A braking system is intended to make a traveling automobile forcibly decelerate or even stop as required by a driver or a controller, or make a stopped automobile to park stably under various road conditions (for example, on a ramp), or make an automobile travel downhill at a stable speed.

As a popular braking system, an electro-hydraulic brake (EHB) usually includes a dual-circuit braking system and a distributed braking system. For the dual-circuit braking system, a hydraulic control apparatus is used to provide a braking force for a first group of wheel cylinders through a first brake line, and the hydraulic control apparatus is used to provide a braking force for a second group of wheels through a second brake line. At present, a hydraulic control apparatus with a bidirectional pressurization function is usually used as the hydraulic control apparatus in the foregoing dual-circuit braking system.

In a conventional dual-circuit braking system, in a process of forward pressurization of a hydraulic control apparatus with a bidirectional pressurization function, a second hydraulic chamber of the hydraulic control apparatus provides a braking force for a first group of wheels through a first brake line provided with a one-way valve, and the second hydraulic chamber provides a braking force for a second group of wheels through a second brake line provided with a one-way valve. In a process of reverse pressurization, a first hydraulic chamber of the hydraulic control apparatus provides a braking force for the first group of wheels through the first brake line provided with the one-way valve, and the first hydraulic chamber provides a braking force for the second group of wheels through the second brake line provided with the one-way valve.

However, the first brake line and the second brake line each control a flow direction of a brake fluid based on the one-way valve, and cannot be controlled in closing or opening. Consequently, when one of the brake lines leaks, the brake fluid in the braking system may be lost along the leaked brake line. This causes a hydraulic control unit to be incapable of pressurizing the braking system, and reduces driving safety of the vehicle.

SUMMARY

This application provides a hydraulic control unit, a braking system, and a control method, to separately pressurize any brake line in a dual circuit brake line, to improve driving safety of a vehicle.

According to a first aspect, a hydraulic control unit is provided, including: a hydraulic control apparatus 10 with a bidirectional pressurization function. The hydraulic control apparatus 10 includes a first hydraulic chamber 16 and a second hydraulic chamber 17. The second hydraulic chamber 17 is connected to a first end of a first control valve 111 in a first brake line 110, and is connected to a first end of a second control valve 121 in a second brake line 120. The first brake line 110 is configured to provide a braking force for a first group of wheel cylinders 28 and 29, and the second brake line 120 is configured to provide a braking force for a second group of wheel cylinders 26 and 27. The first control valve 111 is configured to control a connected/disconnected state of the first brake line 110, the second control valve 121 is configured to control a connected/disconnected state of the second brake line 120, and the first end of the first control valve 111 is connected to the first end of the second control valve 121 through a fourth brake line 140. The first hydraulic chamber 16 is connected to the fourth brake line 140 through a third brake line 130.

In this embodiment of this application, the second hydraulic chamber 17 or the first hydraulic chamber 16 provides the braking force for the first group of wheel cylinders 28 and 29 through the first brake line 110 provided with the first control valve 111, and provides the braking force for the second group of wheel cylinders 26 and 27 through the second brake line 120 provided with the second control valve 121. This helps implement separate pressurization on the first brake line 110 and the second brake line 120, and improve driving safety of a vehicle. This avoids that in the conventional technology, the first hydraulic chamber 16 cannot separately pressurize the first group of wheel cylinders 28 and 29 through the first brake line 110.

According to another aspect, the first hydraulic chamber 16 and the second hydraulic chamber 17 may reuse the first control valve 111 and the second control valve 121, so as to implement separate pressurization for any brake circuit in the dual-circuit braking system. This helps reduce a quantity of control valves in the dual-circuit braking system and reduces costs of the braking system.

According to still another aspect, because the fourth brake line 140 connects the first end of the first control valve 111 and the first end of the second control valve 121, pressure of a brake fluid in the first brake line 110 and the second brake line 120 may further be balanced through the fourth brake line.

In a possible embodiment, the first hydraulic chamber 16 is connected to the second brake line 120 through the third brake line 130. A connection between the third brake line 130 and the second brake line 120 is connected to the first end of the second control valve 121, and the connection is connected to the fourth brake line 140.

In this embodiment of this application, the third brake line 130 is connected to the first end of the second control valve 121, and the first end of the second control valve 121 is connected to the first end of the first control valve 111 through the fourth brake line 140. In this way, the first control valve 111 can control whether the third brake line 130 provides a braking force for the first group of wheel cylinders 28 and 29 through the first brake line 110. The second control valve 121 may control whether the third brake line 130 provides a braking force for the second group of wheel cylinders 26 and 27 through the second brake line 120. This helps reduce a quantity of control valves that cooperate with the hydraulic control apparatus 10 in the braking system.

In a possible embodiment, a closed/open state of the first control valve 111 is used to control the first hydraulic chamber 16 to provide a braking force for the second group of wheel cylinders 26 and 27 through the third brake line 130 and the second brake line 120 that are connected. A closed/open state of the second control valve 121 is used to control the first hydraulic chamber 16 to provide a braking force for the first group of wheel cylinders 28 and 29 through the third brake line 130 and the fourth brake line 140 that are connected.

In this embodiment of this application, the first control valve 111 may control whether the third brake line 130 provides a braking force for the first group of wheel cylinders 28 and 29 through the first brake line 110. The second control valve 121 may control whether the third brake line 130 provides a braking force for the second group of wheel cylinders 26 and 27 through the second brake line 120. This helps reduce a quantity of control valves that cooperate with the hydraulic control apparatus 10 in the braking system.

In a possible embodiment, the second hydraulic chamber 17 is connected to the fourth brake line 140 through a fifth brake line 150, and a third control valve 151 is disposed on the fifth brake line 150 to control connection and disconnection of the fifth brake line 150.

In this embodiment of this application, the third control valve 151 is disposed to control connection and disconnection of the fifth brake line 150. This helps control the fifth brake line 150 to be in an open state in a reverse pressurization process of the hydraulic control apparatus 10, and helps improve braking efficiency in the reverse pressurization process of the hydraulic control apparatus 10, so as to prevent a part of the brake fluid in the first hydraulic chamber 16 from flowing to the second hydraulic chamber 17 through the fifth brake line 150. The brake fluid does not flow to the first group of wheel cylinders 28 and 29 and/or the second group of wheel cylinders 26 and 27.

In a possible embodiment, the third control valve 151 is connected in parallel to a one-way valve 152. The one-way valve 152 allows a brake fluid to flow from the second hydraulic chamber 17 to the fourth brake line 140, and blocks the brake fluid from flowing from the fourth brake line 140 to the second hydraulic chamber 17.

In this embodiment of this application, the third control valve 151 is connected in parallel to the one-way valve 152. After the one-way valve 152 fails, a flow direction of the brake fluid may be controlled by controlling closing and opening of the third control valve 151. This helps improve redundancy performance of the braking system.

In a possible embodiment, the second hydraulic chamber 17 is connected to the first brake line 110 through a sixth brake line 160, and a fourth control valve 161 is disposed on the sixth brake line 160 to control connection and disconnection of the sixth brake line 160. The second hydraulic chamber 17 is connected to the second brake line 120 through a seventh brake line 170, and a fifth control valve 171 is disposed on the seventh brake line 170 to control connection and disconnection of the seventh brake line 170.

In this embodiment of this application, the second hydraulic chamber 17 is connected to the first control line 110 through the sixth control line 160, and the second hydraulic chamber 17 is further connected to the second control line 120 through the seventh control line 170. In this way, the second hydraulic chamber 17 outputs or reclaims the brake fluid through the plurality of brake lines. This helps increase transmission amount of the brake fluid.

According to another aspect, the sixth control line 160 is connected to the first brake line 110, the seventh control line 170 is connected to the second brake line 120, and the first brake line 110 is connected to the second brake line 120 through the fourth brake line 140. In this way, when the fourth control valve 161 or the fifth control valve 171 is faulty, the other control valve can still cooperate with the hydraulic control apparatus 10 to implement a bidirectional pressurization function of the hydraulic control apparatus 10. This helps improve redundancy performance of the braking system.

In a possible embodiment, the first hydraulic chamber 16 and the second hydraulic chamber 17 are formed by separating a hydraulic cylinder 11 in the hydraulic control unit by a piston 12 in the hydraulic control unit. An actuator support 14 is disposed at an end of the first hydraulic chamber 16, the actuator support 14 is used to support an actuator 13 that pushes the piston 12 to move along a piston stroke in the hydraulic cylinder 11, and a first hydraulic control port 14a is disposed on the actuator support 14. A second hydraulic control port 13a is disposed on the actuator 13, and a first end of the second hydraulic control port 13a is connected to the first hydraulic chamber 16. When the piston 12 is located at an inner dead center in the piston stroke, the first hydraulic control port 14a is connected to a second end of the second hydraulic control port 13a; or when the piston 12 is located at a position other than the inner dead center in the piston stroke, the first hydraulic control port 14a is not connected to the second end of the second hydraulic control port 13a.

In this embodiment of this application, the fluid outlet line of the first hydraulic chamber 16 is segmentally configured on the actuator support 14 corresponding to the first hydraulic control port 14a and the actuator 13 corresponding to the second hydraulic control port 13a. In this way, when the piston 12 is located at the inner dead center in the piston stroke, the first hydraulic control port 14a is connected to the second end of the second hydraulic control port 13a. When the piston 12 is located at a position other than the inner dead center in the piston stroke, the first hydraulic control port 14a is not connected to the second end of the second hydraulic control port 13a, that is, a closing/opening state between the first hydraulic control port 14a and the second hydraulic control port 13a is controlled by using a position of the piston 12 in the piston stroke, so that there is no need to specially configure a control valve for the first hydraulic chamber 16 in a conventional hydraulic control apparatus to control the connection/disconnection of the fluid outlet line of the first hydraulic chamber 16. This helps reduce a quantity of control valves used together with the hydraulic control apparatus in the hydraulic control unit, and reduce the costs in the hydraulic control unit.

It should be noted that, that a first end of the second hydraulic control port 13a is connected to the first hydraulic chamber 16 may include: when the piston 12 is located at the inner dead center in the piston stroke, the first end of the second hydraulic control port 13a is connected to the first hydraulic chamber 16; or when the piston 12 is located at all positions in the piston stroke, the first end of the second hydraulic control port 13a is connected to the first hydraulic chamber 16.

In a possible embodiment, the first hydraulic control port 14a is connected to a first fluid outlet line 180. When the piston 12 is at the inner dead center in the piston stroke, the first fluid outlet line 180 is configured to discharge a brake fluid in the first hydraulic chamber 16.

In this embodiment of this application, the fluid outlet line of the first hydraulic chamber 16 is segmentally configured on the actuator support 14 corresponding to the first hydraulic control port 14a and the actuator 13 corresponding to the second hydraulic control port 13*a*. In this way, when the piston 12 is located at the inner dead center in the piston stroke, the first hydraulic control port 14*a* is connected to the second hydraulic control port 13*a*, the brake fluid in the first hydraulic chamber 16 may be discharged to the first fluid outlet line 180 through the first hydraulic control port 14*a* and the second hydraulic control port 13*a* that are connected, and then is discharged from the first fluid outlet line 180 to the first hydraulic chamber 16. This helps reduce a quantity of control valves in the hydraulic control unit and reduce costs in the hydraulic control unit.

In a possible embodiment, a circular ring-shaped or semi-circular ring-shaped first guide groove 13*b* is disposed along an outer periphery of the actuator 13, and the first guide groove 13*b* is connected to the second end of the second hydraulic control port 13*a*. Correspondingly, when the piston is located at the inner dead center, the first guide groove 13*b* is connected to the first hydraulic control port 14*a*.

In this embodiment of this application, the circular or semi-circular first guide groove 13*b* is disposed along the outer periphery of the actuator 13, the piston 12 is located at the inner dead center when the actuator 13 rotates, and the first hydraulic control port 14*a* is connected to the second hydraulic control port 13*a* through the first guide groove 13*b*. This helps improve performance of the hydraulic control apparatus.

In a possible embodiment, a circular ring-shaped or semi-circular ring-shaped second guide groove 13*c* is disposed along an inner periphery of the actuator support 14, the second guide groove 13*c* is connected to the first hydraulic control port 14*a*, and when the piston 12 is located at the inner dead center in the piston stroke, the second guide groove 13*c* is connected to the second end of the second hydraulic control port 13*a*.

In this embodiment of this application, the circular or semi-circular second guide groove 13*c* is disposed along the inner periphery of the actuator support 14, the piston 12 is located at the inner dead center when the actuator 13 rotates, and the first hydraulic control port 14*a* is connected to the second hydraulic control port 13*a* through the second guide groove 13*c*. This helps improve performance of the hydraulic control apparatus.

In a possible embodiment, the second hydraulic control port 13*a* is disposed obliquely on the actuator 13 and penetrates through the actuator 13, and a distance between the first end of the second hydraulic control port 13*a* and the piston 12 is shorter than a distance between the second end of the second hydraulic control port 13*a* and the piston 12.

In this embodiment of this application, the distance between the first end of the second hydraulic control port 13*a* and the piston 12 is set to be shorter than the distance between the second end of the second hydraulic control port 13*a* and the piston 12, so that the second hydraulic control port 13*a* and the first hydraulic control port 14*a* that are connected can be connected to the first hydraulic chamber 16.

In a possible embodiment, when the piston 12 is located at the inner dead center, the actuator support 14 is spaced apart from the second hydraulic control port 13*a*.

In this embodiment of this application, when the piston 12 is located at the inner dead center, the actuator support 14 is spaced apart from the second hydraulic control port 13*a*, to prevent the actuator support 14 from blocking the second hydraulic control port 13*a*. This helps the brake fluid flow into the second hydraulic control port 13*a*, and improves depressurization efficiency of the hydraulic control apparatus.

According to a second aspect, a braking system is provided, including a first group of wheel cylinders 28 and 29, a second group of wheel cylinders 26 and 27, and a hydraulic control unit according to any embodiment of the first aspect. The hydraulic control unit provides a braking force for the first group of wheel cylinders 28 and 29 and/or the second group of wheel cylinders 26 and 27.

In this embodiment of this application, the second hydraulic chamber 17 or the first hydraulic chamber 16 provides the braking force for the first group of wheel cylinders 28 and 29 through the first brake line 110 provided with the first control valve 111, and provides the braking force for the second group of wheel cylinders 26 and 27 through the second brake line 120 provided with the second control valve 121. This helps implement separate pressurization on the first brake line 110 and the second brake line 120, and improve driving safety of a vehicle. This avoids that in the conventional technology, the first hydraulic chamber 16 cannot separately pressurize the first group of wheel cylinders 28 and 29 through the first brake line 110.

According to another aspect, the first hydraulic chamber 16 and the second hydraulic chamber 17 may reuse the first control valve 111 and the second control valve 121, so as to implement separate pressurization for any brake circuit in the dual-circuit braking system. This helps reduce a quantity of control valves in the dual-circuit braking system and reduces costs of the braking system.

According to still another aspect, because the fourth brake line 140 connects the first end of the first control valve 111 and the first end of the second control valve 121, pressure of a brake fluid in the first brake line 110 and the second brake line 120 may further be balanced through the fourth brake line.

In a possible embodiment, the braking system further includes a drive apparatus 15. The drive apparatus 15 drives a piston 12 in a hydraulic control apparatus 10 to move along an inner wall of a hydraulic cylinder 11 of the hydraulic control unit to form a piston stroke.

In a possible embodiment, a first hydraulic control port 14*a* is connected to a first fluid outlet line 180, and when the piston 12 is at an inner dead center of the piston stroke, a brake fluid in the first group of wheel cylinders 28 and 29 and/or the second group of wheel cylinders 26 and 27 flows to the first fluid outlet line 180 through the first hydraulic control port 14*a* and a second end of a second hydraulic control port 13*a* that are connected, and is discharged to a fluid reservoir 30 through the first fluid outlet line 180.

According to a third aspect, a control method for a braking system. The braking system includes a hydraulic control apparatus 10 with a bidirectional pressurization function. The hydraulic control apparatus 10 includes a piston 12, a hydraulic cylinder 11, and an actuator 13, and the piston 12 separates the hydraulic cylinder 11 into a first hydraulic chamber 16 and a second hydraulic chamber 17. The second hydraulic chamber 17 is connected to a first end of a first control valve 111 in a first brake line 110, and is connected to a first end of a second control valve 121 in a second brake line 120. The first brake line 110 is configured to provide a braking force for a first group of wheel cylinders 28 and 29, and the second brake line 120 is configured to provide a braking force for a second group of wheel cylinders 26 and 27. The first control valve 111 is configured to control a connected/disconnected state of the first brake line 110, the second control valve 121 is configured to control a connected/disconnected state of the second brake line 120, and the first end of the first control valve 111 is connected to the first end of the second control valve 121 through a fourth brake line 140. The first hydraulic chamber 16 is connected to the fourth brake line 140 through a third brake line 130. The control method includes: a controller generates a control instruction, where the control instruction is used to control a drive apparatus 15 in the braking system. The controller sends the control instruction to the drive apparatus 15, to control the drive apparatus 15 to drive the piston 12 to move along an inner wall of the hydraulic cylinder 11, to increase or decrease pressure of a brake fluid in the first group of wheel cylinders 28 and 29 and/or the second group of wheel cylinders 26 and 27.

In this embodiment of this application, the second hydraulic chamber 17 or the first hydraulic chamber 16 provides the braking force for the first group of wheel cylinders 28 and 29 through the first brake line 110 provided with the first control valve 111, and provides the braking force for the second group of wheel cylinders 26 and 27 through the second brake line 120 provided with the second control valve 121. This helps implement separate pressurization on the first brake line 110 and the second brake line 120, and improve driving safety of a vehicle. This avoids that in the conventional technology, the first hydraulic chamber 16 cannot separately pressurize the first group of wheel cylinders 28 and 29 through the first brake line 110.

According to another aspect, the first hydraulic chamber 16 and the second hydraulic chamber 17 may reuse the first control valve 111 and the second control valve 121, so as to implement separate pressurization for any brake circuit in the dual-circuit braking system. This helps reduce a quantity of control valves in the dual-circuit braking system and reduces costs of the braking system.

According to still another aspect, because the fourth brake line 140 connects the first end of the first control valve 111 and the first end of the second control valve 121, pressure of a brake fluid in the first brake line 110 and the second brake line 120 may further be balanced through the fourth brake line.

In a possible embodiment, the second hydraulic chamber 17 is connected to the fourth brake line 140 through a fifth brake line 150, and the fifth brake line 150 is provided with a third control valve 151 to control connection and disconnection of the fifth brake line 150. That the controller sends the control instruction to the drive apparatus 15 includes: The controller sends the control instruction to the drive apparatus 15, where the control instruction is used to control the drive apparatus 15 to drive the piston 12 to compress a volume of the second hydraulic chamber 17.

In this embodiment of this application, when the hydraulic control apparatus 10 performs forward pressurization, the third control valve 151 is in a closed state. In this way, when the controller drives, by using the drive apparatus 15, the piston 12 to compress the volume of the second hydraulic chamber 17, the brake fluid in the second hydraulic chamber 17 may flow out of the second hydraulic chamber 17 through the fifth brake line 150.

In a possible embodiment, in a process in which the hydraulic control apparatus 10 performs reverse pressurization, and when the third control valve 151 is in an open state, that the controller sends the control instruction to the drive apparatus 15 includes: The controller sends the control instruction to the drive apparatus 15, where the control instruction is used to control the drive apparatus 15 to drive the piston 12 to compress a volume of the first hydraulic chamber 16.

In this embodiment of this application, when the hydraulic control apparatus 10 performs reverse pressurization, the third control valve 151 is in an open state. In this way, when the controller drives, by using the drive apparatus 15, the piston 12 to compress the volume of the first hydraulic chamber 16, the brake fluid in the first hydraulic chamber 16 does not flow to the second hydraulic chamber 17 through the third brake line 130.

In a possible embodiment, the third control valve 151 is connected in parallel to a one-way valve 152. The one-way valve 152 allows the brake fluid to flow from the second hydraulic chamber 17 to the fourth brake line 140, and blocks the brake fluid from flowing from the fourth brake line 140 to the second hydraulic chamber 17. The method further includes: in a process in which the one-way valve 152 is faulty and the hydraulic control apparatus 10 performs forward pressurization, the controller controls the third control valve 151 to be in the closed state, so that the second hydraulic chamber 17 provides a braking force for the first group of wheel cylinders 28 and 29 and/or the second group of wheel cylinders 26 and 27 through the fifth brake line 150.

In this embodiment of this application, the third control valve 151 is connected in parallel to the one-way valve 152. After the one-way valve 152 is faulty, a flow direction of the brake fluid may be controlled by controlling closing and opening of the third control valve 151. This helps improve redundancy performance of the braking system.

In a possible embodiment, the second hydraulic chamber 17 is connected to the first brake line 110 through a sixth brake line 160, and a fourth control valve 161 is disposed on the sixth brake line 160 to control connection and disconnection of the sixth brake line 160. The second hydraulic chamber 17 is connected to the second brake line 120 through a seventh brake line 170, and a fifth control valve 171 is disposed on the seventh brake line 170 to control connection and disconnection of the seventh brake line 170. In a process in which the hydraulic control apparatus 10 performs forward pressurization, the first control valve 111, the second control valve 121, the fourth control valve 161, and the fifth control valve 171 are in a closed state. That the controller sends the control instruction to the drive apparatus 15 includes: The controller sends the control instruction to the drive apparatus 15, where the control instruction is used to control the drive apparatus 15 to drive the piston 12 to compress a volume of the second hydraulic chamber 17.

In this embodiment of this application, in the process in which the hydraulic control apparatus 10 performs forward pressurization, the first control valve 111, the second control valve 121, the fourth control valve 161, and the fifth control valve 171 are in the closed state. In this way, the brake fluid in the second hydraulic chamber 17 may flow to the first brake line 110 and the second brake line 120 through the sixth brake line 160 and the seventh brake line 170. This helps improve efficiency of outputting the brake fluid through the second hydraulic chamber 17.

In a possible embodiment, when the fourth control valve 161 has a jamming fault, the first control valve 111, the second control valve 121, and the fifth control valve 171 are in a closed state. That the controller sends the control instruction to the drive apparatus 15 includes: The controller sends the control instruction to the drive apparatus 15, where the control instruction is used to control the drive apparatus 15 to drive the piston 12 to compress the volume of the second hydraulic chamber 17.

In this embodiment of this application, when the fourth control valve 161 has a jamming fault, the first control valve 111, the second control valve 121, and the fifth control valve 171 may still cooperate with the hydraulic control apparatus 10 to implement a forward pressurization function, so as to improve redundancy performance of the braking system.

In a possible embodiment, one part of the brake fluid in the second hydraulic chamber 17 flows to the fourth brake line 140 through the seventh brake line 170, and flows to the first brake line 110 through the fourth brake line 140. The other part of the brake fluid in the second hydraulic chamber 17 flows to the second brake line 120 through the seventh brake line 170.

In this embodiment of this application, when the fourth control valve 161 has a jamming fault, one part of the brake fluid in the second hydraulic chamber 17 flows to the fourth brake line 140 through the seventh brake line 170, and flows to the first brake line 110 through the fourth brake line 140. The other part of the brake fluid in the second hydraulic chamber 17 flows to the second brake line 120 through the seventh brake line 170, to implement a forward pressurization function of the hydraulic control apparatus 10, so as to improve redundancy performance of the braking system.

In a possible embodiment, when the fifth control valve 171 has a jamming fault, the first control valve 111, the second control valve 121, and the fourth control valve 161 are in a closed state. That the controller sends the control instruction to the drive apparatus 15 includes: The controller sends the control instruction to the drive apparatus 15, where the control instruction is used to control the drive apparatus 15 to drive the piston 12 to compress the volume of the second hydraulic chamber 17.

In this embodiment of this application, when the fifth control valve 171 has a jamming fault, the first control valve 111, the second control valve 121, and the fourth control valve 161 may still cooperate with the hydraulic control apparatus 10 to implement a forward pressurization function, so as to improve redundancy performance of the braking system.

In a possible embodiment, one part of the brake fluid in the second hydraulic chamber 17 flows to the fourth brake line 140 through the sixth brake line 160, and flows to the second brake line 120 through the fourth brake line 140. The other part of the brake fluid in the second hydraulic chamber 17 flows to the first brake line 110 through the sixth brake line 160.

In this embodiment of this application, when the fifth control valve 171 has a jamming fault, one part of the brake fluid in the second hydraulic chamber 17 flows to the fourth brake line 140 through the sixth brake line 160, flows to the second brake line 120 through the fourth brake line 140, and the other part of the brake fluid in the second hydraulic chamber 17 flows to the first brake line 110 through the sixth brake line 160, to implement a forward pressurization function of the hydraulic control apparatus 10, so as to improve redundancy performance of the braking system.

In a possible embodiment, in a process in which the hydraulic control apparatus 10 performs reverse pressurization, the fourth control valve 161 and the fifth control valve 171 are in an open state, and the first control valve 111 and the second control valve 121 are in a closed state. That the controller sends the control instruction to the drive apparatus 15 includes: The controller sends the control instruction to the drive apparatus 15, where the control instruction is used to control the drive apparatus 15 to drive the piston 12 to compress a volume of the first hydraulic chamber 16.

In this embodiment of this application, in the process in which the hydraulic control apparatus 10 performs reverse pressurization, the fourth control valve 161 and the fifth control valve 171 are in the open state, and the first control valve 111 and the second control valve 121 are in the closed state, to prevent the brake fluid in the first hydraulic chamber 16 from flowing to the second hydraulic chamber through the first brake line 110 and the second brake line 12, so as to improve pressurization efficiency of the first hydraulic chamber 16.

According to a fourth aspect, an automobile is provided, including the braking system according to any one of the possible embodiments of the second aspect. The hydraulic control unit in the braking system adjusts pressure of a brake fluid in a brake line in the braking system, to control a magnitude of a braking force applied to wheel cylinders in the braking system.

According to a fifth aspect, a control apparatus is provided. The control apparatus includes a processing unit and a sending unit. The sending unit is configured to send a control instruction, and the processing unit is configured to generate the control instruction, so that the control apparatus performs the control method according to any one of possible embodiments of the third aspect.

In some embodiments, the control apparatus may be an independent controller in an automobile, or may be a chip having a control function in an automobile. The processing unit may be a processor, and the sending unit may be a communication interface.

In some embodiments, the control apparatus may further include a storage unit. The storage unit may be a memory in the controller. The memory may be a storage unit (for example, a register or a cache) in a chip, or may be a storage unit (for example, a read-only memory or a random access memory) located outside the chip in an automobile.

It should be noted that, in the foregoing controller, the memory is coupled to the processor. That the memory is coupled to the processor may be understood as that the memory is located inside the processor, or the memory is located outside the processor, to be independent of the processor.

According to a sixth aspect, a computer program product is provided, the computer program product includes computer program code, and when the computer program code is run on a computer, the computer performs the methods in the foregoing aspects.

It should be noted that all or a part of the foregoing computer program code may be stored on a first storage medium. The first storage medium may be encapsulated together with a processor, or may be encapsulated separately from a processor. This is not specifically limited in embodiments of this application.

According to a seventh aspect, a computer-readable medium is provided, the computer-readable medium stores program code, and when the computer program code is run on a computer, the computer performs the methods in the foregoing aspects.

DESCRIPTION OF EMBODIMENTS

The following describes technical solutions of this application with reference to accompanying drawings.

Figure 1:
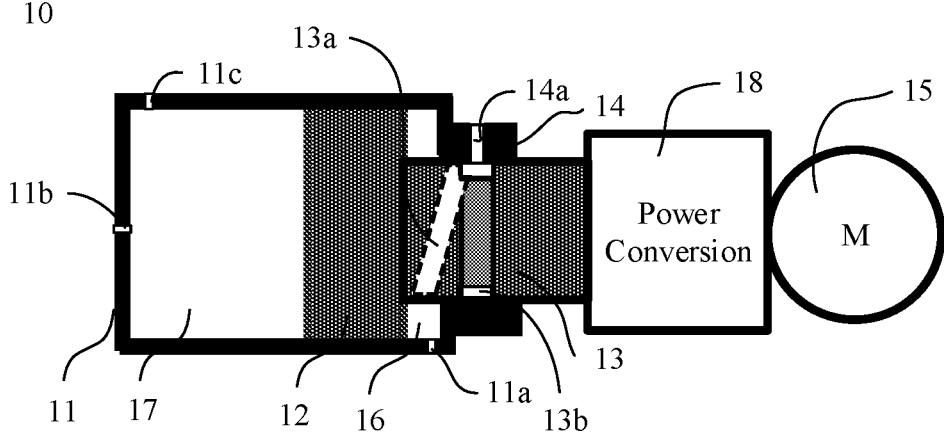
FIG. 1 is a schematic diagram of a hydraulic control apparatus according to an embodiment of this application.
Figure 2:
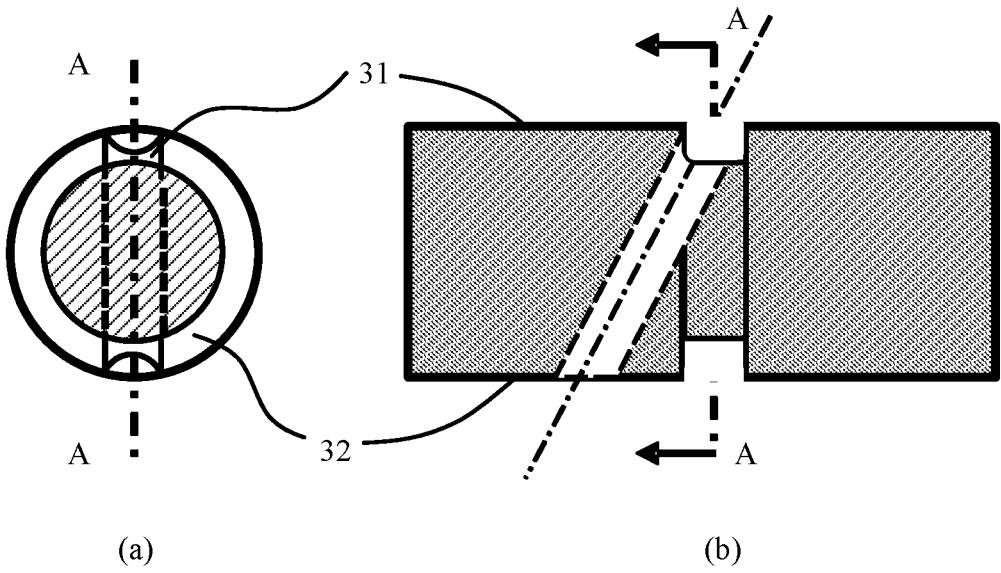
FIG. 2 is a schematic diagram of a structure of a first guide groove in a hydraulic control apparatus according to an embodiment of this application.
Figure 3:
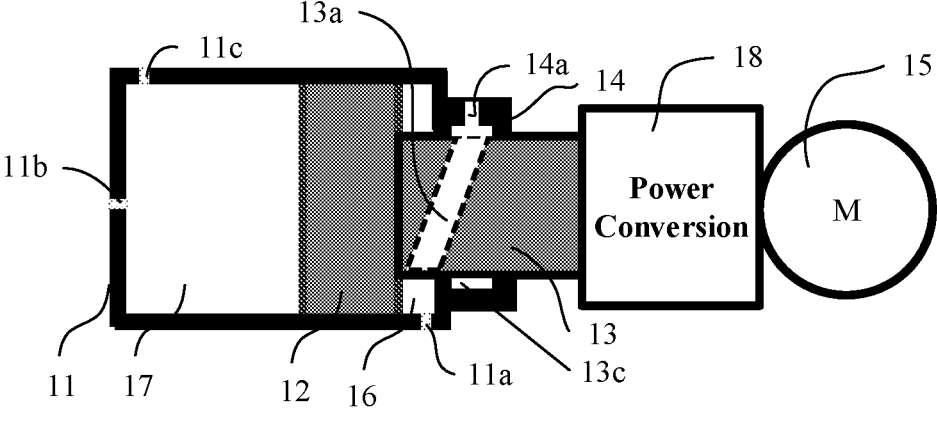
FIG. 3 is a schematic diagram of a structure of a second guide groove in a hydraulic control apparatus according to an embodiment of this application.

For ease of understanding of this application, the following first describes, with reference to FIG. 1 to FIG. 3, a hydraulic control apparatus applicable to embodiments of this application. It should be understood that the solutions in embodiments of this application are further applicable to another hydraulic control apparatus that has a bidirectional pressurization/depressurization function. This is not limited in embodiments of this application.

FIG. 1 is a schematic diagram of a hydraulic control apparatus according to an embodiment of this application. The hydraulic control apparatus 10 shown in FIG. 1 includes a hydraulic cylinder 11, a piston 12, an actuator 13, and an actuator support 14.

The piston 12 moves along an inner wall of the hydraulic cylinder 11 to form a piston stroke, and the piston 12 separates the hydraulic cylinder 11 into a first hydraulic chamber 16 and a second hydraulic chamber 17. The actuator support 14 is disposed at an end of the first hydraulic chamber 16, the actuator support 14 supports the actuator 13, and a first hydraulic control port 14a is disposed on the actuator support 14. A second hydraulic control port 13a is disposed on the actuator 13. A first end of the second hydraulic control port 13a is connected to the first hydraulic chamber 16. When the piston 12 is located at an inner dead center in the piston stroke, the first hydraulic control port 14a is connected to a second end of the second hydraulic control port 13a. When the piston 12 is located at a position other than the inner dead center in the piston stroke, the first hydraulic control port 14a is not connected to the second end of the second hydraulic control port 13a.

As shown in FIG. 1, the actuator 13 pushes the piston 12 to move along the inner wall of the hydraulic cylinder 11 to form the piston stroke. The hydraulic cylinder 11 is separated into two hydraulic chambers by the piston 12: the first hydraulic chamber 16 and the second hydraulic chamber 17. A first runner connected to the first hydraulic chamber 16 is formed of a port 11a and a port 11d. A second runner connected to the second hydraulic chamber 17 is formed of a port 11c and a port 11b.

The piston 12 is movably disposed in the hydraulic cylinder 11, one end of the actuator 13 extends into the hydraulic cylinder 11 and is connected to the piston 12, and the other end of the actuator 13 penetrates through the hydraulic cylinder 11 and is in transmission connection to the drive apparatus 15. Driven by the drive apparatus 15, the piston 12 can reciprocate in the hydraulic cylinder 11 to implement a pressurization or depressurization operation on the braking system.

During the movement of the piston 12 along the inner wall of the hydraulic cylinder 11, a position at which the piston 12 is farthest away from a drive shaft (for example, a crankshaft center) of the drive apparatus 15 is referred to as an "outer dead center". Correspondingly, a position at which the piston 12 is closest to the drive shaft (for example, the crankshaft center) of the drive apparatus 15 is referred to as an "inner dead center". A distance between the "outer dead center" and the "inner dead center" is referred to as the piston stroke.

In some embodiments, the piston 12 may be pushed by the drive apparatus 15 by driving the actuator 13. The drive apparatus 15 may be another apparatus having a driving capability, such as a motor. It should be understood that, when the drive apparatus 15 is a motor, a part of the motor outputs torque. Therefore, in order to convert the torque output by the motor into a linear motion for driving the actuator 13, the drive apparatus 15 and the actuator 13 may be further connected by using a deceleration mechanism or another power conversion mechanism 18. The power conversion mechanism may include, for example, a turbine worm assembly or a ball screw nut assembly.

The first hydraulic chamber 16 and the second hydraulic chamber 17 are separated by the piston 12, and a volume of the first hydraulic chamber 16 and a volume of the second hydraulic chamber 17 change with the movement of the piston 12. For example, when the piston 12 moves in the hydraulic cylinder 11 in a direction (also referred to as "forward movement") away from the drive apparatus 15, the volume of the first hydraulic chamber 16 is increased, and the volume of the second hydraulic chamber 17 is reduced. For another example, when the piston 12 moves in the hydraulic cylinder 11 in a direction close to the drive apparatus 15 (also referred to as "reverse movement"), the volume of the first hydraulic chamber 16 is reduced, and the volume of the second hydraulic chamber 17 is increased.

Correspondingly, in a pressurization process, the piston 12 moves forward in the hydraulic cylinder 11, which may be referred to as a "forward pressurization process". In the pressurization process, the piston 12 moves reversely in the hydraulic cylinder 11, which may be referred to as a "reverse pressurization process".

The first hydraulic control port 14a and the second hydraulic control port 13a may be considered as ports of the first runner connected to the first hydraulic chamber 16. The first hydraulic chamber 16 is connected to the second hydraulic control port 13a through the first hydraulic control port 14a. It may be understood that a brake fluid in the first hydraulic chamber 16 may be discharged from the first hydraulic chamber 16 through the first hydraulic control port 14a and the second hydraulic control port 13a that are connected.

In some embodiments, the brake fluid in the first hydraulic chamber 16 may flow in through the third hydraulic control port 11a disposed in the first hydraulic chamber. The third hydraulic control port 11a is configured to connect the first hydraulic chamber 16 and a brake line of the braking system. The brake line may be connected to a wheel cylinder of an automobile wheel, and a controller of the braking system can adjust a braking force applied to the wheel by adjusting hydraulic pressure in the brake line.

In other words, in a pressurization process, the first hydraulic chamber 16 can press the brake fluid into the brake line through the third hydraulic control port 11a, thereby increasing the braking force applied to the wheel. In a depressurization process, based on a pressure difference in the braking system, the brake fluid in the brake line may flow into the first hydraulic chamber 16 through the third hydraulic control port 11a, thereby reducing or canceling the braking force applied to the wheel.

In some embodiments, the hydraulic cylinder 11 may be further provided with a fourth hydraulic control port 11b, and the fourth hydraulic control port 11b is configured to connect the second hydraulic chamber 17 and a brake line of the braking system through a line.

Similarly, the second hydraulic chamber 17 can press the brake fluid into the brake line through the fourth hydraulic control port 11b, so as to increase the braking force applied to the wheel. Correspondingly, the brake fluid in the brake line may alternatively flow into the second hydraulic chamber 17 through the fourth hydraulic control port 11b, so as to reduce the braking force applied to the wheel.

The fourth hydraulic control port 11b may further be configured to connect the second hydraulic chamber 17 and the first hydraulic chamber 16 through a brake line. In this way, when the hydraulic control apparatus 10 performs forward pressurization, a part of the brake fluid in the second hydraulic chamber 17 is pressed into the brake line to provide a braking force for the wheel, and the other part of the brake fluid in the second hydraulic chamber 17 enters the first hydraulic chamber 16 through the fourth hydraulic control port 11b, so as to reduce a pressure difference between the second hydraulic chamber 17 and the first hydraulic chamber 16, reduce a working load of the drive apparatus 15, and prolong a service life of the motor drive apparatus.

In some embodiments, a fifth hydraulic control port 11c may be further disposed in the second hydraulic chamber 17, and the fifth hydraulic control port 11c is used for supplementing the brake fluid by the fluid reservoir 30 for the second hydraulic chamber 17, that is, the fluid reservoir 30 supplements the brake fluid into the second hydraulic chamber 17 through the fifth hydraulic control port 11c.

Specifically, the fifth hydraulic control port 11c is connected to the fluid reservoir 30 through a line. When reverse pressurization is performed, in a process in which the piston 12 moves rightwards, the brake fluid in the fluid reservoir 30 may be supplemented into the second hydraulic chamber 17 in time through the fifth hydraulic control port 11c. This reduces a pressure difference between the second hydraulic chamber 17 and the first hydraulic chamber 16.

In some embodiments, to facilitate a connection between the first hydraulic chamber 16 and the first hydraulic control port 14a, the second hydraulic control port 13a may be disposed obliquely on the actuator 13 and penetrate through the actuator 13, and a distance between a fluid inlet (also referred to as a "first end of the second hydraulic control port 13a") of the second hydraulic control port 13a and the piston 12 is shorter than a distance between a fluid outlet (also referred to as a "second end of the second hydraulic control port 13a") of the second hydraulic control port 13a and the piston 12.

That the distance between the fluid inlet of the second hydraulic control port 13a and the piston 12 is shorter than the distance between the fluid outlet of the second hydraulic control port 13a and the piston 12 may be understood as that a side on which the second hydraulic control port 13a is connected to the first hydraulic control port 14a is closer to the piston 12 than a side on which the second hydraulic control port 13a is connected to the first hydraulic chamber 16. Certainly, the second hydraulic control port 13a may alternatively be a U-shaped hole or the like. This is not limited in this application.

Usually, in order to prevent the actuator support 14 from blocking the second hydraulic control port 13a when the piston 12 is located at the inner dead center or the outer dead center, the actuator support 14 may be spaced apart from the second hydraulic control port 13a, or when the piston 12 is located at the inner dead center or the outer dead center, there may be a particular spacing between the actuator support 14 and the second hydraulic control port 13a, so that the brake fluid in the first hydraulic chamber 16 can enter or exit the second hydraulic control port 13a without being blocked. Certainly, the actuator support 14 may alternatively block a part of the second hydraulic control port 13a. This is not limited in embodiments of this application.

In this embodiment of this application, the fluid outlet line of the first hydraulic chamber 16 is segmentally configured on the actuator support 14 corresponding to the first hydraulic control port 14a and the actuator 13 corresponding to the second hydraulic control port 13a. In this way, when the piston 12 is located at the inner dead center in the piston stroke, the first hydraulic control port 14a is connected to the second end of the second hydraulic control port 13a. When the piston 12 is located at a position other than the inner dead center in the piston stroke, the first hydraulic control port 14a is not connected to the second end of the second hydraulic control port 13a, that is, a closing/opening state between the first hydraulic control port 14a and the second hydraulic control port 13a is controlled by using a position of the piston 12 in the piston stroke, so that there is no need to specially configure a control valve for the first hydraulic chamber 16 in a conventional hydraulic control apparatus to control the connection/disconnection of the fluid outlet line of the first hydraulic chamber 16. This helps reduce a quantity of control valves used together with the hydraulic control apparatus in the hydraulic control unit, and reduce the costs in the hydraulic control unit.

Usually, the actuator 13 may rotate after a long time of operation, and correspondingly, the second hydraulic control port 13a disposed on the actuator 13 may also rotate. In this case, even if the piston 12 is at the inner dead center, the second hydraulic control port 13a after rotation cannot be connected to the first hydraulic control port 14a. For example, an outlet of the second hydraulic control port 13a after rotation may be blocked by an inner wall of the actuator support 14, and correspondingly, the first hydraulic control port 14a may be blocked by an outer wall of the actuator 13.

To avoid the foregoing problem, a first guide groove 13b with a particular length may be disposed along an outer periphery of the actuator 13, and the first guide groove 13b is connected to the second hydraulic control port 13a. After the actuator 13 rotates, the first guide groove 13b can ensure that the second hydraulic control port 13a is still connected to the first hydraulic control port 14a.

In some embodiments, the first guide groove 13b may be in a circular ring shape or a semi-circular ring shape along the outer periphery of the actuator 13. Certainly, it is beneficial to reduce impact of the first guide groove 13b on mechanical strength of the actuator 13 when the first guide groove 13b is a semi-circular-ring shaped groove provided along the outer periphery of the actuator 13. It should be understood that an arc length of the semi-circular ring may be determined based on a maximum amount of rotation of the actuator 13.

The following uses a first guide groove shown in FIG. 2 as an example for description. FIG. 2 is a schematic diagram of a structure of a first guide groove in a hydraulic control apparatus according to an embodiment of this application. FIG. 2(b) is a main view of the actuator 13, and FIG. 2(a) is a cross-sectional view from a perspective along A-A in FIG. 2(b).

The first guide groove 13b may be provided along the outer periphery of the actuator 13. The guide groove is provided in a circumferential direction of the actuator 13, and the second hydraulic control port 13a is connected to the first guide groove 13b. In this way, when the piston 12 is moved to the inner dead center, the second hydraulic control port 13a is connected to the first hydraulic control port 14a through the first guide groove 13b, so that quick depressurization can be realized.

The first guide groove 13b is provided along the outer periphery of the actuator 13 and has a particular length, so that when the actuator 13 rotates, the first guide groove 13b is always connected to the first hydraulic control port 14a, and the second hydraulic control port 13a is also connected to the first guide groove 13b, that is, in this case, it can still be ensured that the second hydraulic control port 13a and the first hydraulic control port 14a are connected to each other.

As shown in FIG. 2(a), the first guide groove 13b is an annular end-to-end groove. This ensures that the first guide groove 13b and the first hydraulic control port 14a are always connected to each other, and that the first guide groove 13b and the second hydraulic control port 13a are also always connected to each other, regardless of an angle of rotation by the actuator 13. In this way, the second hydraulic control port 13a and the first hydraulic control port 14a are always connected to each other.

In some embodiments, a circular ring or semi-circular ring shaped second guide groove 13c is provided along an inner periphery of the actuator support 14, and the second guide groove 13c is connected to the first hydraulic control port 14a. The following describes a structure of the second guide groove 13c in this embodiment of this application with reference to FIG. 3.

FIG. 3 is a schematic diagram of a second guide groove in a hydraulic control apparatus according to an embodiment of this application. As shown in FIG. 3, the second guide groove 13c may be provided on the inner wall of the actuator support 14, and the second guide groove 13b is connected to the first hydraulic control port 14a.

The second guide groove 13c may be provided along the inner periphery of the actuator support 14. Because the inner periphery of the actuator support 14 always covers the outer periphery of the actuator 13, even if the actuator 13 rotates, the second guide groove 13c located on the inner periphery of the actuator support 14 can also be connected to the second hydraulic control port 13a, that is, the second hydraulic control port 13a is connected to the first hydraulic control port 14a.

In this embodiment of this application, the second guide groove 13c is provided on the actuator support 14, thereby helping reduce impact on mechanical strength of the actuator 13, and preventing the actuator 13 from breaking after a long time of working.

The foregoing describes, with reference to FIG. 1 to FIG. 3, the hydraulic control apparatus applicable to embodiments of this application. The following describes, with reference to FIG. 4, a conventional dual-circuit electro-hydraulic brake based on a bidirectional pressurization/depression hydraulic control apparatus.

Figure 4:
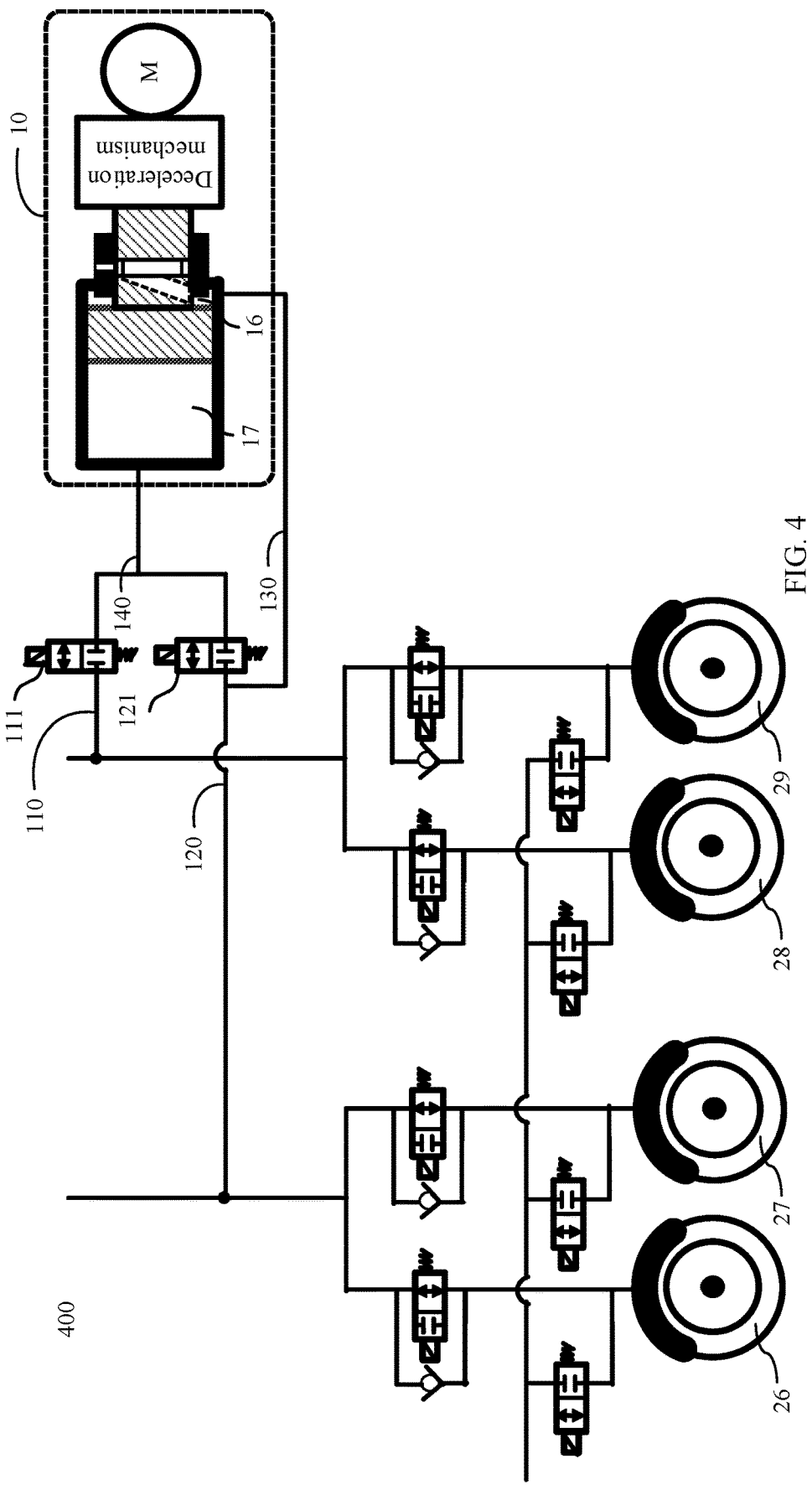
FIG. 4 is a conventional dual-circuit electro-hydraulic brake based on a bidirectional pressurization/depressurization hydraulic control apparatus.

Refer to FIG. 4, a dual-circuit braking system 400 includes the hydraulic control apparatus 10 with bidirectional pressurization/depressurization, the first hydraulic chamber 16, the second hydraulic chamber 17, the first brake line 110, the second brake line 120, a third brake line 130, a first control valve 111, and a second control valve 121.

According to the hydraulic control apparatus 10 having bidirectional pressurization/depressurization, the hydraulic control apparatus 10 includes the first hydraulic chamber 16 and the second hydraulic chamber 17.

The second hydraulic chamber 17 is separately connected to the first brake line 110 and the second brake line 120. The first brake line 110 is configured to provide a braking force for a first group of wheel cylinders 28 and 29 in the braking system. The second brake line 120 is configured to provide a braking force for a second group of wheel cylinders 26 and 27 in the braking system. The first control valve 111 is disposed in the first brake line 110 to control a connected/disconnected state of the first brake line 110. The second control valve 121 is disposed in the second brake line 120 to control a connected/disconnected state of the second brake line 120.

The first hydraulic chamber 16 is connected to the second brake line 120 through the third brake line 130 in the braking system, and a connection between the third brake line 130 and the second brake line 120 is connected to a second end of the second control valve 121. The first hydraulic chamber 16 provides a braking force for the second group of wheel cylinders 26 and 27 through the second brake line 120. When both the first control valve 111 and the second control valve 121 are in a closed state, the third brake line 130 is connected to the first brake line 110 through the second brake line 120. The first hydraulic chamber 16 provides a braking force for the first group of wheel cylinders 28 and 29 through the first brake line 110. The second end of the second control valve 121 is an end that is of the second control valve 121 and that is connected to the second group of wheel cylinders 26 and 27 in the braking system.

However, in the braking system shown in FIG. 4, because the connection between the third brake line 130 and the second brake line 120 is connected to the second end of the second control valve 121, in a reverse pressurization process, whether the first hydraulic chamber 16 provides the braking force for the first wheel cylinders 28 and 29 can be controlled only by controlling closing and opening of the first control valve 111. However, whether the first hydraulic chamber 16 provides the braking force for the second group of wheel cylinders 26 and 27 cannot be controlled by the second control valve 121. In this way, when brake fluid leakage occurs in a brake circuit (for example, the second brake line 120) that provides a braking force for the second group of wheel cylinders 26 and 27, the brake fluid flows out of the braking system from the leaked brake circuit in the reverse pressurization process. As a result, the entire braking system cannot be pressurized in the reverse pressurization process, and driving safety of a vehicle is reduced.

To avoid the foregoing problem, this application provides a new hydraulic control unit, that is, a connection between the third brake line 130 and the second brake circuit 120 is moved from the second end of the second control valve 121 to the first end of the second control valve 121. In this way, the second control valve 121 can control whether the first hydraulic chamber 16 provides a braking force for the second group of wheel cylinders 26 and 27, so that when the hydraulic control apparatus is in either a forward or reverse pressurization process, any brake circuit in the dual-circuit braking system can be pressurized separately.

Figure 5:
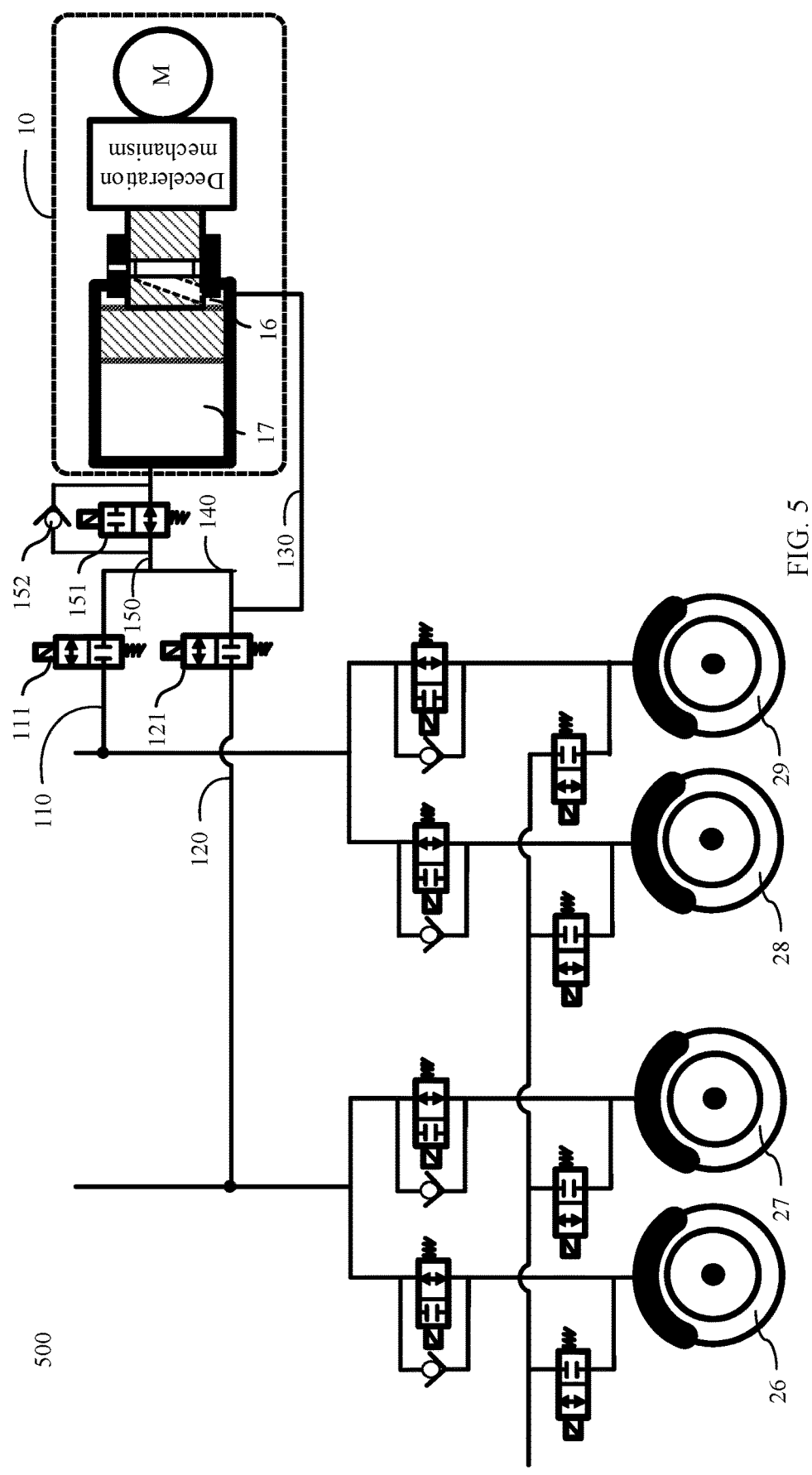
FIG. 5 is a schematic diagram of a hydraulic control unit according to an embodiment of this application.

FIG. 5 is a schematic diagram of a hydraulic control unit according to an embodiment of this application. A hydraulic control unit 500 shown in FIG. 5 includes: the hydraulic control apparatus 10 with a bidirectional pressurization function, the first brake line 110, the second brake line 120, the third brake line 130, the first control valve 111, and the second control valve 121.

According to the hydraulic control apparatus 10 with the bidirectional pressurization function, the hydraulic control apparatus 10 includes the first hydraulic chamber 16 and the second hydraulic chamber 17.

The second hydraulic chamber 17 is connected to the fourth brake line 140, and the fourth brake line 140 connects a first end of the first control valve 111 and a first end of the second control valve 121. The first control valve 111 is located in the first brake line 110 and is configured to control a connected/disconnected state of the first brake line 110. The second control valve 121 is located in the second control line 120 and is configured to control a connected/disconnected state of the second brake line 120. The first brake line 110 is configured to adjust pressure of a brake fluid in the first group of wheel cylinders 28 and 29, and the second brake line 120 is configured to adjust pressure of a brake fluid in the second group of wheel cylinders 26 and 27.

The first hydraulic chamber 16 is connected to the fourth brake line 140 through the third brake line 130.

The first end of the second control valve 121 may be understood as an end at which the brake fluid in the hydraulic control apparatus 10 flows into the second control valve 121 in a pressurization process. Correspondingly, an end at which the brake fluid in the hydraulic control apparatus 10 flows out of the second control valve 121 may be referred to as a second end of the second control valve 121.

The first end of the first control valve 111 may be understood as an end at which the brake fluid in the hydraulic control apparatus 10 flows into the first control valve 111 in a pressurization process. Correspondingly, an end at which the brake fluid in the hydraulic control apparatus 10 flows out of the first control valve 111 may be referred to as a second end of the first control valve 111.

In this embodiment of this application, the second hydraulic chamber 17 or the first hydraulic chamber 16 provides a braking force for the first group of wheel cylinders 28 and 29 through the first brake line 110 provided with the first control valve 111, and provides a braking force for the second group of wheel cylinders 26 and 27 through the second brake line 120 provided with the second control valve 121. This helps implement separate pressurization on the first brake line 110 and the second brake line 120, and improve driving safety of a vehicle. This avoids that in the conventional technology, the first hydraulic chamber 16 cannot separately pressurize the first group of wheel cylinders 28 and 29 through the first brake line 110.

According to another aspect, the first hydraulic chamber 16 and the second hydraulic chamber 17 may reuse the first control valve 111 and the second control valve 121, so as to implement separate pressurization for any brake circuit in the dual-circuit braking system. This helps reduce a quantity of control valves in the dual-circuit braking system and reduces costs of the braking system.

According to still another aspect, because the fourth brake line 140 connects the first end of the first control valve 111 and the first end of the second control valve 121, pressure of a brake fluid in the first brake line 110 and the second brake line 120 may further be balanced through the fourth brake line.

In some embodiments, the first hydraulic chamber 16 is connected to the second brake line 120 through the third brake line 130. A connection between the third brake line 130 and the second brake line 120 is connected to the first end of the second control valve 121, and the connection is connected to the fourth brake line 140.

The connection between the third brake line 130 and the second brake line 120 is connected to the first end of the second control valve 121. That the connection between the third brake line 130 and the second brake line 120 is connected to the fourth brake line 140 may be understood as that the first hydraulic chamber 16 may be connected to the second brake line 120 through the third brake line 130, and the second brake line 120 adjusts pressure of the brake fluid in the second group of wheel cylinders 26 and 27. The first hydraulic chamber 16 may be connected to the fourth brake line 140 through the third brake line 130, and then connected to the first brake line 110 through the fourth brake line 140, and the pressure of the brake fluid in the first group of wheel cylinders 28 and 29 is adjusted through the first brake line 110.

Alternatively, the first group of wheel cylinders 28 and 29 may include a wheel cylinder of a right front wheel and a wheel cylinder of a left front wheel of an automobile, and the second group of wheel cylinders 26 and 27 may include a wheel cylinder of a right rear wheel and a wheel cylinder of a left rear wheel of the automobile. In this case, the hydraulic brake unit may be understood as being arranged in an H-shaped manner in the automobile. Alternatively, the first group of wheel cylinders 28 and 29 may include a wheel cylinder of a right front wheel and a wheel cylinder of a left rear wheel of an automobile, and the second group of wheel cylinders 26 and 27 may include a wheel cylinder of a right rear wheel and a wheel cylinder of a left front wheel of the automobile. In this case, the hydraulic brake unit may be understood as being arranged in an X-shaped manner in the automobile.

As described above, the second hydraulic chamber 17 may be connected to the fourth brake line 140. In a reverse pressurization process, one part of the brake fluid in the third brake line 130 flows to the first brake line 110 through the fourth brake line 140, and the other part of the brake fluid in the third brake line 130 flows to the second hydraulic chamber 17 through the fourth brake line 140. In this way, a pressure difference between the brake fluid in the first hydraulic chamber 16 and the brake fluid in the second hydraulic chamber 17 can be reduced, so as to reduce power consumption of driving, by the drive apparatus 15, the piston 12 to move. However, because one part of the brake fluid reaches the second hydraulic chamber 17, efficiency of pressurizing the braking system by the first hydraulic control apparatus 16 may be affected.

To avoid the foregoing problem, a third control valve 151 or a one-way valve 152 may be disposed between the second hydraulic chamber 17 and the fourth brake line 140, so as to control whether the brake fluid in the third brake line 130 can flow to the second hydraulic chamber 17.

Refer to FIG. 5. The second hydraulic chamber 17 is connected to the fourth brake line 140 through the fifth brake line 150, and the third control valve 151 is disposed on the fifth brake line 150 to control connection and disconnection of the fifth brake line 150. In this way, in a reverse pressurization process, the third control valve 151 may be controlled to be in an open state to disconnect the fifth brake line 150. In this way, the brake fluid in the third brake line 130 may flow to the wheel cylinders 26 and 27, 28, and 29 through the second brake line 120 and/or the first brake line 110. Certainly, a one-way valve may also be disposed on the fifth brake line 150, so as to allow the brake fluid to flow from the second hydraulic chamber 17 to the fourth brake line 140, and block the brake fluid from flowing from the fourth brake line 140 to the second hydraulic chamber 17.

Generally, to avoid that the third control valve 151 is in the open state due to failure and the second hydraulic chamber 17 cannot provide a braking force for the braking system, the third control valve 151 and a one-way valve 152 may be disposed in parallel in the fifth brake line, or the one-way valve 152 is connected in parallel to two ends of the third control valve 151. The one-way valve 152 allows the brake fluid to flow from the second hydraulic chamber 17 to the fourth brake line 140, and blocks the brake fluid from flowing from the fourth brake line 140 to the second hydraulic chamber 17.

In the hydraulic control unit 500, when the third control valve 151 fails and is always in the open state, the hydraulic control apparatus 10 cannot depressurize the braking system, thereby limiting redundant performance of the braking system. To improve the redundancy performance of the braking system, an embodiment of this application further provides a hydraulic control unit 600. To be specific, a sixth brake line 160 and a seventh brake line 170 are disposed between the second hydraulic chamber 17 and the fourth brake line 140, to improve the redundancy performance of the braking system.

Figure 6:
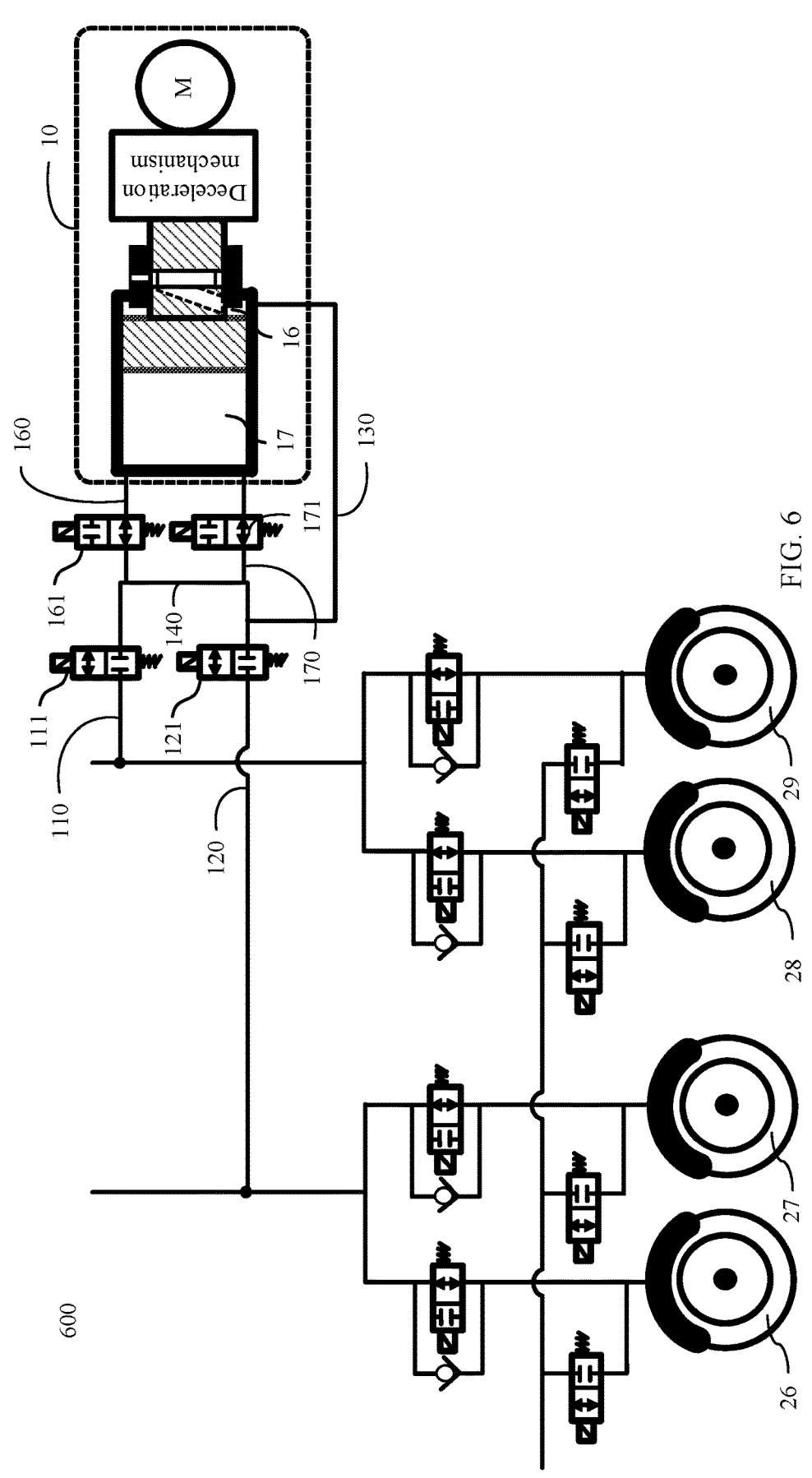
FIG. 6 is a schematic diagram of a hydraulic control unit 600 according to an embodiment of this application.

FIG. 6 is a schematic diagram of a hydraulic control unit 600 according to an embodiment of this application. It should be noted that, in the hydraulic control unit 600 shown in FIG. 6, components that have a same function as those in the hydraulic control unit 500 use a same number. For example functions of the components, refer to the foregoing descriptions. For brevity, details are not described in the following.

The second hydraulic chamber 17 is connected to the first brake line 110 through the sixth brake line 160, and a fourth control valve 161 is disposed on the sixth brake line 160 to control connection and disconnection of the sixth brake line 160. The second hydraulic chamber 17 is connected to the second brake line 120 through a seventh brake line 170, and a fifth control valve 171 is disposed on the seventh brake line 170 to control connection and disconnection of the seventh brake line 170.

In this way, when either of the fourth control valve 161 or the fifth control valve 171 is faulty, another control valve that works normally may assist the hydraulic control apparatus 10 to provide a braking force for the entire braking system or a brake circuit in the braking system. The following uses a jamming fault as an example. Another type of failure will be described in detail when a braking system is described below.

When the fourth control valve 161 or the fifth control valve 171 has a jamming fault, and is always in an open state, the fourth control valve 161 or the fifth control valve 171 that can work normally can still cooperate with the hydraulic control apparatus 10 to implement a bidirectional pressurization or depressurization function.

For example, in a case in which the fourth control valve 161 has a jamming fault, and the fifth control valve 171 works normally, to implement a forward pressurization function, the hydraulic control apparatus 10 may control the fifth control valve 171 to be in a closed state. In this way, a brake fluid in the second hydraulic chamber 17 may flow to the first brake line 110 and the second brake line 120 through the seventh brake line 170 in which the fifth control valve 171 is located, so as to provide a braking force for the entire braking system or a brake circuit in the braking system.

For another example, in a case in which the fifth control valve 171 has a jamming fault, and the fourth control valve 161 works normally, to implement a forward pressurization function, the hydraulic control apparatus 10 may control the fourth control valve 161 to be in a closed state. In this way, a brake fluid in the second hydraulic chamber 17 may flow to the first brake line 110 and the second brake line 120 through the sixth brake line 160 in which the fourth control valve 161 is located, so as to provide a braking force for the entire braking system or a brake circuit in the braking system.

In this embodiment of this application, the second hydraulic chamber 17 is connected to the first brake line 110 through the sixth brake line 160, is connected to the second brake line 120 through the seventh brake line 170, and forms a redundant brake line through the sixth brake line 160 and the seventh brake line 170, to improve redundant performance of the braking system.

In the hydraulic control unit 600, the first control valve 111 and the fourth control valve 161 together control connection and disconnection of a brake line corresponding to the first group of wheel cylinders 28 and 29. In this way, when the fourth control valve 161 is faulty, the first control valve 111 may further cooperate with the hydraulic control apparatus 10 to pressurize the entire braking system or provide a braking force for a brake circuit in the braking system. Correspondingly, the second control valve 121 and the fifth control valve 171 together control connection and disconnection of a brake line corresponding to the second group of wheel cylinders 26 and 27. In this way, when the fifth control valve 171 is faulty, the second control valve 121 may further cooperate with the hydraulic control apparatus 10 to pressurize the entire braking system, or provide a braking force for a brake circuit in the braking system.

A connection manner between the hydraulic control apparatus and the dual-circuit braking system in embodiments of this application is described above with reference to FIG. 5 and FIG. 6. A connection manner between the hydraulic control apparatus and the fluid reservoir 30 is described below with reference to FIG. 7 and FIG. 8. It should be understood that, for ease of understanding, the following describes a connection manner between the hydraulic control apparatus 10 and the fluid reservoir 30 by using the hydraulic control apparatus 10 as an example.

Connection manner 1: The second hydraulic chamber 17 is provided with a fluid inlet line 1 173 connected to the fluid reservoir 30, and the first hydraulic chamber 16 is not provided with a fluid inlet line connected to the fluid reservoir 30.

Figure 7:
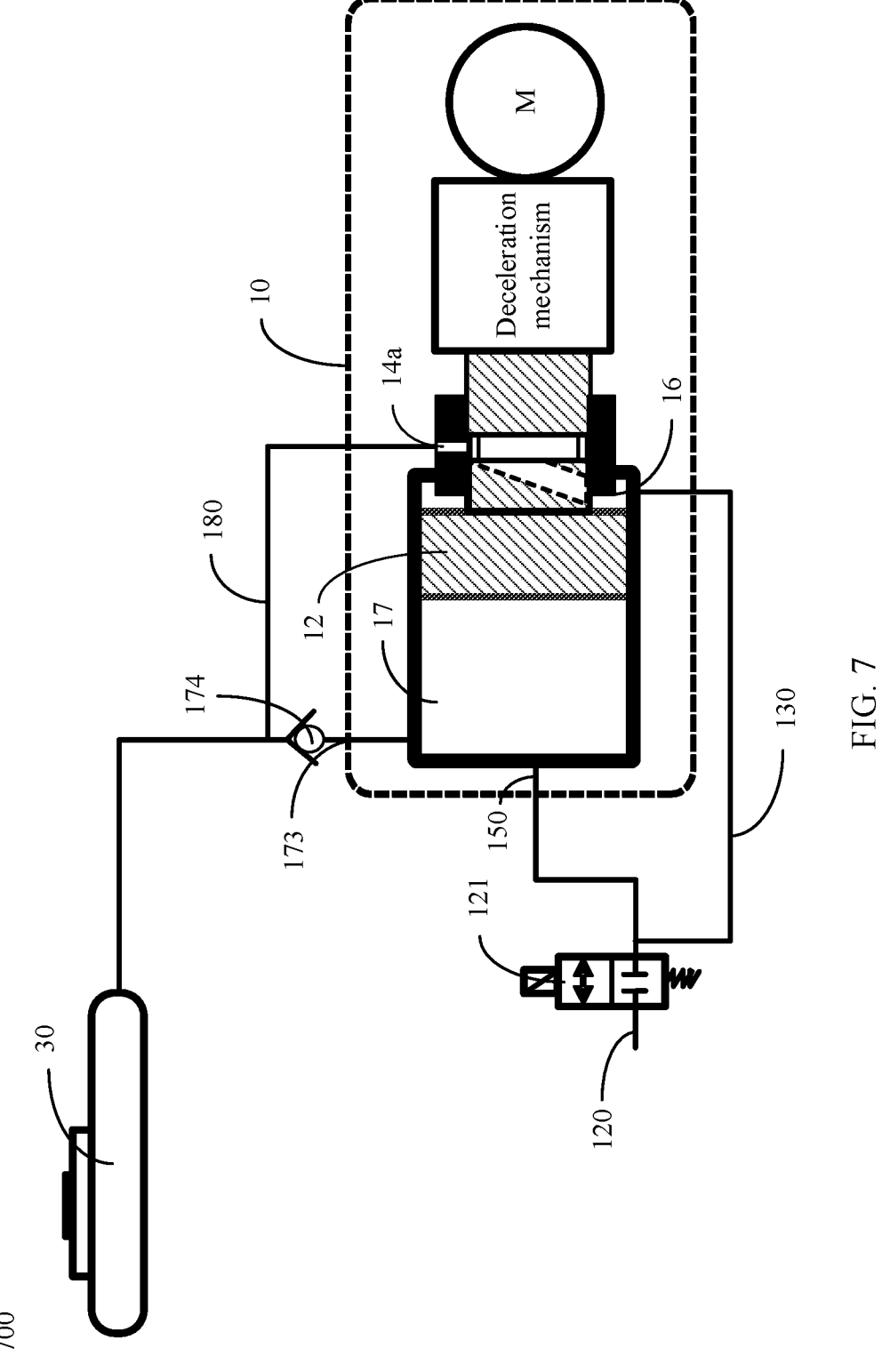
FIG. 7 is a schematic diagram of a connection manner 1 between a fluid reservoir 30 and a hydraulic control apparatus 10 according to an embodiment of this application.

FIG. 7 is a schematic diagram of a connection manner 1 between a fluid reservoir 30 and a hydraulic control apparatus 10 according to an embodiment of this application. In a hydraulic control unit 700 shown in FIG. 7, a one-way valve 174 is disposed on the fluid inlet line 1, and the one-way valve 174 allows a brake fluid in the fluid inlet line 1 to flow from the fluid reservoir 30 to the second hydraulic chamber 17. A first hydraulic control port (also referred to as a "fluid outlet") 14a in the first hydraulic chamber 16 is connected to the first fluid outlet line 180.

Correspondingly, when the second control valve 121 is in a closed state, in a forward pressurization mode of the hydraulic control apparatus 10, a part of the brake fluid in the second hydraulic chamber 17 flows into a dual-circuit braking system, and a part flows to the first hydraulic chamber 16 through the third brake line 130. That is, in the forward pressurization process, the fluid inlet line of the first hydraulic chamber 16 is the third brake line 130.

In a depressurization process, the brake fluid in the dual-circuit braking system is pumped into the second hydraulic chamber 17 as the piston 12 moves forward. After the piston 12 moves to an inner dead center, the remaining brake fluid in the dual-circuit braking system flows to the fluid reservoir 30 through the first fluid outlet line 180.

Connection manner 2: The first hydraulic chamber 16 is provided with a fluid inlet line 2 190 connected to the fluid reservoir 30, and the second hydraulic chamber 17 is provided with a fluid inlet line 1 173 connected to the fluid reservoir 30.

Figure 8:
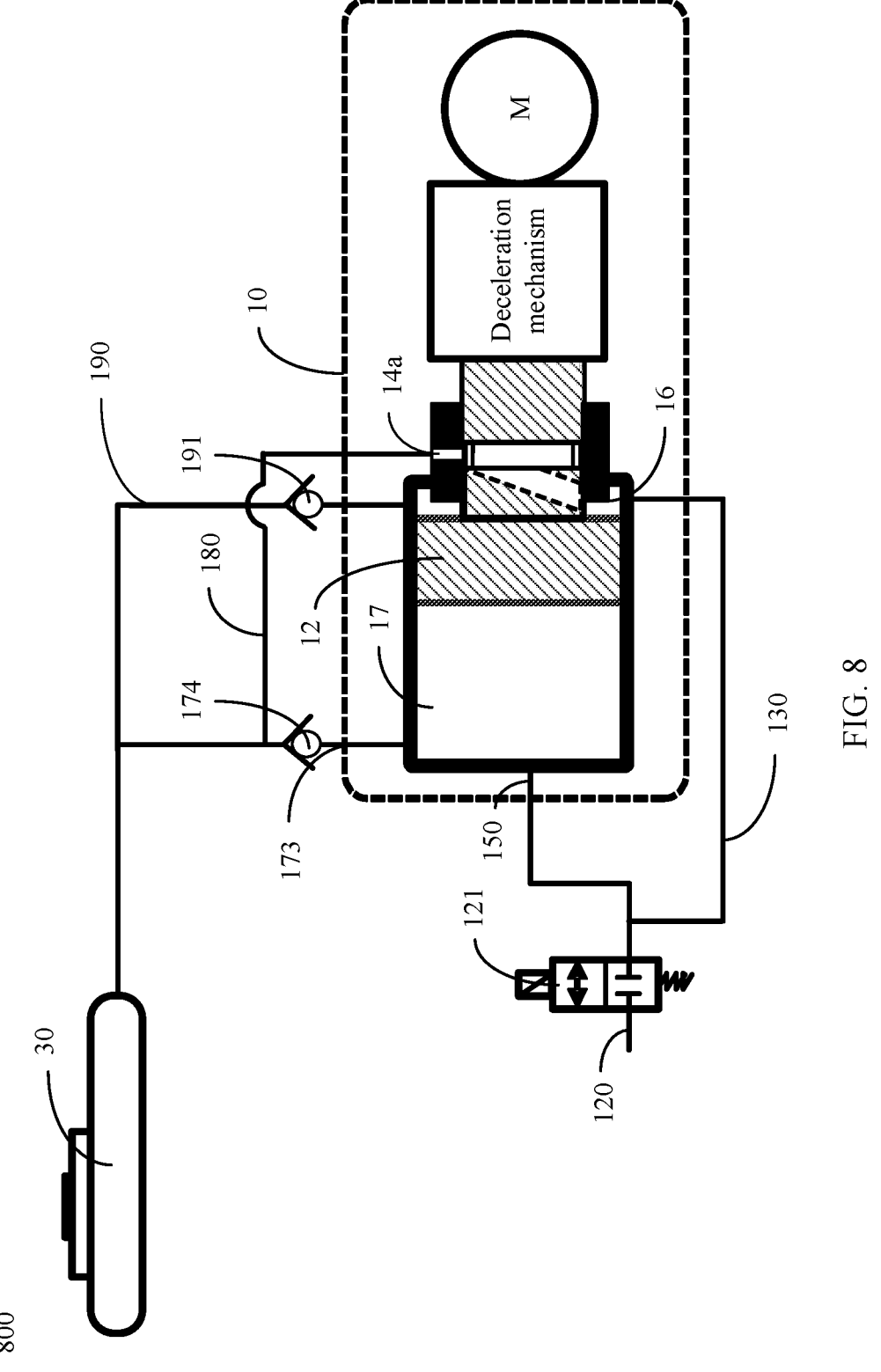
FIG. 8 is a schematic diagram of a connection manner 2 between a fluid reservoir 30 and a hydraulic control apparatus 10 according to an embodiment of this application.

FIG. 8 is a schematic diagram of a connection manner 2 between a fluid reservoir 30 and a hydraulic control apparatus 10 according to an embodiment of this application. As shown in FIG. 8, a hydraulic control unit 800 is provided with the one-way valve 174 on the fluid inlet line 1, and the one-way valve 174 allows a brake fluid in the fluid inlet line 1 to flow from the fluid reservoir 30 to the second hydraulic chamber 17. A first hydraulic control port (also referred to as a "fluid outlet") 14a in the first hydraulic chamber 16 is connected to the first fluid outlet line 180.

A one-way valve 191 is disposed on the fluid inlet line 2 190. The one-way valve 191 allows the brake fluid in the fluid inlet line 2 to flow from the fluid reservoir 30 to the first hydraulic chamber 16, and prevents the brake fluid in the fluid inlet line 2 from flowing from the first hydraulic chamber 16 to the fluid reservoir 30.

Correspondingly, when the second control valve 121 is in a closed state, in a forward pressurization mode of the hydraulic control apparatus 10, a part of the brake fluid in the second hydraulic chamber 17 flows into a dual-circuit braking system, and a part flows into the third brake line 130 through the second control valve 121, and flows into the first hydraulic chamber 16 through the third brake line 130. That is, in the forward pressurization process, the fluid inlet line of the first hydraulic chamber 16 is the third brake line 130.

In a forward depressurization process, the brake fluid in the dual-circuit braking system is pumped into the second hydraulic chamber 17 as the piston 12 moves forward. After the piston 12 moves to an inner dead center, the remaining brake fluid in the dual-circuit braking system flows to the fluid reservoir 30 through the first fluid outlet line 180.

Connection manner 3: The first hydraulic chamber 16 is provided with a brake line 910 connected to the fluid reservoir 30, and the second hydraulic chamber 17 is provided with a fluid inlet line 1 173 connected to the fluid reservoir 30. The brake line 910 may be used as a fluid inlet line or a fluid outlet line of the first hydraulic chamber 16. The hydraulic control apparatus is a conventional hydraulic control apparatus that is not provided with the first hydraulic control port 14a, the second hydraulic control port 13a, and the like.

Figure 9:
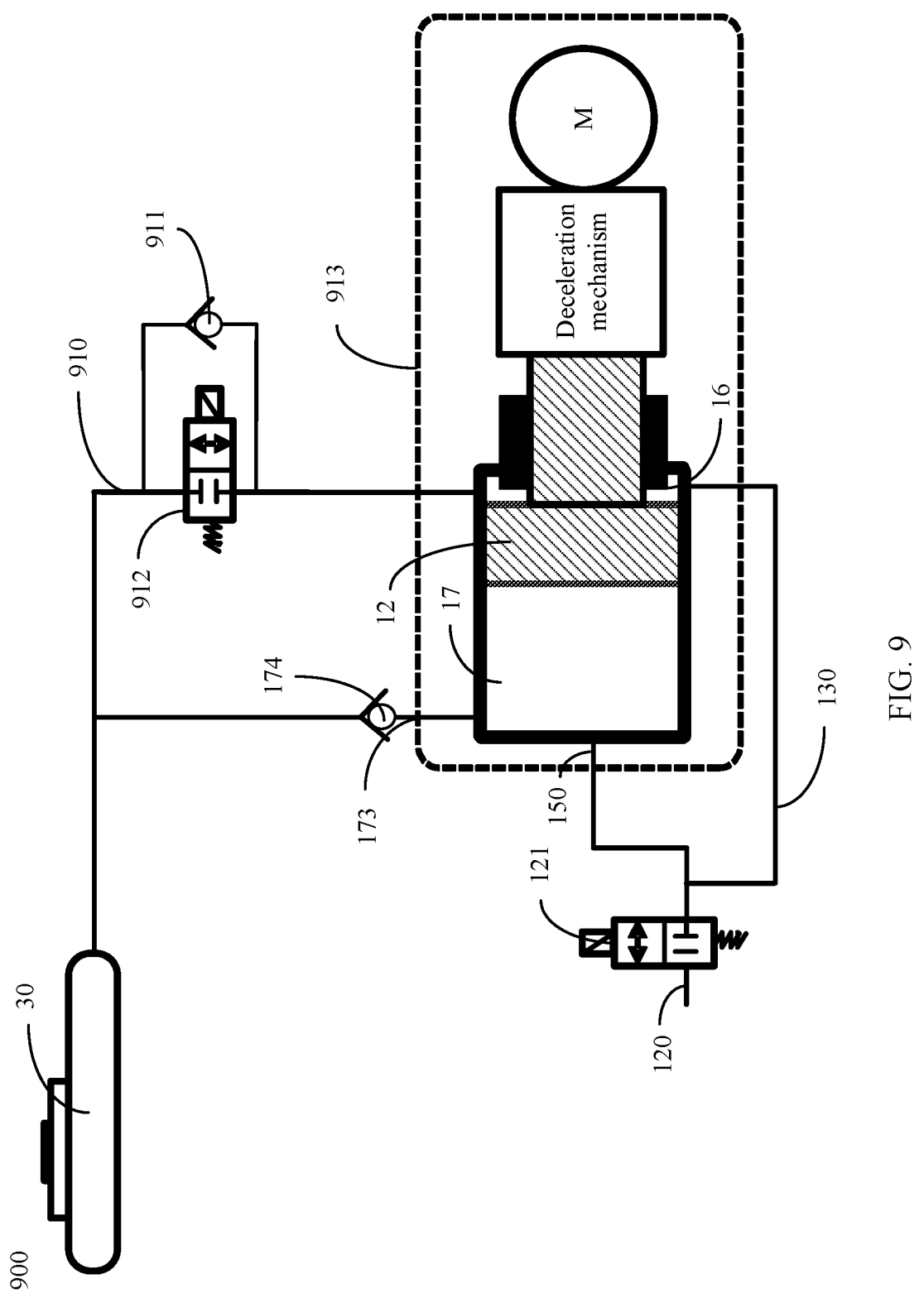
FIG. 9 is a schematic diagram of a connection manner 3 between a fluid reservoir 30 and a hydraulic control apparatus 913 according to an embodiment of this application.

FIG. 9 is a schematic diagram of a connection manner 3 between a fluid reservoir 30 and a hydraulic control apparatus 913 according to an embodiment of this application. It should be noted that a structure of another hydraulic control apparatus 913 is shown in a hydraulic control unit 900. A structure of the hydraulic control apparatus 913 is slightly different from a structure of the hydraulic control apparatus 10. However, for brevity, a type of an embodiment of a bidirectional pressurization function is not described in detail below.

As shown in FIG. 9, the hydraulic control unit 900 is provided with the one-way valve 174 on the fluid inlet line 1 173, and the one-way valve 174 allows a brake fluid in the fluid inlet line 1 to flow from the fluid reservoir 30 to the second hydraulic chamber 17.

The first hydraulic chamber 16 is connected to the fluid reservoir 30 through the brake line 910. A control valve 912 is disposed on the brake line 910 to control connection and disconnection of the brake line 910. In addition, a one-way valve 911 is connected in parallel at two ends of the control valve 912. The one-way valve 911 allows the brake fluid to flow from the fluid reservoir 30 to the first hydraulic chamber 16, and blocks the brake fluid from flowing from the first hydraulic chamber 16 to the fluid reservoir 30.

In a forward pressurization process, the control valve 912 may be controlled to be in an open state, so that the brake fluid in the fluid reservoir 30 flows to the first hydraulic chamber 16 through the one-way valve 911. This reduces a pressure difference between the brake fluid in the first hydraulic chamber 16 and the brake fluid in the second hydraulic chamber 17.

In a reverse pressurization process, the control valve 912 may be controlled to be in an open state, so that the brake fluid in the fluid reservoir 30 flows to the first hydraulic chamber 16 through the one-way valve 911, and the brake fluid is pressed into a wheel cylinder in a braking system through the first hydraulic chamber 16.

In the hydraulic control unit 900, if the one-way valve 911 fails and is always in an open state, a closed/open state of the control valve 912 may be controlled to cooperate with the hydraulic control apparatus to implement a bidirectional pressurization function. For example, when the one-way valve 911 fails and is always in the open state, in the forward pressurization process, the control valve 912 may be controlled to be in a closed state, so that the brake fluid flows from the fluid reservoir 30 to the first hydraulic chamber 16. This reduces a pressure difference between the brake fluid in the first hydraulic chamber 16 and the brake fluid in the second hydraulic chamber 17. For another example, when the one-way valve 911 fails and is always in the open state, in the reverse pressurization process, the control valve 912 may be controlled to be in a closed state, so that the brake fluid flows from the fluid reservoir 30 to the first hydraulic chamber 16, and the brake fluid is pressed into the wheel cylinder in the braking system through the first hydraulic chamber 16.

A connection manner between the hydraulic control apparatus 10 and a dual-circuit brake line, and a connection manner between the hydraulic control apparatus 10 and the fluid reservoir 30 are described above with reference to FIG. 5 to FIG. 9. The hydraulic control units 500 and 600 shown above may be arbitrarily combined with the hydraulic control units 700 to 900. The following describes redundancy solutions of the braking system in a plurality of failure cases by using an example in which the hydraulic control unit 500 is combined with the hydraulic control unit 800, the hydraulic control unit 500 is combined with the hydraulic control unit 900, the hydraulic control unit 600 is combined with the hydraulic control unit 800, and the hydraulic control unit 600 is combined with the hydraulic control unit 900.

It should be noted that in the braking system shown below, a manual braking mode triggered by a driver by stepping on a brake pedal, a brake-by-wire mode triggered by a driver by stepping on a brake pedal, and a driverless braking mode in an automatic driving scenario can also be implemented. A principle of a braking process in the foregoing manual braking mode is similar to that of a braking process in a manual braking mode in an existing braking system. For brevity, details are not described again. The following mainly describes the redundancy solutions of the braking system in a plurality of failure modes.

For ease of understanding, four common failure modes in the braking system are introduced first. In a leakage failure mode 1, brake fluid leakage occurs in the brake circuit in the braking system. In a jamming failure mode 2, one or more control valves in the braking system have a jamming fault, causing the control valve with the jamming fault to be always in the open state. In a closing failure mode 3, one or more control valves in the braking system have a closing fault, causing the control valve with the closing fault to be always in the closed state. In a composite failure mode 4, the failure mode in the braking system includes any two of the above three failure modes.

Figure 10:
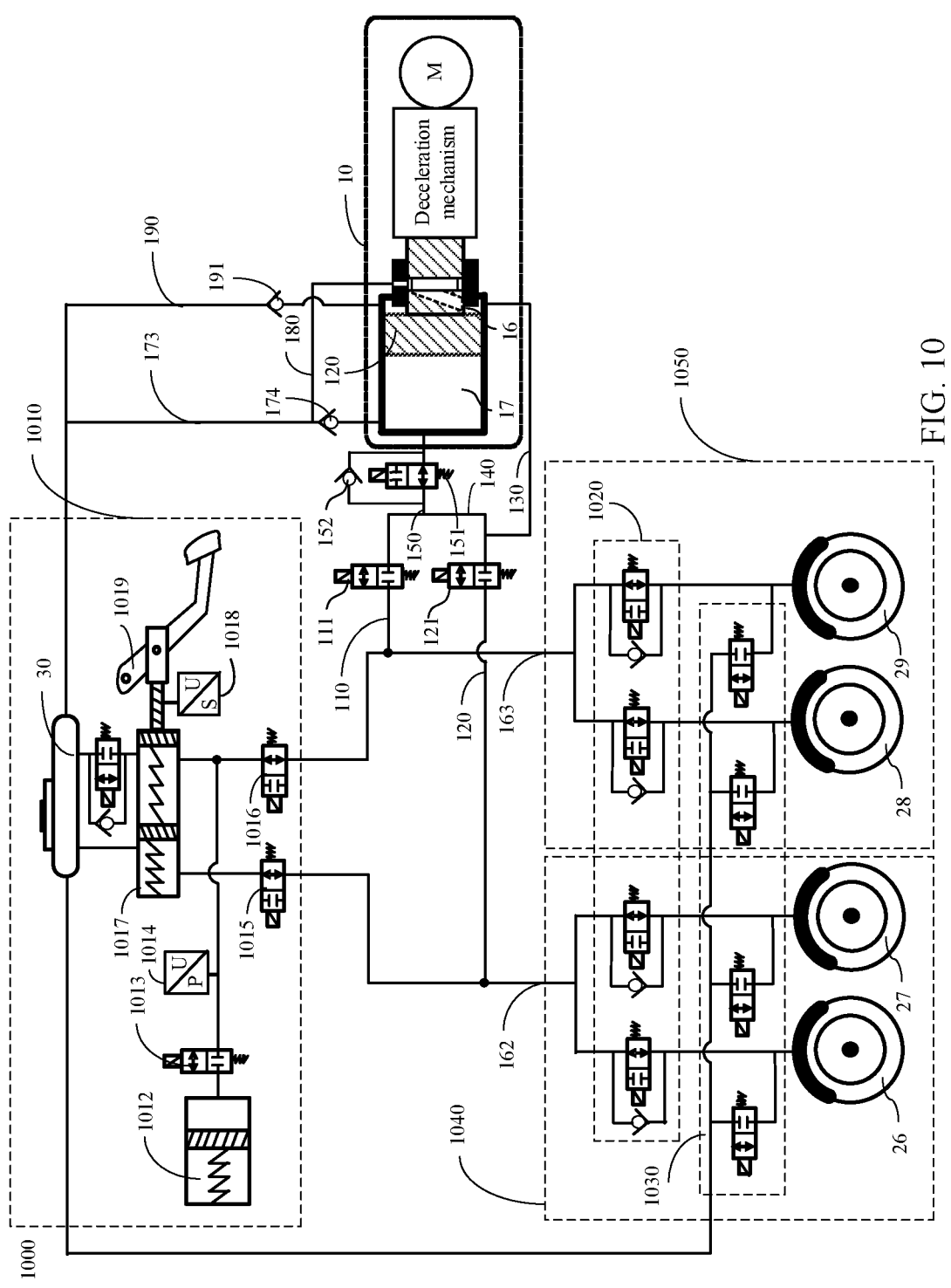
FIG. 10 is a schematic diagram of a braking system according to an embodiment of this application.

The following describes, with reference to FIG. 10, a braking system 1000 formed by combining the hydraulic control unit 500 with the hydraulic control unit 800. FIG. 10 is a schematic diagram of a braking system according to an embodiment of this application. A function implemented by a master cylinder pressurization and control unit 1010 in the braking system 1000 is a manual braking mode and a brake-by-wire mode that need participation of a driver.

With the master cylinder pressurization and control unit 1010, the driver steps on a brake pedal 1019 to cause a brake fluid in a brake master cylinder 1017 to flow into a pedal feel simulator 1012 through a brake line in which a control valve 1013 is located. In the brake-by-wire mode, a control valve 1015 and a control valve 1016 are in an open state, and correspondingly, the hydraulic control apparatus 10 provides a braking force for a dual-circuit braking system based on a pedal stroke detected by a pedal stroke sensor 1018 or pressure of the brake fluid detected by a pressure sensor 1014. In the manual braking mode, the control valve 1015 and the control valve 1016 are in a closed state, and the brake fluid provides a braking force for the wheel cylinders 26, 27, 28, and 29 through a brake line 162 and the brake line 150.

The hydraulic control apparatus 10 may be divided into a forward pressurization process and a reverse pressurization process in a bidirectional pressurization mode.

In the forward pressurization process, the first control valve 111, the second control valve 121, and fluid inlet valves 1020 corresponding to the wheel cylinders 26, 27, 28, and 29 are in a closed state, and the control valve 1015, the control valve 1016, and fluid outlet valves 1030 corresponding to the wheel cylinders 26, 27, 28, and 29, and the third control valve 151 are in an open state.

When the drive apparatus 15 drives the piston 12 to compress a volume of the second hydraulic chamber 17, the brake fluid in the second hydraulic chamber 17 is pressed into a brake line 163 and the brake line 162 respectively through a first brake line 110 and the second brake line 120, pressed into the wheel cylinders 28 and 29 through the brake line 163, and pressed into the wheel cylinders 26 and 27 through the brake line 162.

In a process in which the piston 12 compresses the volume of the second hydraulic chamber 17, a part of the brake fluid may further enter the first hydraulic chamber 16 through the third brake line 130, to replenish the first hydraulic chamber 16. This reduces a driving force for the drive apparatus 15 to drive the piston 12. In addition, the brake fluid in the fluid reservoir 30 may further enter the first hydraulic chamber 16 through the fluid inlet line 2 190, to replenish the first hydraulic chamber 16. This reduces a driving force for the drive apparatus 15 to drive the piston 12.

In the reverse pressurization process, the first control valve 111, the second control valve 121, and fluid inlet valves 1020 corresponding to the wheel cylinders 26, 27, 28, and 29 are in a closed state, and the control valve 1015, the control valve 1016, fluid outlet valves 1030 corresponding to the wheel cylinders 26, 27, 28, and 29, and the third control valve 151 are in an open state.

When the drive apparatus 15 drives the piston 12 to compress a volume of the first hydraulic chamber 16, a part of the brake fluid in the first hydraulic chamber 16 is pressed into the first brake line 110 through the third brake line 130 and the fourth brake line 140 that are connected, and then flows from the first brake line 110 to the brake line 162, to provide a braking force for the second group of wheel cylinders 26 and 27. In a process in which the brake fluid flows through the fourth brake line 140, because the third control valve 151 is in the open state, the brake fluid in the fourth brake line 140 is blocked from flowing into the second hydraulic chamber 17 through the fifth brake line 150. This helps improve efficiency of reverse pressurization.

The other part of the brake fluid in the first hydraulic chamber 16 enters the second brake line 120 through the third brake line 130 and the second brake line 120 that are connected, enters the first brake line 110 through the second control valve 121, and finally provides a braking force for the first group of wheel cylinders 28 and 29 through the brake line 163.

In addition, the brake fluid in the fluid reservoir 30 may further enter the second hydraulic chamber 17 through the fluid inlet line 1 173, to replenish the second hydraulic chamber 17. This reduces pressure of the brake fluid in the second hydraulic chamber 17 and the first hydraulic chamber 16, so as to reduce a driving force for the drive apparatus 15 to drive the piston 12.

In a depressurization process of the hydraulic control apparatus 10, the control valve 1015, the control valve 1016, the fluid inlet valves 1020 corresponding to the wheel cylinders 26, 27, 28, and 29, and the fluid outlet valves 1030 corresponding to the wheel cylinders 26, 27, 28, and 29 are in an open state, and the third control valve 151, the first control valve 111, and the second control valve 121 are in a closed state.

When the drive apparatus 15 drives the piston 12 to compress the volume of the first hydraulic chamber 16, the brake fluid in the wheel cylinders 26, 27, 28 and 29 is pumped into the second hydraulic chamber 17 through the first brake line 110 and the second brake line 120 respectively, and stored in the second hydraulic chamber 17.

After the piston 12 moves to an inner dead center in a piston stroke, the volume of the second hydraulic chamber 17 is the largest. In this case, the second hydraulic chamber 17 cannot accommodate more brake fluid. The remaining brake fluid in the first group of wheel cylinders 28 and 29 may continue to flow to the fourth brake line 140 through the first brake line 110, flow to the third brake line 130 through the fourth brake line 140, flow to the first fluid outlet line 180 through the third brake line 130 and the first hydraulic chamber 16, and finally flow into the fluid reservoir 30 through the first fluid outlet line 180.

Correspondingly, the remaining brake fluid in the second group of wheel cylinders 26 and 27 may flow to the third brake line 130 through the second brake line 120, flow into the second hydraulic chamber 17 through the third brake line 130, and flow into the fluid reservoir 30 through the first fluid outlet line 180.

The following describes redundancy performance of the braking system 1000 in each failure mode with reference to the four failure modes described above.

1. In a leakage failure mode, the braking system 1000 may perform a redundant braking scheme of single-circuit braking based on a hydraulic control apparatus.

It is assumed that a brake circuit 1040 fails, the hydraulic control apparatus 10 may provide a braking force for a brake circuit 1050 through a bidirectional pressurization process.

In this case, the second control valve 121, the control valve 1015, the control valve 1016, and the fluid outlet valves 1030 corresponding to the wheel cylinders 26, 27, 28, and 29 are in an open state, and the third control valve 151 and the first control valve 111 are in a closed state.

It should be noted that, in this case, a closed/open state of the fluid outlet valves 1030 corresponding to the wheel cylinders 28 and 29 does not affect braking performance of the braking system.

In the forward pressurization process, when the drive apparatus 15 drives the piston 12 to compress the volume of the second hydraulic chamber 17, the brake fluid in the second hydraulic chamber 17 is pressed into the brake line 163 through the first brake line 110, and pressed into the wheel cylinders 28 and 29 through the brake line 163. In the second brake line 120, because the second control valve 121 is in the open state, the brake fluid in the second hydraulic chamber 17 cannot pass through the second brake line 120.

In addition, in a process in which the piston 12 compresses the volume of the second hydraulic chamber 17, the volume of the first hydraulic chamber 16 increases, and the brake fluid in the fluid reservoir 30 may enter the first hydraulic chamber 16 through the fluid inlet line 2 190, to replenish the first hydraulic chamber 16. This reduces a driving force for the drive apparatus 15 to drive the piston 12.

In the reverse pressurization process, the third control valve 151 may be controlled to be in an open state. When the drive apparatus 15 drives the piston 12 to compress the volume of the first hydraulic chamber 16, the brake fluid in the first hydraulic chamber 16 is pressed into the brake line 163 through the first brake line 110, to provide a braking force for the first group of wheel cylinders 28 and 29 through the brake line 163. In the second brake line 120, because the second control valve 121 is in the open state, the brake fluid in the first hydraulic chamber 16 cannot flow to the brake line 162 through the second brake line 120.

It is assumed that a brake circuit 1050 fails, the hydraulic control apparatus 10 may provide a braking force for a brake circuit 1040 through a bidirectional pressurization process.

In this case, the first control valve 111, the control valve 1015, the control valve 1016, and the fluid outlet valves 1030 corresponding to the wheel cylinders 26 and 27, 28, and 29 are in an open state, and the third control valve 151 and the second control valve 121 are in a closed state. It should be noted that, in this case, a closed/open state of the fluid outlet valves 1030 corresponding to the wheel cylinders 26 and 27 does not affect braking performance of the braking system.

In the forward pressurization process, the drive apparatus 15 drives the piston 12 to compress the volume of the second hydraulic chamber 17, so as to press the brake fluid in the second hydraulic chamber 17 into the brake line 162 through the second brake line 120, and press the brake fluid into the wheel cylinders 26 and 27 through the brake line 162. In the first brake line 110, because the first control valve 111 is in the open state, the brake fluid in the second hydraulic chamber 17 cannot pass through the first brake line 110.

In addition, in a process in which the piston 12 compresses the volume of the second hydraulic chamber 17, the volume of the first hydraulic chamber 16 increases, and the brake fluid in the fluid reservoir 30 may enter the first hydraulic chamber 16 through the fluid inlet line 2 190, to replenish the first hydraulic chamber 16. This reduces a driving force for the drive apparatus 15 to drive the piston 12. In addition, the volume of the first hydraulic chamber 16 increases, and a part of the brake fluid in the second brake line 120 may further enter the first hydraulic chamber 16 through the third brake line 130, to replenish the first hydraulic chamber 16. This reduces a driving force for the drive apparatus 15 to drive the piston 12.

In the reverse pressurization process, the third control valve 151 may be controlled to be in an open state. When the drive apparatus 15 drives the piston 12 to compress the volume of the first hydraulic chamber 16, the brake fluid in the first hydraulic chamber 16 is pressed into the brake line 163 through the first brake line 110, to provide a braking force for the first group of wheel cylinders 28 and 29 through the brake line 163. In the second brake line 120, because the second control valve 121 is in the open state, the brake fluid in the first hydraulic chamber 16 cannot flow to the brake line 162 through the second brake line 120.

In addition, in a process in which the piston 12 compresses the volume of the first hydraulic chamber 16, the volume of the second hydraulic chamber 17 increases, and the brake fluid in the fluid reservoir 30 may enter the second hydraulic chamber 17 through the fluid inlet line 1 173, to replenish the second hydraulic chamber 17. This reduces a driving force for the drive apparatus 15 to drive the piston 12.

2. In a control valve jamming failure mode, the braking system 1000 may perform a redundant braking scheme of single-circuit braking based on a hydraulic control apparatus.

It is assumed that the third control valve 151 has a jamming failure, the hydraulic control apparatus 10 can still provide a braking force for the brake circuit 1050 and/or the brake circuit 1040 through a bidirectional pressurization process. In this case, in the forward pressurization process, the brake fluid in the second hydraulic chamber 17 may flow to the fourth brake line 140 through the one-way valve 152, and determine, based on a closed/open state of the first control valve 111 and the second control valve 121, whether to provide a braking force for the first group of wheel cylinders 28 and 29 or the second group of wheel cylinders 26 and 27.

Correspondingly, the jamming failure of the third control valve 151 does not affect the reverse pressurization process of the hydraulic control apparatus 10. The reverse pressurization process is described above. For brevity, details are not described herein again.

It is assumed that the first control valve 111 has a jamming failure, and the second control valve 121 works normally, the hydraulic control apparatus 10 can still provide a braking force for the brake circuit 1040 through a bidirectional pressurization process. In this case, the second control valve 121 is controlled to be in a closed state. In the forward pressurization process, the brake fluid in the second hydraulic chamber 17 may flow to the fourth brake line 140 through the one-way valve 152, and flow to the brake line 162 through the second control valve 121, to provide a braking force for the second group of wheel cylinders 26 and 27 through the brake line 162.

Correspondingly, in the reverse pressurization process, the brake fluid in the first hydraulic chamber 16 may flow to the fourth brake line 140 through the third brake line 130, and flow to the brake line 162 through the second control valve 121, to provide a braking force for the second group of wheel cylinders 26 and 27 through the brake line 162.

It is assumed that the second control valve 121 has a jamming failure, and the first control valve 111 works normally, the hydraulic control apparatus 10 can still provide a braking force for the brake circuit 1050 through a bidirectional pressurization process. In this case, the first control valve 111 is controlled to be in the closed state. In the forward pressurization process, the brake fluid in the second hydraulic chamber 17 may flow to the fourth brake line 140 through the one-way valve 152, and flow to the brake line 163 through the first control valve 111, to provide a braking force for the first group of wheel cylinders 28 and 29 through the brake line 163.

Correspondingly, in the reverse pressurization process, the brake fluid in the first hydraulic chamber 16 may flow to the fourth brake line 140 through the third brake line 130, and flow to the brake line 163 through the first control valve 111, to provide a braking force for the first group of wheel cylinders 28 and 29 through the brake line 163.

3. In a control valve closing failure mode, a control valve in the closing failure mode cannot be in an open mode. Therefore, a braking force can only be continuously provided to the braking system through a control valve with a fault.

It is assumed that the first control valve 111 fails to be connected, and the second control valve 121 works normally, the hydraulic control apparatus 10 cannot control the first control valve 111 to be in an open state. Therefore, whether to provide a braking force for the second group of wheel cylinders 26 and 27 can be determined only by controlling the second control valve 121.

It is assumed that the second control valve 121 fails to be connected, and the first control valve 111 works normally, the hydraulic control apparatus 10 cannot control the second control valve 121 to be in the open state. Therefore, whether to provide a braking force for the first group of wheel cylinders 28 and 29 can be determined only by controlling the first control valve 111.

It is assumed that the third control valve 151 fails to be connected, and the first control valve 111 and the second control valve 121 work normally, in a bidirectional pressurization process, the hydraulic control apparatus 10 may determine, based on closing and opening of the first control valve 111 and the second control valve 121, to provide a braking force for the brake circuit 1040 and/or the brake circuit 1050. However, in the reverse pressurization process, because the third control valve 151 fails to be connected, after flowing to the fourth brake line 140, the brake fluid in the first hydraulic chamber 16 flows to the second hydraulic chamber 17 through the fifth brake line. This reduces reverse pressurization efficiency to some extent.

4. In a composite failure mode, the braking system 1000 may perform a redundant braking scheme of single-circuit braking based on a hydraulic control apparatus.

It is assumed that the first control valve 111 or the second control valve 121 is in a closing failure mode, and leakage occurs in a brake circuit corresponding to a control valve in the closing failure mode, the braking system 1000 may brake, in a manual braking mode, a brake circuit that does not leak.

For example, when the first control valve 111 is in the closing failure mode, and leakage occurs in the brake circuit 1050, a control valve 1016 and the second control valve 121 may be controlled to be in an open state, and the control valve 1015 may be controlled to be in a closed state. In this way, the brake fluid in the brake master cylinder 1017 may flow to the second group of wheel cylinders 26 and 27 through the brake line 162.

For another example, when the second control valve 121 is in the closing failure mode, and leakage occurs in the brake circuits 26 and 27, the control valve 1015 and the first control valve 111 may be controlled to be in an open state, and the control valve 1016 may be controlled to be in a closed state. In this way, the brake fluid in the brake master cylinder 1017 may flow to the first group of wheel cylinders 28 and 29 through the brake line 163.

It should be noted that, as long as the first control valve 111 and the second control valve 121 do not have a jamming failure at the same time, the hydraulic control apparatus 10 may depressurize the entire braking system.

Figure 11:
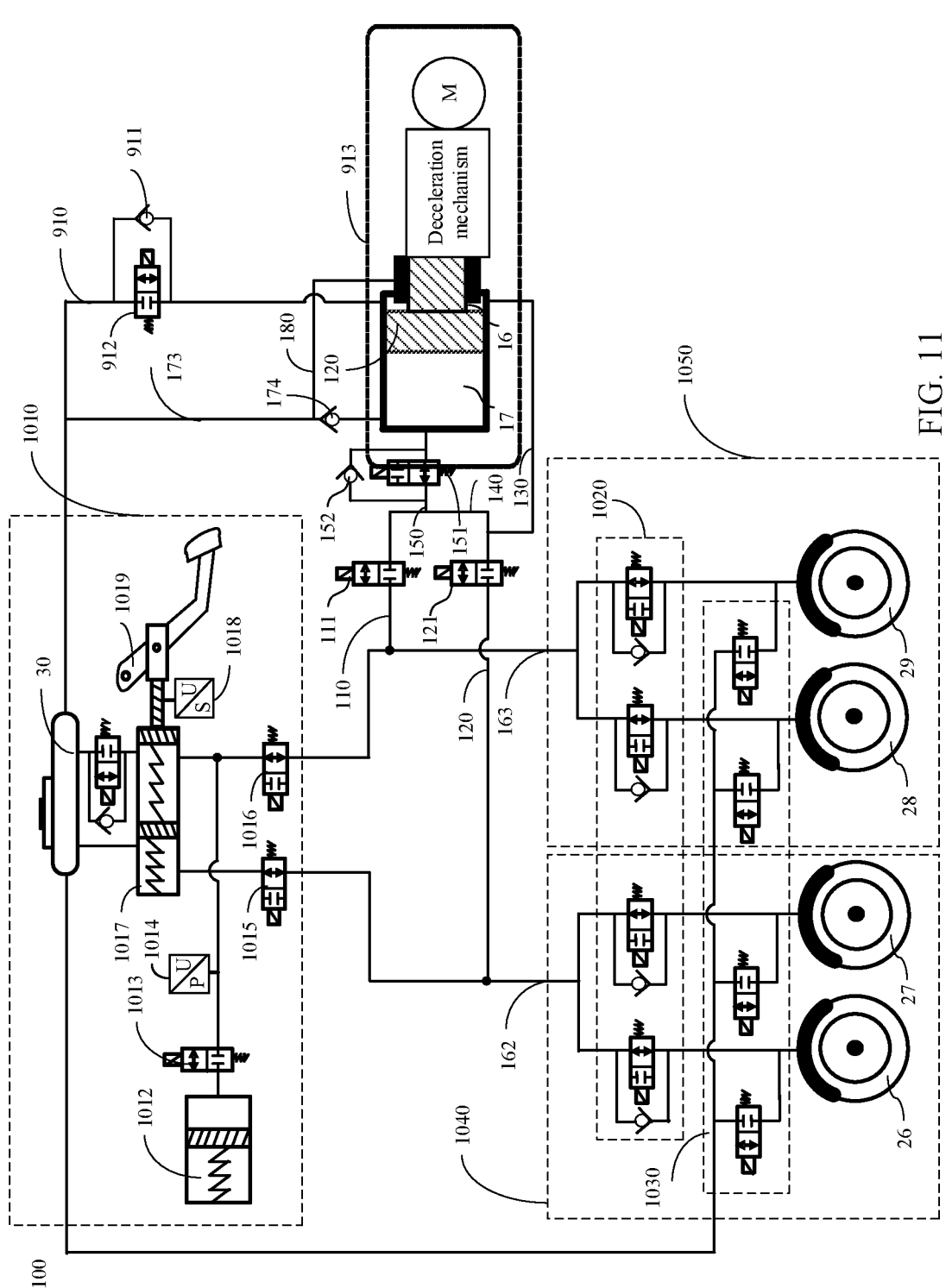
FIG. 11 is a schematic diagram of a braking system according to an embodiment of this application.

The following describes, with reference to FIG. 11, a braking system 1100 formed by combining the hydraulic control unit 500 with the hydraulic control unit 900. FIG. 11 is a schematic diagram of a braking system according to an embodiment of this application. A function implemented by the master cylinder pressurization and control unit 1010 in the braking system 1100 is a manual braking mode and a brake-by-wire mode that need participation of a driver.

With the master cylinder pressurization and control unit 1010, the driver steps on the brake pedal 1019 to cause a brake fluid in the brake master cylinder 1017 to flow into the pedal feel simulator 1012 through a brake line in which the control valve 1013 is located. In the brake-by-wire mode, the control valve 1015 and the control valve 1016 are in an open state, and correspondingly, the hydraulic control apparatus 913 provides a braking force for a dual-circuit braking system based on a pedal stroke detected by the pedal stroke sensor 1018 or pressure of the brake fluid detected by the pressure sensor 1014. In the manual braking mode, the control valve 1015 and the control valve 1016 are in a closed state, and the brake fluid provides a braking force for the wheel cylinders 26, 27, 28, and 29 through the brake line 162 and the brake line 150.

The hydraulic control apparatus 913 may be divided into a forward pressurization process and a reverse pressurization process in a bidirectional pressurization mode.

In a forward pressurization process, the first control valve 111, the second control valve 121, and the fluid inlet valves 1020 corresponding to the wheel cylinders 26, 27, 28, and 29 are in a closed state, and the control valve 1015, the control valve 1016, and the fluid outlet valves 1030 corresponding to the wheel cylinders 26, 27, 28, and 29, and the third control valve 151 are in an open state.

When the drive apparatus 15 drives the piston 12 to compress a volume of the second hydraulic chamber 17, the brake fluid in the second hydraulic chamber 17 is pressed into the brake line 163 and the brake line 162 respectively through the first brake line 110 and the second brake line 120, pressed into the wheel cylinders 28 and 29 through the brake line 163, and pressed into the wheel cylinders 26 and 27 through the brake line 162.

In a process in which the piston 12 compresses the volume of the second hydraulic chamber 17, a part of the brake fluid may further enter the first hydraulic chamber 16 through the third brake line 130, to replenish the first hydraulic chamber 16. This reduces a driving force for the drive apparatus 15 to drive the piston 12. In addition, the brake fluid in the fluid reservoir 30 may further enter the first hydraulic chamber 16 through the fluid inlet line 2 190, to replenish the first hydraulic chamber 16. This reduces a driving force for the drive apparatus 15 to drive the piston 12.

In a reverse pressurization process, the first control valve 111, the second control valve 121, and the fluid inlet valves 1020 corresponding to the wheel cylinders 26, 27, 28, and 29 are in a closed state, and the control valve 1015, the control valve 1016, the fluid outlet valves 1030 corresponding to the wheel cylinders 26, 27, 28, and 29, and the third control valve 151 are in an open state.

When the drive apparatus 15 drives the piston 12 to compress the volume of the first hydraulic chamber 16, a part of the brake fluid in the first hydraulic chamber 16 is pressed into the first brake line 110 through the third brake line 130 and the fourth brake line 140 that are connected, and then flows from the first brake line 110 to the brake line 162, to provide a braking force for the second group of wheel cylinders 26 and 27. In a process in which the brake fluid flows through the fourth brake line 140, because the third control valve 151 is in the open state, the brake fluid in the fourth brake line 140 is blocked from flowing into the second hydraulic chamber 17 through the fifth brake line 150. This helps improve efficiency of reverse pressurization.

The other part of the brake fluid in the first hydraulic chamber 16 enters the second brake line 120 through the third brake line 130 and the second brake line 120 that are connected, enters the first brake line 110 through the second control valve 121, and finally provides a braking force for the first group of wheel cylinders 28 and 29 through brake line 163.

In addition, the brake fluid in the fluid reservoir 30 may further enter the second hydraulic chamber 17 through the fluid inlet line 1 173, to replenish the second hydraulic chamber 17, and reduce pressure of the brake fluid in the second hydraulic chamber 17 and the first hydraulic chamber 16, so as to reduce a driving force for the drive apparatus 15 to drive the piston 12.

In a depressurization process of the hydraulic control apparatus 913, the control valve 1015, the control valve 1016, the fluid inlet valves 1020 corresponding to the wheel cylinders 26, 27, 28, and 29, and the fluid outlet valves 1030 corresponding to the wheel cylinders 26, 27, 28, and 29 are in an open state, and the third control valve 151, the first control valve 111, the control valve 912, and the second control valve 121 are in a closed state.

When the drive apparatus 15 drives the piston 12 to compress the volume of the first hydraulic chamber 16, one part of the brake fluid in the wheel cylinders 26, 27, 28 and 29 is pumped into the second hydraulic chamber 17 through the first brake line 110 and the second brake line 120 respectively, and stored in the second hydraulic chamber 17.

At the same time, after passing through the second brake line 120 or the fourth brake line 140, the other part of the brake fluid in the wheel cylinders 26, 27, 28, and 29 flows to the first hydraulic chamber 16 through the third brake line 130, and flows to the fluid reservoir 30 through the brake line 910.

It should be noted that, in the foregoing depressurization process based on the hydraulic control apparatus 913, because there is a pressure difference between the first hydraulic chamber 16 and the second hydraulic chamber 17, at least a part of the brake fluid stored in the second hydraulic chamber 17 also flows to the first hydraulic chamber 16 through the third brake line 130, and flows to the fluid reservoir 30 through the brake line 910.

The following describes redundancy performance of the braking system 1100 in each failure mode with reference to the four failure modes described above.

1. In a leakage failure mode, the braking system 1100 may perform a redundant braking scheme of single-circuit braking based on a hydraulic control apparatus.

It is assumed that the brake circuit 1040 fails, the hydraulic control apparatus 913 may provide a braking force for the brake circuit 1050 through a bidirectional pressurization process.

In this case, the second control valve 121, the control valve 1015, the control valve 1016, and the fluid outlet valves 1030 corresponding to the wheel cylinders 26, 27, 28, and 29 are in an open state, and the third control valve 151 and the first control valve 111 are in a closed state.

It should be noted that, in this case, a closed/open state of the fluid outlet valves 1030 corresponding to the wheel cylinders 28 and 29 does not affect braking performance of the braking system.

In the forward pressurization process, when the drive apparatus 15 drives the piston 12 to compress the volume of the second hydraulic chamber 17, the brake fluid in the second hydraulic chamber 17 is pressed into the brake line 163 through the first brake line 110, and pressed into the wheel cylinders 28 and 29 through the brake line 163. In the second brake line 120, because the second control valve 121 is in the open state, the brake fluid in the second hydraulic chamber 17 cannot pass through the second brake line 120.

In a process in which the piston 12 compresses the volume of the second hydraulic chamber 17, the volume of the first hydraulic chamber 16 increases, and the brake fluid in the fluid reservoir 30 may enter the first hydraulic chamber 16 through the brake line 910, to replenish the first hydraulic chamber 16. This reduces a driving force for the drive apparatus 15 to drive the piston 12.

In the reverse pressurization process, the third control valve 151 may be controlled to be in an open state. When the drive apparatus 15 drives the piston 12 to compress the volume of the first hydraulic chamber 16, the brake fluid in the first hydraulic chamber 16 is pressed into the brake line 163 through the first brake line 110, to provide a braking force for the first group of wheel cylinders 28 and 29 through the brake line 163. In the second brake line 120, because the second control valve 121 is in the open state, the brake fluid in the first hydraulic chamber 16 cannot flow to the brake line 162 through the second brake line 120.

In addition, in a process in which the piston 12 compresses the volume of the first hydraulic chamber 16, the volume of second hydraulic chamber 17 increases, and the brake fluid in the fluid reservoir 30 may enter the second hydraulic chamber 17 through the fluid inlet line 1 173, to replenish the second hydraulic chamber 17. This reduces a driving force for the drive apparatus 15 to drive the piston 12.

It is assumed that the brake circuit 1050 fails, the hydraulic control apparatus 913 may provide a braking force for the brake circuit 1040 through a bidirectional pressurization process.

In this case, the first control valve 111, the control valve 1015, the control valve 1016, and the fluid outlet valves 1030 corresponding to the wheel cylinders 26, 27, 28, and 29 are in an open state, and the third control valve 151 and the second control valve 121 are in a closed state. It should be noted that, in this case, a closed/open state of the fluid outlet valves 1030 corresponding to the wheel cylinders 26 and 27 does not affect braking performance of the braking system.

In the forward pressurization process, the drive apparatus 15 drives the piston 12 to compress the volume of the second hydraulic chamber 17, so as to press the brake fluid in the second hydraulic chamber 17 into the brake line 162 through the second brake line 120, and press the brake fluid into the wheel cylinders 26 and 27 through the brake line 162. In the first brake line 110, because the first control valve 111 is in the open state, the brake fluid in the second hydraulic chamber 17 cannot pass through the first brake line 110.

In addition, in a process in which the piston 12 compresses the volume of the second hydraulic chamber 17, the volume of the first hydraulic chamber 16 increases, and the brake fluid in the fluid reservoir 30 may enter the first hydraulic chamber 16 through the brake line 910, to replenish the first hydraulic chamber 16. This reduces a driving force for the drive apparatus 15 to drive the piston 12. In addition, the volume of the first hydraulic chamber 16 increases, and a part of the brake fluid in the second brake line 120 may further enter the first hydraulic chamber 16 through the third brake line 130, to replenish the first hydraulic chamber 16. This reduces a driving force for the drive apparatus 15 to drive the piston 12.

In the reverse pressurization process, the third control valve 151 may be controlled to be in an open state. When the drive apparatus 15 drives the piston 12 to compress the volume of the first hydraulic chamber 16, the brake fluid in the first hydraulic chamber 16 is pressed into the second brake line 120 through the third brake line 130, and flows to the brake line 163 through the second brake line 120, to provide a braking force for the first group of wheel cylinders 28 and 29. In the second brake line 120, because the second control valve 121 is in the open state, the brake fluid in the first hydraulic chamber 16 cannot flow to the brake line 162 through the second brake line 120.

In addition, in a process in which the piston 12 compresses the volume of the first hydraulic chamber 16, the volume of second hydraulic chamber 17 increases, and the brake fluid in the fluid reservoir 30 may enter the second hydraulic chamber 17 through the fluid inlet line 1 173, to replenish the second hydraulic chamber 17. This reduces a driving force for the drive apparatus 15 to drive the piston 12.

2. In a control valve jamming failure mode, the braking system 1100 may perform a redundant braking scheme of single-circuit braking based on a hydraulic control apparatus.

It is assumed that the third control valve 151 has a jamming failure, the hydraulic control apparatus 913 can still provide a braking force for the brake circuit 1050 and/or the brake circuit 1040 through a bidirectional pressurization process. In this case, in the forward pressurization process, the brake fluid in the second hydraulic chamber 17 may flow to the fourth brake line 140 through the one-way valve 152, and determine, based on a closed/open state of the first control valve 111 and the second control valve 121, whether to provide a braking force for the first group of wheel cylinders 28 and 29 or the second group of wheel cylinders 26 and 27.

Correspondingly, the jamming failure of the third control valve 151 does not affect the reverse pressurization process of the hydraulic control apparatus 913. The reverse pressurization process is described above. For brevity, details are not described herein again.

It is assumed that the first control valve 111 has a jamming failure, and the second control valve 121 works normally, the hydraulic control apparatus 913 can still provide a braking force for the brake circuit 1040 through a bidirectional pressurization process. In this case, the second control valve 121 is controlled to be in a closed state. In the forward pressurization process, the brake fluid in the second hydraulic chamber 17 may flow to the fourth brake line 140 through the one-way valve 152, and flow to the brake line 162 through the second control valve 121, to provide a braking force for the second group of wheel cylinders 26 and 27 through the brake line 162.

Correspondingly, in the reverse pressurization process, the brake fluid in the first hydraulic chamber 16 may flow to the fourth brake line 140 through the third brake line 130, and flow to the brake line 162 through the second control valve 121, to provide a braking force for the second group of wheel cylinders 26 and 27 through the brake line 162.

It is assumed that the second control valve 121 has a jamming failure, and the first control valve 111 works normally, the hydraulic control apparatus 913 can still provide a braking force for the brake circuit 1050 through a bidirectional pressurization process. In this case, the first control valve 111 is controlled to be in the closed state. In the forward pressurization process, the brake fluid in the second hydraulic chamber 17 may flow to the fourth brake line 140 through the one-way valve 152, and flow to the brake line 163 through the first control valve 111, to provide a braking force for the first group of wheel cylinders 28 and 29 through the brake line 163.

Correspondingly, in the reverse pressurization process, the brake fluid in the first hydraulic chamber 16 may flow to the fourth brake line 140 through the third brake line 130, and flow to the brake line 163 through the first control valve 111, to provide a braking force for the first group of wheel cylinders 28 and 29 through the brake line 163.

3. In a control valve closing failure mode, a control valve in the closing failure mode cannot be in an open mode. Therefore, a braking force can only be continuously provided to the braking system through a control valve with a fault.

It is assumed that the first control valve 111 fails to be connected, and the second control valve 121 works normally, the hydraulic control apparatus 913 cannot control the first control valve 111 to be in an open state. Therefore, whether to provide a braking force for the second group of wheel cylinders 26 and 27 can be determined only by controlling the second control valve 121.

It is assumed that the second control valve 121 fails to be connected, and the first control valve 111 works normally, the hydraulic control apparatus 913 cannot control the second control valve 121 to be in the open state. Therefore, whether to provide a braking force for the first group of wheel cylinders 28 and 29 can be determined only by controlling the first control valve 111.

It is assumed that the third control valve 151 fails to be connected, and the first control valve 111 and the second control valve 121 work normally, in a bidirectional pressurization process, the hydraulic control apparatus 913 may determine, based on closing and opening of the first control valve 111 and the second control valve 121, to provide a braking force for the brake circuit 1040 and/or the brake circuit 1050. However, in the reverse pressurization process, because the third control valve 151 fails to be connected, after flowing to the fourth brake line 140, the brake fluid in the first hydraulic chamber 16 flows to the second hydraulic chamber 17 through the fifth brake line. This reduces reverse pressurization efficiency to some extent.

4. In a composite failure mode, the braking system 1100 may perform a redundant braking scheme of single-circuit braking based on a hydraulic control apparatus.

It is assumed that the first control valve 111 or the second control valve 121 is in a closing failure mode, and leakage occurs in a brake circuit corresponding to the control valve in the closing failure mode, the braking system 1100 may brake, in a manual braking mode, a brake circuit that does not leak.

For example, when the first control valve 111 is in the closing failure mode, and leakage occurs in the brake circuit 1050, the control valve 1016 and the second control valve 121 may be controlled to be in an open state, and the control valve 1015 may be controlled to be in a closed state. In this way, the brake fluid in the brake master cylinder 1017 may flow to the second group of wheel cylinders 26 and 27 through the brake line 162.

For another example, when the second control valve 121 is in the closing failure mode, and leakage occurs in the brake circuits 26 and 27, the control valve 1015 and the first control valve 111 may be controlled to be in an open state, and the control valve 1016 may be controlled to be in a closed state. In this way, the brake fluid in the brake master cylinder 1017 may flow to the first group of wheel cylinders 28 and 29 through the brake line 163.

It should be noted that, as long as the first control valve 111 and the second control valve 121 do not have a jamming failure at the same time, the hydraulic control apparatus 913 may depressurize the entire braking system.

Figure 12:
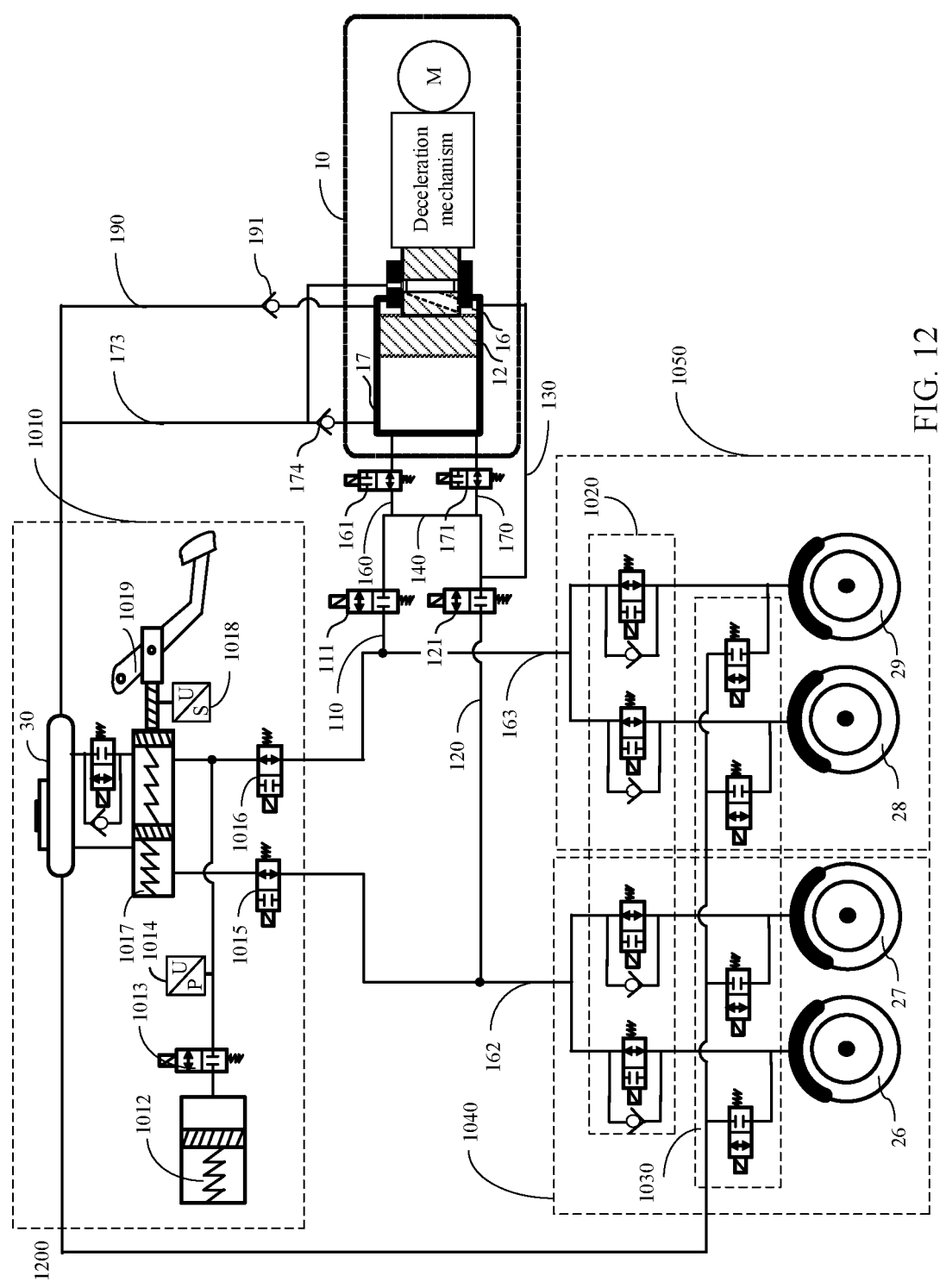
FIG. 12 is a schematic diagram of a braking system according to an embodiment of this application.

The following describes, with reference to FIG. 12, a braking system 1200 formed by combining the hydraulic control unit 600 with the hydraulic control unit 800. FIG. 12 is a schematic diagram of a braking system according to an embodiment of this application. A function implemented by the master cylinder pressurization and control unit 1010 in the braking system 1200 shown in FIG. 12 is the same as a function implemented by the hydraulic control unit 1010 shown in FIG. 10. For brevity, details are not described in the following.

The hydraulic control apparatus 10 may be divided into a forward pressurization process and a reverse pressurization process in a bidirectional pressurization mode.

In the forward pressurization process, the first control valve 111, the second control valve 121, the fourth control valve 161, the fifth control valve 171, and the fluid inlet valves 1120 corresponding to the wheel cylinders 26, 27, 28, and 29 are in a closed state, and the control valve 1015, the control valve 1016, and the fluid outlet valves 1130 corresponding to the wheel cylinders 26, 27, 28, and 29 are in an open state.

When the drive apparatus 15 drives the piston 12 to compress a volume of the second hydraulic chamber 17, the brake fluid in the second hydraulic chamber 17 is pressed into the brake line 163 and the brake line 162 respectively through the first brake line 110 and the second brake line 120, pressed into the wheel cylinders 28 and 29 through the brake line 163, and pressed into the wheel cylinders 26 and 27 through the brake line 162.

In a process in which the piston 12 compresses the volume of the second hydraulic chamber 17, the brake fluid in the fluid reservoir 30 may enter the first hydraulic chamber 16 through the fluid inlet line 2 190, to replenish the first hydraulic chamber 16. This reduces a driving force for the drive apparatus 15 to drive the piston 12. In addition, because the fifth control valve 171 is in an open state, the brake fluid in the second brake line 120 cannot enter the first hydraulic chamber 16 through the third brake line 130.

In the reverse pressurization process, the first control valve 111, the second control valve 121, and the fluid inlet valves 1120 corresponding to the wheel cylinders 26, 27, 28, and 29 are in a closed state, and the control valve 1015, the control valve 1016, the fourth control valve 161, the fifth control valve 171, and the fluid outlet valves 1130 corresponding to the wheel cylinders 26, 27, 28, and 29 are in an open state.

When the drive apparatus 15 drives the piston 12 to compress the volume of the first hydraulic chamber 16, a part of the brake fluid in the first hydraulic chamber 16 is pressed into the brake line 162 through the third brake line 130 and second brake line 120 that are connected, to provide a braking force for the second group of wheel cylinders 26 and 27.

The other part of the brake fluid in the first hydraulic chamber 16 enters the first brake line 110 through the third brake line 130 and the fourth brake line 140 that are connected, and enters the brake line 163 through the first brake line 110, to provide a braking force for the first group of wheel cylinders 28 and 29. Because the fourth control valve 161 and the fifth control valve 171 are in the open state, the brake fluid is blocked from flowing into the second hydraulic chamber 17 through the fifth brake line 150 and the sixth brake line 160.

In addition, the brake fluid in the fluid reservoir 30 may further enter the second hydraulic chamber 17 through the fluid inlet line 2 173, to replenish the second hydraulic chamber 17. This reduces a pressure difference between the brake fluid in the first hydraulic chamber 16 and the brake fluid in the second hydraulic chamber 17, so as to reduce a driving force for the drive apparatus 15 to drive the piston 12.

In the forward depressurization process of the hydraulic control apparatus 10, the control valve 1015, the control valve 1016, the fluid inlet valves 1120 corresponding to the wheel cylinders 26, 27, 28, and 29, and the fluid outlet valves 1130 corresponding to the wheel cylinders 26, 27, 28, and 29 are in an open state, and the first control valve 111, the second control valve 121, the fourth control valve 161, and the fifth control valve 171 are in a closed state.

When the drive apparatus 15 drives the piston 12 to compress the volume of the first hydraulic chamber 16, the brake fluid in the wheel cylinders 26, 27, 28 and 29 is pumped into the second hydraulic chamber 17 through the first brake line 110 and the second brake line 120 respectively, and stored in the second hydraulic chamber 17.

After the piston 12 moves to an inner dead center in a piston stroke, the volume of the second hydraulic chamber 17 is the largest. In this case, the second hydraulic chamber 17 cannot accommodate more brake fluid, and the remaining brake fluid in the wheel cylinders 26, 27, 28, and 29 may continue to flow to the first hydraulic chamber 16 through the third brake line 130. Because the piston 12 moves to the inner dead center in the piston stroke, the brake fluid in the second hydraulic chamber 17 may flow into the fluid reservoir 30 through the first fluid outlet line 180.

The following describes redundancy performance of the braking system 1200 in each failure mode with reference to the four failure modes described above.

1. In a leakage failure mode of a brake circuit, the braking system 1200 may perform a redundant braking scheme of single-circuit braking based on a hydraulic control apparatus.

When the hydraulic control apparatus 10 is in a two-way pressurization mode of single-circuit braking, it is assumed that the brake circuit 1140 fails, the hydraulic control apparatus 10 may provide a braking force for the first group of wheel cylinders 28 and 29 through the brake circuit 1150.

In this case, the second control valve 121, the control valve 1015, the control valve 1016, and the fluid outlet valves 1130 corresponding to the wheel cylinders 26, 27, 28, and 29 are in an open state, and the fourth control valve 161, the fifth control valve 171, the first control valve 111, and the fluid outlet valves 1130 corresponding to the wheel cylinders 28 and 29 are in a closed state.

In the forward pressurization process, when the drive apparatus 15 drives the piston 12 to compress the volume of the second hydraulic chamber 17, one part of the brake fluid in the second hydraulic chamber 17 is pressed into the first brake line 110 through the sixth brake line 160, and then pressed into the brake line 163 through the first brake line 110, to provide a braking force for the first group of wheel cylinders 28 and 29. The other part of the brake fluid in the second hydraulic chamber 17 is pressed into the fourth brake line 140 through the seventh brake line 170, and then enters the first brake line 110 through the fourth brake line 140, so as to provide a braking force for the first group of wheel cylinders 28 and 29 through the brake line 163. In the second brake line 120, because the second control valve 121 is in the open state, the brake fluid in the second hydraulic chamber 17 cannot pass through the second brake line 120.

In addition, in a process in which the piston 12 compresses the volume of the second hydraulic chamber 17, the volume of the first hydraulic chamber 16 increases, and the brake fluid in the fluid reservoir 30 may enter the first hydraulic chamber 16 through the fluid inlet line 2 190, to replenish the first hydraulic chamber 16. This reduces a driving force for the drive apparatus 15 to drive the piston 12.

In the reverse pressurization process, the fourth control valve 161 and the fifth control valve 171 are controlled to be in an open state. When the drive apparatus 15 drives the piston 12 to compress the volume of the first hydraulic chamber 16, one part of the brake fluid in the first hydraulic chamber 16 is pressed into the fourth brake line 140 through the third brake line 130, enters the first brake line 110 through the fourth brake line 140, and then is pressed into the brake line 163 through the first brake line 110, to provide a braking force for the first group of wheel cylinders 28 and 29. Because the fourth control valve 161, the fifth control valve 171, and the second control valve 121 are in the open state, the brake fluid in the first hydraulic chamber 16 cannot pass through second brake line 120.

In addition, in a process in which the piston 12 compresses the volume of the first hydraulic chamber 16, the volume of second hydraulic chamber 17 increases, and the brake fluid in the fluid reservoir 30 may enter the second hydraulic chamber 17 through the fluid inlet line 1 173, to replenish the second hydraulic chamber 17. This reduces a driving force for the drive apparatus 15 to drive the piston 12.

When the hydraulic control apparatus 10 is in a two-way pressurization mode of single-circuit braking, it is assumed that the brake circuit 1150 fails, the hydraulic control apparatus 10 may provide a braking force for the second group of wheel cylinders 26 and 27 through the brake circuit 1140.

In this case, the first control valve 111, the control valve 1015, the control valve 1016, and the fluid outlet valves 1130 corresponding to the wheel cylinders 26, 27, 28, and 29 are in an open state, and the fifth control valve 171, the fourth control valve 161, and the second control valve 121 are in a closed state.

The drive apparatus 15 drives the piston 12 to compress the volume of the second hydraulic chamber 17, so as to press the brake fluid in the second hydraulic chamber 17 into the brake line 162 through the second brake line 120, and press the brake fluid into the wheel cylinders 26 and 27 through the brake line 162. In the first brake line 110, because the first control valve 111 is in the open state, the brake fluid in the second hydraulic chamber 17 cannot pass through the first brake line 110.

In the forward pressurization process, when the drive apparatus 15 drives the piston 12 to compress the volume of the second hydraulic chamber 17, one part of the brake fluid in the second hydraulic chamber 17 is pressed into the second brake line 120 through the seventh brake line 170, and then pressed into the brake line 162 through the second brake line 120, to provide a braking force for the second group of wheel cylinders 26 and 27. The other part of the brake fluid in the second hydraulic chamber 17 is pressed into the fourth brake line 140 through the sixth brake line 160, and then enters the second brake line 120 through the fourth brake line 140, so as to provide a braking force for the second group of wheel cylinders 26 and 27 through the brake line 162. In the first brake line 110, because the first control valve 111 is in the open state, the brake fluid in the second hydraulic chamber 17 cannot pass through the first brake line 110.

In addition, in a process in which the piston 12 compresses the volume of the second hydraulic chamber 17, the volume of the first hydraulic chamber 16 increases, and the brake fluid in the fluid reservoir 30 may enter the first hydraulic chamber 16 through the fluid inlet line 2 190, to replenish the first hydraulic chamber 16. This reduces a driving force for the drive apparatus 15 to drive the piston 12.

In the reverse pressurization process, the fourth control valve 161 and the fifth control valve 171 are controlled to be in an open state. When the drive apparatus 15 drives the piston 12 to compress the volume of the first hydraulic chamber 16, one part of the brake fluid in first hydraulic chamber 16 is pressed into the second brake line 120 through the third brake line 130, and pressed into the brake line 162 through the second brake line 120, to provide a braking force for the second group of wheel cylinders 26 and 27. Because the fourth control valve 161, the fifth control valve 171, and the first control valve 111 are in the open state, the brake fluid in the first hydraulic chamber 16 cannot pass through the first brake line 110.

In addition, in a process in which the piston 12 compresses the volume of the first hydraulic chamber 16, the volume of second hydraulic chamber 17 increases, and the brake fluid in the fluid reservoir 30 may enter the second hydraulic chamber 17 through the fluid inlet line 1 173, to replenish the second hydraulic chamber 17. This reduces a driving force for the drive apparatus 15 to drive the piston 12.

The redundancy scheme of the braking system after leakage failure of a brake circuit in braking system is introduced above. When a leakage failure occurs in one of the first control valve 111, the second control valve 121, the fourth control valve 161, and the fifth control valve 171, a brake circuit in which a control valve without a leakage failure is located may be controlled by manual braking.

For example, when there is a leakage failure in the first control valve 111 and/or the fourth control valve 161, the control valve 1015 may be controlled to be in a closed state, and the control valve 1016 may be controlled to be in an open state. In this case, the brake master cylinder 1017 presses the brake fluid into the brake line 162, to provide a braking force for the second group of wheel cylinders 26 and 27.

For another example, when there is a leakage failure in the second control valve 121 and/or the fifth control valve 171, the control valve 1016 may be controlled to be in a closed state, and the control valve 1015 may be controlled to be in a closed state. In this case, the brake master cylinder 1017 presses the brake fluid into the brake line 163, to provide a braking force for the first group of wheel cylinders 28 and 29.

2. In a control valve jamming failure mode, the braking system 1200 may perform a redundant braking scheme based on a hydraulic control apparatus. It should be noted that, when there is a jamming failure in the fourth control valve 161 or the fifth control valve 171, the hydraulic control apparatus may still provide a braking force for the wheel cylinders 26, 27, 28, and 29 in a bidirectional pressurization mode. When there is a jamming failure in the first control valve 111 or the second control valve 121, the hydraulic control apparatus can provide a single-circuit braking solution for the braking system only through a control valve that works normally.

It is assumed that the fourth control valve 161 has a jamming failure, in the forward pressurization process, one part of the brake fluid in the second hydraulic chamber 17 may flow to the second brake line 120 through the seventh brake line 170, and flow to the brake line 162 through the second brake line 120, to provide a braking force for the second group of wheel cylinders 26 and 27. The other part of the brake fluid in the second hydraulic chamber 17 flows to the fourth brake line 140 through the seventh brake line 170, flows to the first brake line 110 through the fourth brake line 140, and then flows to the brake line 163 through the first brake line 110, to provide a braking force for the first group of wheel cylinders 28 and 29.

In the reverse pressurization process, one part of the brake fluid in the first hydraulic chamber 16 may flow to the second brake line 120 through the third brake line 130, and flow to the brake line 162 through the second brake line 120, to provide a braking force for the second group of wheel cylinders 26 and 27. The other part of the brake fluid in the first hydraulic chamber 16 flows to the fourth brake line 140 through the third brake line 130, flows to the first brake line 110 through the fourth brake line 140, and then flows to the brake line 163 through the first brake line 110, to provide a braking force for the first group of wheel cylinders 28 and 29.

It is assumed that the fifth control valve 171 has a jamming failure, in the forward pressurization process, one part of the brake fluid in the second hydraulic chamber 17 may flow to the first brake line 110 through the sixth brake line 160, and flow to the brake line 163 through the first brake line 110, to provide a braking force for the first group of wheel cylinders 28 and 29. The other part of the brake fluid in the second hydraulic chamber 17 flows to the fourth brake line 140 through the sixth brake line 160, flows to the second brake line 120 through the fourth brake line 140, and then flows to the brake line 162 through the second brake line 120, to provide a braking force for the second group of wheel cylinders 26 and 27.

In the reverse pressurization process, one part of the brake fluid in the first hydraulic chamber 16 may flow to the second brake line 120 through the third brake line 130, and flow to the brake line 162 through the second brake line 120, to provide a braking force for the second group of wheel cylinders 26 and 27. The other part of the brake fluid in the first hydraulic chamber 16 flows to the fourth brake line 140 through the third brake line 130, flows to the first brake line 110 through the fourth brake line 140, and then flows to the brake line 163 through the first brake line 110, to provide a braking force for the first group of wheel cylinders 28 and 29.

It is assumed that the first control valve 111 has a jamming failure, the hydraulic control apparatus 10 can still provide a braking force for the brake circuit 1040 through a bidirectional pressurization process. In the forward pressurization process, one part of the brake fluid in the second hydraulic chamber 17 may flow to the fourth brake line 140 through the sixth brake line 160, flow to the second brake line 120 through the fourth brake line 140, and then flow to the brake line 162 through the second brake line 120, to provide a braking force for the second group of wheel cylinders 26 and 27. The other part of the brake fluid in the second hydraulic chamber 17 flows to the second brake line 120 through the seventh brake line 170, and then flows to the brake line 162 through the second brake line 120, to provide a braking force for the second group of wheel cylinders 26 and 27.

In the reverse pressurization process, the brake fluid in the first hydraulic chamber 16 may flow to the second brake line 120 through the third brake line 130, and flow to the brake line 162 through the second control valve 121, to provide a braking force for the second group of wheel cylinders 26 and 27 through the brake line 162.

It is assumed that the second control valve 121 has a jamming failure, the hydraulic control apparatus 10 can still provide a braking force for the brake circuit 1050 through a bidirectional pressurization process. In the forward pressurization process, one part of the brake fluid in the second hydraulic chamber 17 flows to the fourth brake line 140 through the seventh brake line 170, flows to the first brake line 110 through the fourth brake line 140, and then flows to the brake line 163 through the first brake line 110, to provide a braking force for the first group of wheel cylinders 28 and 29. The other part of the brake fluid in the second hydraulic chamber 17 flows to the first brake line 110 through the sixth brake line 160, and then flows to the brake line 163 through the first brake line 110, to provide a braking force for the first group of wheel cylinders 28 and 29.

In the reverse pressurization process, the brake fluid in the first hydraulic chamber 16 may flow to the fourth brake line 140 through the third brake line 130, and flow to the brake line 163 through the first control valve 111, to provide a braking force for the first group of wheel cylinders 28 and 29 through the brake line 163.

3. In a control valve closing failure mode, the control valve in the closing failure mode is always in a closed state, and does not block flow of the brake fluid. Therefore, when one or more of the first control valve 111, the second control valve 121, the fourth control valve 161, and the fifth control valve 171 fail to be connected, an embodiment of a bidirectional pressurization function or a depressurization function of the hydraulic control apparatus 10 is not affected. However, if there is a closing failure for the fourth control valve 161 and/or the fifth control valve 171, in the reverse pressurization process, because the brake fluid in the first hydraulic chamber 16 may flow to the second hydraulic chamber 17 by using the control valve that fails to be connected, efficiency of the reverse pressurization process may be affected to some extent.

It should be noted that the bidirectional pressurization process and the depressurization process in the closing failure mode of the control valve are similar to the bidirectional pressurization process and the depressurization process in the case that the control valve in the braking system works normally. For brevity, details are not described herein again.

4. In a composite failure mode, the braking system 1200 may perform a redundant braking scheme of single-circuit braking based on a hydraulic control apparatus.

It is assumed that the first control valve 111 or the second control valve 121 is in a closing failure mode, and leakage occurs in a brake circuit corresponding to the control valve in the closing failure mode, the braking system 1200 may brake, in a manual braking mode, a brake circuit that does not leak.

For example, when the first control valve 111 is in the closing failure mode, and leakage occurs in the brake circuit 1050, the control valve 1016 and the second control valve 121 may be controlled to be in an open state, and the control valve 1015 may be controlled to be in a closed state. In this way, the brake fluid in the brake master cylinder 1017 may flow to the second group of wheel cylinders 26 and 27 through the brake line 162.

For another example, when the second control valve 121 is in the closing failure mode, and leakage occurs in the brake circuit 1040, the control valve 1015 and the first control valve 111 may be controlled to be in an open state, and the control valve 1016 may be controlled to be in a closed state. In this way, the brake fluid in the brake master cylinder 1017 may flow to the first group of wheel cylinders 28 and 29 through the brake line 163.

It should be noted that, as long as the first control valve 111 and the second control valve 121 do not have a jamming failure at the same time, the hydraulic control apparatus 10 may depressurize the entire braking system.

Figure 13:
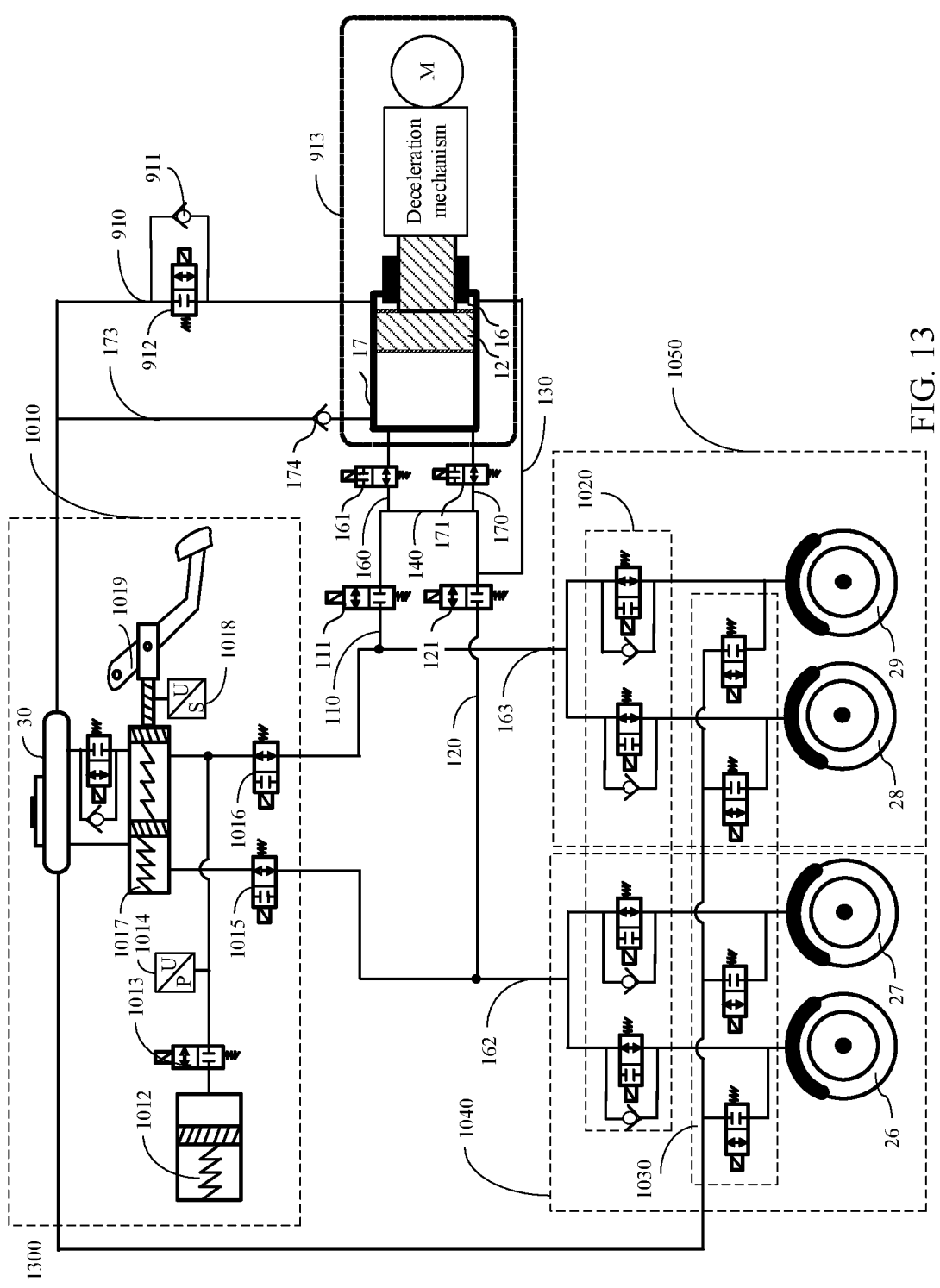
FIG. 13 is a schematic diagram of a braking system according to an embodiment of this application.

The following describes, with reference to FIG. 13, a braking system 1300 formed by combining the hydraulic control unit 600 with the hydraulic control unit 900. FIG. 13 is a schematic diagram of a braking system according to an embodiment of this application. A function implemented by the master cylinder pressurization and control unit 1010 in the braking system 1300 shown in FIG. 13 is the same as a function implemented by the hydraulic control unit 1010 shown in FIG. 10. For brevity, details are not described in the following.

The hydraulic control apparatus 913 may be divided into a forward pressurization process and a reverse pressurization process in a bidirectional pressurization mode.

In the forward pressurization process, the first control valve 111, the second control valve 121, the fourth control valve 161, the fifth control valve 171, and the fluid inlet valves 1120 corresponding to the wheel cylinders 26, 27, 28, and 29 are in a closed state, and the control valve 1015, the control valve 1016, the control valve 912, and the fluid outlet valves 1130 corresponding to the wheel cylinders 26, 27, 28, and 29 are in an open state.

When the drive apparatus 15 drives the piston 12 to compress a volume of the second hydraulic chamber 17, a brake fluid in the second hydraulic chamber 17 is pressed into the brake line 163 and the brake line 162 respectively through the first brake line 110 and the second brake line 120, pressed into the wheel cylinders 28 and 29 through the brake line 163, and pressed into the wheel cylinders 26 and 27 through the brake line 162.

In a process in which the piston 12 compresses the volume of the second hydraulic chamber 17, the brake fluid in the fluid reservoir 30 may enter the first hydraulic chamber 16 through the brake line 910, to replenish the first hydraulic chamber 16. This reduces a driving force for the drive apparatus 15 to drive the piston 12. In addition, because the fifth control valve 131 is in an open state, the brake fluid in the second brake line 120 cannot enter the first hydraulic chamber 16 through the third brake line 130.

In the reverse pressurization process, the first control valve 111, the second control valve 121, and the fluid inlet valves 1120 corresponding to the wheel cylinders 26, 27, 28, and 29 are in a closed state, and the control valve 1015, the control valve 1016, the fourth control valve 161, the fifth control valve 171, and the fluid outlet valves 1130 corresponding to the wheel cylinders 26, 27, 28, and 29 are in an open state.

When the drive apparatus 15 drives the piston 12 to compress a volume of the first hydraulic chamber 16, one part of the brake fluid in the first hydraulic chamber 16 is pressed into the brake line 162 through the third brake line 130 and the second brake line 120 that are connected, to provide a braking force for the second group of wheel cylinders 26 and 27.

The other part of the brake fluid in the first hydraulic chamber 16 enters the first brake line 110 through the third brake line 130 and the fourth brake line 140 that are connected, and enters the brake line 163 through the first brake line 110, to provide a braking force for the first group of wheel cylinders 28 and 29. Because the fourth control valve 161 and the fifth control valve 171 are in the open state, the brake fluid is blocked from flowing into the second hydraulic chamber 17 through the fifth brake line 150 and the sixth brake line 160.

In addition, the brake fluid in the fluid reservoir 30 may further enter the second hydraulic chamber 17 through a brake line 173, to replenish the second hydraulic chamber 17. This reduces a pressure difference between the brake fluid in the first hydraulic chamber 16 and the brake fluid in the second hydraulic chamber 17, so as to reduce a driving force for the drive apparatus 15 to drive the piston 12.

In a depressurization process of the hydraulic control apparatus 913, the control valve 1015, the control valve 1016, the fluid inlet valves 1120 corresponding to the wheel cylinders 26, 27, 28, and 29, and the fluid outlet valves 1130 corresponding to the wheel cylinders 26, 27, 28, and 29 are in an open state, and the first control valve 111, the second control valve 121, the fourth control valve 161, the control valve 912, and the fifth control valve 171 are in a closed state.

When the drive apparatus 15 drives the piston 12 to compress the volume of the first hydraulic chamber 16, the brake fluid in the wheel cylinders 26, 27, 28 and 29 is pumped into the second hydraulic chamber 17 through the first brake line 110 and the second brake line 120 respectively, and stored in the second hydraulic chamber 17.

In the depressurization process of the hydraulic control apparatus 913, the control valve 1015, the control valve 1016, the fluid inlet valves 1020 corresponding to the wheel cylinders 26, 27, 28, and 29, and the fluid outlet valves 1030 corresponding to the wheel cylinders 26, 27, 28, and 29 are in an open state, and the first control valve 111, the control valve 912, the third control valve 151, the fourth control valve 161, and the second control valve 121 are in a closed state.

When the drive apparatus 15 drives the piston 12 to compress the volume of the first hydraulic chamber 16, one part of the brake fluid in the wheel cylinders 26, 27, 28 and 29 is pumped into the second hydraulic chamber 17 through the first brake line 110 and the second brake line 120 respectively, and stored in the second hydraulic chamber 17.

At the same time, after passing through the second brake line 120 or the fourth brake line 140, the other part of the brake fluid in the wheel cylinders 26, 27, 28, and 29 flows to the first hydraulic chamber 16 through the third brake line 130, and flows to the fluid reservoir 30 through the brake line 910.

It should be noted that, in the foregoing depressurization process based on the hydraulic control apparatus 913, because there is a pressure difference between the first hydraulic chamber 16 and the second hydraulic chamber 17, at least a part of the brake fluid stored in the second hydraulic chamber 17 also flows to the first hydraulic chamber 16 through the third brake line 130, and flows to the fluid reservoir 30 through the brake line 910.

The following describes redundancy performance of the braking system 1100 in each failure mode with reference to the four failure modes described above.

1. In a leakage failure mode of a brake circuit, the braking system 1300 may perform a redundant braking scheme of single-circuit braking based on a hydraulic control apparatus.

When the hydraulic control apparatus 913 is in a two-way pressurization mode of single-circuit braking, it is assumed that the brake circuit 1140 fails, the hydraulic control apparatus 913 may provide a braking force for the first group of wheel cylinders 28 and 29 through the brake circuit 1150.

In this case, the second control valve 121, the control valve 1015, the control valve 1016, the control valve 912 and the fluid outlet valves 1130 corresponding to the wheel cylinders 26, 27, 28, and 29 are in an open state, and the fourth control valve 161, the fifth control valve 171, the first control valve 111, and the fluid outlet valves 1130 corresponding to the wheel cylinders 28 and 29 are in a closed state.

In the forward pressurization process, when the drive apparatus 15 drives the piston 12 to compress the volume of the second hydraulic chamber 17, one part of the brake fluid in the second hydraulic chamber 17 is pressed into the first brake line 110 through the sixth brake line 160, and then pressed into the brake line 163 through the first brake line 110, to provide a braking force for the first group of wheel cylinders 28 and 29. The other part of the brake fluid in the second hydraulic chamber 17 is pressed into the fourth brake line 140 through the seventh brake line 170, and then enters the first brake line 110 through the fourth brake line 140, so as to provide a braking force for the first group of wheel cylinders 28 and 29 through the brake line 163. In the second brake line 120, because the second control valve 121 is in the open state, the brake fluid in the second hydraulic chamber 17 cannot pass through the second brake line 120.

In addition, in a process in which the piston 12 compresses the volume of the second hydraulic chamber 17, the volume of the first hydraulic chamber 16 increases, and the brake fluid in the fluid reservoir 30 may enter the first hydraulic chamber 16 through the brake line 910, to replenish the first hydraulic chamber 16. This reduces a driving force for the drive apparatus 15 to drive the piston 12.

In the reverse pressurization process, the fourth control valve 161 and the fifth control valve 171 are controlled to be in an open state. When the drive apparatus 15 drives the piston 12 to compress the volume of the first hydraulic chamber 16, one part of the brake fluid in the first hydraulic chamber 16 is pressed into the fourth brake line 140 through the third brake line 130, enters the first brake line 110 through the fourth brake line 140, and then is pressed into the brake line 163 through the first brake line 110, to provide a braking force for the first group of wheel cylinders 28 and

29. Because the fourth control valve 161, the fifth control valve 171, and the second control valve 121 are in the open state, the brake fluid in the first hydraulic chamber 16 cannot pass through second brake line 120.

In addition, in a process in which the piston 12 compresses the volume of the first hydraulic chamber 16, the volume of second hydraulic chamber 17 increases, and the brake fluid in the fluid reservoir 30 may enter the second hydraulic chamber 17 through the fluid inlet line 1 173, to replenish the second hydraulic chamber 17. This reduces a driving force for the drive apparatus 15 to drive the piston 12.

When the hydraulic control apparatus 913 is in a two-way pressurization mode of single-circuit braking, it is assumed that the brake circuit 1150 fails, the hydraulic control apparatus 913 may provide a braking force for the second group of wheel cylinders 26 and 27 through the brake circuit 1140.

In this case, the first control valve 111, the control valve 1015, the control valve 1016, the control valve 912 and the fluid outlet valves 1130 corresponding to the wheel cylinders 26, 27, 28, and 29 are in an open state, and the fifth control valve 171, the fourth control valve 161, and the second control valve 121 are in a closed state.

The drive apparatus 15 drives the piston 12 to compress the volume of the second hydraulic chamber 17, so as to press the brake fluid in the second hydraulic chamber 17 into the brake line 162 through the second brake line 120, and press the brake fluid into the wheel cylinders 26 and 27 through the brake line 162. In the first brake line 110, because the first control valve 111 is in the open state, the brake fluid in the second hydraulic chamber 17 cannot pass through the first brake line 110.

In the forward pressurization process, when the drive apparatus 15 drives the piston 12 to compress the volume of the second hydraulic chamber 17, one part of the brake fluid in the second hydraulic chamber 17 is pressed into the second brake line 120 through the seventh brake line 170, and then pressed into the brake line 162 through the second brake line 120, to provide a braking force for the second group of wheel cylinders 26 and 27. The other part of the brake fluid in the second hydraulic chamber 17 is pressed into the fourth brake line 140 through the sixth brake line 160, and then enters the second brake line 120 through the fourth brake line 140, so as to provide a braking force for the second group of wheel cylinders 26 and 27 through the brake line 162. In the first brake line 110, because the first control valve 111 is in the open state, the brake fluid in the second hydraulic chamber 17 cannot pass through the first brake line 110.

In addition, in a process in which the piston 12 compresses the volume of the second hydraulic chamber 17, the volume of the first hydraulic chamber 16 increases, and the brake fluid in the fluid reservoir 30 may enter the first hydraulic chamber 16 through the brake line 910, to replenish the first hydraulic chamber 16. This reduces a driving force for the drive apparatus 15 to drive the piston 12.

In the reverse pressurization process, the fourth control valve 161 and the fifth control valve 171 are controlled to be in an open state. When the drive apparatus 15 drives the piston 12 to compress the volume of the first hydraulic chamber 16, one part of the brake fluid in first hydraulic chamber 16 is pressed into the second brake line 120 through the third brake line 130, and pressed into the brake line 162 through the second brake line 120, to provide a braking force for the second group of wheel cylinders 26 and 27. Because the fourth control valve 161, the fifth control valve 171, and the first control valve 111 are in the open state, the brake fluid in the first hydraulic chamber 16 cannot pass through the first brake line 110.

In addition, in a process in which the piston 12 compresses the volume of the first hydraulic chamber 16, the volume of second hydraulic chamber 17 increases, and the brake fluid in the fluid reservoir 30 may enter the second hydraulic chamber 17 through the fluid inlet line 1 173, to replenish the second hydraulic chamber 17. This reduces a driving force for the drive apparatus 15 to drive the piston 12.

The redundancy scheme of the braking system after leakage failure of a brake circuit in braking system is introduced above. When a leakage failure occurs in one of the first control valve 111, the second control valve 121, the fourth control valve 161, and the fifth control valve 171, a brake circuit in which a control valve without a leakage failure is located may be controlled by manual braking.

For example, when there is a leakage failure in the first control valve 111 and/or the fourth control valve 161, the control valve 1015 may be controlled to be in a closed state, and the control valve 1016 may be controlled to be in an open state. In this case, the brake master cylinder 1017 presses the brake fluid into the brake line 162, to provide a braking force for the second group of wheel cylinders 26 and 27.

For another example, when there is a leakage failure in the second control valve 121 and/or the fifth control valve 171, the control valve 1016 may be controlled to be in a closed state, and the control valve 1015 may be controlled to be in a closed state. In this case, the brake master cylinder 1017 presses the brake fluid into the brake line 163, to provide a braking force for the first group of wheel cylinders 28 and 29.

2. In a control valve jamming failure mode, the braking system 1300 may perform a redundant braking scheme based on a hydraulic control apparatus. It should be noted that, when there is a jamming failure in the fourth control valve 161 or the fifth control valve 171, the hydraulic control apparatus may still provide a braking force for the wheel cylinders 26, 27, 28, and 29 in a bidirectional pressurization mode. When there is a jamming failure in the first control valve 111 or the second control valve 121, the hydraulic control apparatus can provide a single-circuit braking solution for the braking system only through a control valve that works normally.

It is assumed that the fourth control valve 161 has a jamming failure, in the forward pressurization process, one part of the brake fluid in the second hydraulic chamber 17 may flow to the second brake line 120 through the seventh brake line 170, and flow to the brake line 162 through the second brake line 120, to provide a braking force for the second group of wheel cylinders 26 and 27. The other part of the brake fluid in the second hydraulic chamber 17 flows to the fourth brake line 140 through the seventh brake line 170, flows to the first brake line 110 through the fourth brake line 140, and then flows to the brake line 163 through the first brake line 110, to provide a braking force for the first group of wheel cylinders 28 and 29.

In the reverse pressurization process, one part of the brake fluid in the first hydraulic chamber 16 may flow to the second brake line 120 through the third brake line 130, and flow to the brake line 162 through the second brake line 120, to provide a braking force for the second group of wheel cylinders 26 and 27. The other part of the brake fluid in the first hydraulic chamber 16 flows to the fourth brake line 140 through the third brake line 130, flows to the first brake line 110 through the fourth brake line 140, and then flows to the brake line 163 through the first brake line 110, to provide a braking force for the first group of wheel cylinders 28 and 29.

It is assumed that the fifth control valve 171 has a jamming failure, in the forward pressurization process, one part of the brake fluid in the second hydraulic chamber 17 may flow to the first brake line 110 through the sixth brake line 160, and flow to the brake line 163 through the first brake line 110, to provide a braking force for the first group of wheel cylinders 28 and 29. The other part of the brake fluid in the second hydraulic chamber 17 flows to the fourth brake line 140 through the sixth brake line 160, flows to the second brake line 120 through the fourth brake line 140, and then flows to the brake line 162 through the second brake line 120, to provide a braking force for the second group of wheel cylinders 26 and 27.

In the reverse pressurization process, one part of the brake fluid in the first hydraulic chamber 16 may flow to the second brake line 120 through the third brake line 130, and flow to the brake line 162 through the second brake line 120, to provide a braking force for the second group of wheel cylinders 26 and 27. The other part of the brake fluid in the first hydraulic chamber 16 flows to the fourth brake line 140 through the third brake line 130, flows to the first brake line 110 through the fourth brake line 140, and then flows to the brake line 163 through the first brake line 110, to provide a braking force for the first group of wheel cylinders 28 and 29.

It is assumed that the first control valve 111 has a jamming failure, the hydraulic control apparatus 913 can still provide a braking force for the brake circuit 1040 through a bidirectional pressurization process. In the forward pressurization process, one part of the brake fluid in the second hydraulic chamber 17 may flow to the fourth brake line 140 through the sixth brake line 160, flow to the second brake line 120 through the fourth brake line 140, and then flow to the brake line 162 through the second brake line 120, to provide a braking force for the second group of wheel cylinders 26 and 27. The other part of the brake fluid in the second hydraulic chamber 17 flows to the second brake line 120 through the seventh brake line 170, and then flows to the brake line 162 through the second brake line 120, to provide a braking force for the second group of wheel cylinders 26 and 27.

In the reverse pressurization process, the brake fluid in the first hydraulic chamber 16 may flow to the second brake line 120 through the third brake line 130, and flow to the brake line 162 through the second control valve 121, to provide a braking force for the second group of wheel cylinders 26 and 27 through the brake line 162.

It is assumed that the second control valve 121 has a jamming failure, the hydraulic control apparatus 913 can still provide a braking force for the brake circuit 1050 through a bidirectional pressurization process. In the forward pressurization process, one part of the brake fluid in the second hydraulic chamber 17 flows to the fourth brake line 140 through the seventh brake line 170, flows to the first brake line 110 through the fourth brake line 140, and then flows to the brake line 163 through the first brake line 110, to provide a braking force for the first group of wheel cylinders 28 and 29. The other part of the brake fluid in the second hydraulic chamber 17 flows to the first brake line 110 through the sixth brake line 160, and then flows to the brake line 163 through the first brake line 110, to provide a braking force for the first group of wheel cylinders 28 and 29.

In the reverse pressurization process, the brake fluid in the first hydraulic chamber 16 may flow to the fourth brake line 140 through the third brake line 130, and flow to the brake line 163 through the first control valve 111, to provide a braking force for the first group of wheel cylinders 28 and 29 through the brake line 163.

3. In a control valve closing failure mode, the control valve in the closing failure mode is always in a closed state, and does not block flow of the brake fluid. Therefore, when one or more of the first control valve 111, the second control valve 121, the fourth control valve 161, and the fifth control valve 171 fail to be connected, an embodiment of a bidirectional pressurization function or a depressurization function of the hydraulic control apparatus 913 is not affected. However, if there is a closing failure for the fourth control valve 161 and/or the fifth control valve 171, in the reverse pressurization process, because the brake fluid in the first hydraulic chamber 16 may flow to the second hydraulic chamber 17 by using the control valve that fails to be connected, efficiency of the reverse pressurization process may be affected to some extent.

It should be noted that the bidirectional pressurization process and the depressurization process in the closing failure mode of the control valve are similar to the bidirectional pressurization process and the depressurization process in the case that the control valve in the braking system works normally. For brevity, details are not described herein again.

4. In a composite failure mode, the braking system 1300 may perform a redundant braking scheme of single-circuit braking based on a hydraulic control apparatus.

It is assumed that the first control valve 111 or the second control valve 121 is in a closing failure mode, and leakage occurs in a brake circuit corresponding to the control valve in the closing failure mode, the braking system 1300 may brake, in a manual braking mode, a brake circuit that does not leak.

For example, when the first control valve 111 is in the closing failure mode, and leakage occurs in the brake circuit 1050, the control valve 1016 and the second control valve 121 may be controlled to be in an open state, and the control valve 1015 may be controlled to be in a closed state. In this way, the brake fluid in the brake master cylinder 1017 may flow to the second group of wheel cylinders 26 and 27 through the brake line 162.

For another example, when the second control valve 121 is in the closing failure mode, and leakage occurs in the brake circuit 1040, the control valve 1015 and the first control valve 111 may be controlled to be in an open state, and the control valve 1016 may be controlled to be in a closed state. In this way, the brake fluid in the brake master cylinder 1017 may flow to the first group of wheel cylinders 28 and 29 through the brake line 163.

It should be noted that, as long as the first control valve 111 and the second control valve 121 do not have a jamming failure at the same time, the hydraulic control apparatus 913 may depressurize the entire braking system.

The foregoing describes the hydraulic control apparatus, the hydraulic control unit, and the braking system in embodiments of this application with reference to FIG. 1 to FIG. 13. The following describes a control method provided in embodiments of this application with reference to FIG. 14. It should be understood that the solution provided in embodiments of this application may be used together with any one of the foregoing hydraulic control units, or the method in this application may be further applied to a braking system including any one of the foregoing hydraulic control units.

Figure 14:
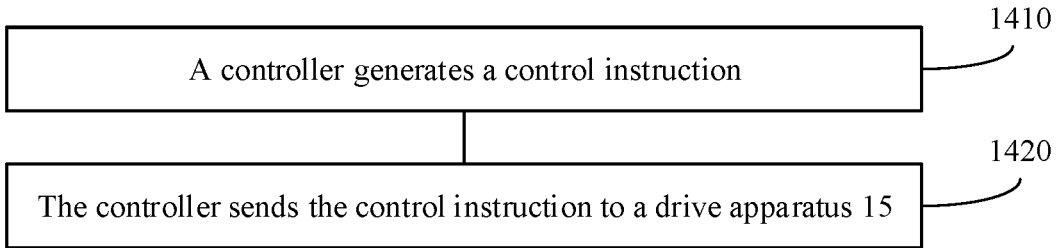
FIG. 14 is a schematic flowchart of a control method according to an embodiment of this application.

FIG. 14 is a schematic flowchart of a control method according to an embodiment of this application. The method shown in FIG. 14 includes operation 1410 and operation 1420.

1410: A controller generates a control instruction, where the control instruction is used to control a drive apparatus 15 in a braking system.

1420: The controller sends the control instruction to the drive apparatus 15, to control the drive apparatus 15 to drive a piston 12 to move along an inner wall of a hydraulic cylinder 11, to increase or decrease pressure of a brake fluid in a first group of wheel cylinders 28 and 29 and/or a second group of wheel cylinders 26 and 27.

In an embodiment, a second hydraulic chamber 17 is connected to a fourth brake line 140 by using a fifth brake line 150. The fifth brake line 150 is provided with a third control valve 151 to control connection and disconnection of the fifth brake line 150. In a process in which the hydraulic control apparatus 10 performs forward pressurization, the third control valve 151 is in a closed state. The foregoing operation 1420 includes: The controller sends a control instruction to the drive apparatus 15, where the control instruction is used to control the drive apparatus 15 to drive the piston 12 to compress a volume of the second hydraulic chamber 17.

In an embodiment, in a process in which the hydraulic control apparatus 10 performs reverse pressurization, the third control valve 151 is in a closed state. The foregoing operation 1420 includes: The controller sends a control instruction to the drive apparatus 15, where the control instruction is used to control the drive apparatus 15 to drive the piston 12 to compress a volume of a first hydraulic chamber 16.

In an embodiment, the third control valve 151 is connected in parallel to a one-way valve 152. The one-way valve 152 allows the brake fluid to flow from the second hydraulic chamber 17 to the fourth brake line 140, and blocks the brake fluid from flowing from the fourth brake line 140 to the second hydraulic chamber 17. The method further includes: in a process in which the one-way valve 152 is faulty and the hydraulic control apparatus 10 performs forward pressurization, the controller controls the third control valve 151 to be in the closed state, so that the second hydraulic chamber 17 provides a braking force for the first group of wheel cylinders 28 and 29 and/or the second group of wheel cylinders 26 and 27 through the fifth brake line 150.

In an embodiment, the second hydraulic chamber 17 is connected to a first brake line 110 through a sixth brake line 160, and a fourth control valve 161 is disposed on the sixth brake line 160 to control connection and disconnection of the sixth brake line 160. The second hydraulic chamber 17 is connected to the second brake line 120 through a seventh brake line 170, and a fifth control valve 171 is disposed on the seventh brake line 170 to control connection and disconnection of the seventh brake line 170. In a process in which the hydraulic control apparatus 10 performs forward pressurization, the first control valve 111, the second control valve 121, the fourth control valve 161, and the fifth control valve 171 are in a closed state. The operation 1420 includes: The controller sends a control instruction to the drive apparatus 15, where the control instruction is used to control the drive apparatus 15 to drive the piston 12 to compress a volume of the second hydraulic chamber 17.

In an embodiment, when the fourth control valve 161 has a jamming fault, the first control valve 111, the second control valve 121, and the fifth control valve 171 are in a closed state. Operation 1420 includes: The controller sends a control instruction to the drive apparatus 15, where the control instruction is used to control the drive apparatus 15 to drive the piston 12 to compress a volume of the second hydraulic chamber 17.

In an embodiment, one part of the brake fluid in the second hydraulic chamber 17 flows to the fourth brake line 140 through the seventh brake line 170, and flows to the first brake line 110 through the fourth brake line 140. The other part of the brake fluid in the second hydraulic chamber 17 flows to the second brake line 120 through the seventh brake line 170.

In an embodiment, if the fifth control valve 171 has a jamming fault, the first control valve 111, the second control valve 121, and the fourth control valve 161 are in a closed state. Operation 1420 includes: The controller sends a control instruction to the drive apparatus 15, where the control instruction is used to control the drive apparatus 15 to drive the piston 12 to compress a volume of the second hydraulic chamber 17.

In an embodiment, one part of the brake fluid in the second hydraulic chamber 17 flows to the fourth brake line 140 through the sixth brake line 160, and flows to the second brake line 120 through the fourth brake line 140. The other part of the brake fluid in the second hydraulic chamber 17 flows to the first brake line 110 through the sixth brake line 160.

In an embodiment, in a process in which the hydraulic control apparatus 10 performs reverse pressurization, the fourth control valve 161 and the fifth control valve 171 are in an open state, and the first control valve 111 and the second control valve 121 are in a closed state. Operation 1420 includes: The controller sends a control instruction to the drive apparatus 15, where the control instruction is used to control the drive apparatus 15 to drive the piston 12 to compress a volume of the first hydraulic chamber 16.

It should be noted that the controller for detecting a fault of the control valve, the controller for controlling a status of the control valve, and the controller for sending a control instruction may be one controller. Alternatively, the controller for detecting a fault of the control valve and the controller for controlling a status of the control valve are one controller, and the controller for sending a control instruction is another controller. In other words, in this application, the foregoing control function may be implemented by one controller, or implemented by a plurality of controllers in collaboration. This is not specifically limited in this embodiment of this application.

The foregoing describes the control method in embodiments of this application with reference to FIG. 14. The following describes, with reference to FIG. 15 and FIG. 16, a control apparatus that performs the foregoing control method in this application. It should be noted that the apparatus in this embodiment of this application may be applied to any hydraulic control unit or braking system described above, to implement one or more operations in the control method described above. For brevity, details are not described herein again.

Figure 15:
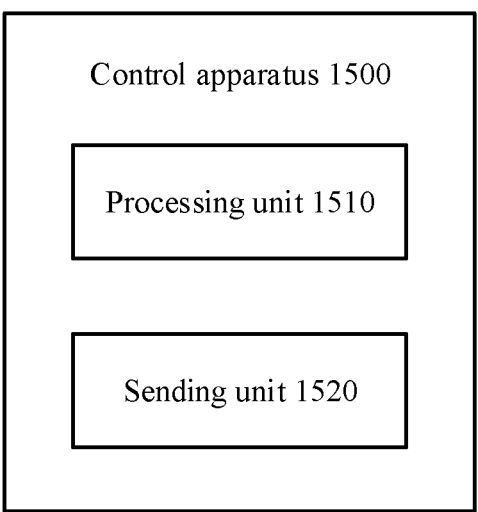
FIG. 15 is a schematic diagram of a control apparatus according to an embodiment of this application.

FIG. 15 is a schematic diagram of a control apparatus according to an embodiment of this application. The control apparatus 1500 shown in FIG. 15 includes a processing unit 1510 and a sending unit 1520.

The processing unit 1510 is configured to generate a control instruction, where the control instruction is used to control a drive apparatus 15.

The sending unit 1520 is configured to send, to the drive apparatus 15, the control instruction generated by the processing unit 1510, to control the drive apparatus 15 to drive a piston 12 to move along an inner wall of a hydraulic cylinder 11, to increase or decrease pressure of a brake fluid in a first group of wheel cylinders 28 and 29 and/or a second group of wheel cylinders 26 and 27.

In an embodiment, a second hydraulic chamber 17 is connected to a fourth brake line 140 by using a fifth brake line 150. The fifth brake line 150 is provided with a third control valve 151 to control connection and disconnection of the fifth brake line 150. In a process in which the hydraulic control apparatus 10 performs forward pressurization, the third control valve 151 is in a closed state. The sending unit 1520 is further configured to: send a control instruction to the drive apparatus 15, where the control instruction is used to control the drive apparatus 15 to drive the piston 12 to compress a volume of the second hydraulic chamber 17.

In an embodiment, in a process in which the hydraulic control apparatus 10 performs reverse pressurization, the third control valve 151 is in a closed state. The sending unit 1520 is further configured to: send, by a controller, a control instruction to the drive apparatus 15, where the control instruction is used to control the drive apparatus 15 to drive the piston 12 to compress a volume of a first hydraulic chamber 16.

In an embodiment, the third control valve 151 is connected in parallel to a one-way valve 152. The one-way valve 152 allows the brake fluid to flow from the second hydraulic chamber 17 to the fourth brake line 140, and blocks the brake fluid from flowing from the fourth brake line 140 to the second hydraulic chamber 17. The processing unit 1510 is further configured to: in a process in which the one-way valve 152 is faulty and the hydraulic control apparatus 10 performs forward pressurization, control the third control valve 151 to be in the closed state, so that the second hydraulic chamber 17 provides a braking force for the first group of wheel cylinders 28 and 29 and/or the second group of wheel cylinders 26 and 27 through the fifth brake line 150.

In an embodiment, the second hydraulic chamber 17 is connected to a first brake line 110 through a sixth brake line 160, and a fourth control valve 161 is disposed on the sixth brake line 160 to control connection and disconnection of the sixth brake line 160. The second hydraulic chamber 17 is connected to the second brake line 120 through a seventh brake line 170, and a fifth control valve 171 is disposed on the seventh brake line 170 to control connection and disconnection of the seventh brake line 170. In a process in which the hydraulic control apparatus 10 performs forward pressurization, the first control valve 111, the second control valve 121, the fourth control valve 161, and the fifth control valve 171 are in a closed state. The sending unit 1520 is further configured to: send a control instruction to the drive apparatus 15, where the control instruction is used to control the drive apparatus 15 to drive the piston 12 to compress a volume of the second hydraulic chamber 17.

In an embodiment, when the fourth control valve 161 has a jamming fault, the first control valve 111, the second control valve 121, and the fifth control valve 171 are in a closed state. The sending unit 1520 further configured to: send a control instruction to the drive apparatus 15, where the control instruction is used to control the drive apparatus 15 to drive the piston 12 to compress a volume of the second hydraulic chamber 17.

In an embodiment, one part of the brake fluid in the second hydraulic chamber 17 flows to the fourth brake line 140 through the seventh brake line 170, and flows to the first brake line 110 through the fourth brake line 140. The other part of the brake fluid in the second hydraulic chamber 17 flows to the second brake line 120 through the seventh brake line 170.

In an embodiment, if the fifth control valve 171 has a jamming fault, the first control valve 111, the second control valve 121, and the fourth control valve 161 are in a closed state. The sending unit 1520 further configured to: send a control instruction to the drive apparatus 15, where the control instruction is used to control the drive apparatus 15 to drive the piston 12 to compress a volume of the second hydraulic chamber 17.

In an embodiment, one part of the brake fluid in the second hydraulic chamber 17 flows to the fourth brake line 140 through the sixth brake line 160, and flows to the second brake line 120 through the fourth brake line 140. The other part of the brake fluid in the second hydraulic chamber 17 flows to the first brake line 110 through the sixth brake line 160.

In an embodiment, in a process in which the hydraulic control apparatus 10 performs reverse pressurization, the fourth control valve 161 and the fifth control valve 171 are in an open state, and the first control valve 111 and the second control valve 121 are in a closed state. The sending unit 1520 is further configured to: send a control instruction to the drive apparatus 15, where the control instruction is used to control the drive apparatus 15 to drive the piston 12 to compress a volume of the first hydraulic chamber 16.

Figure 16:
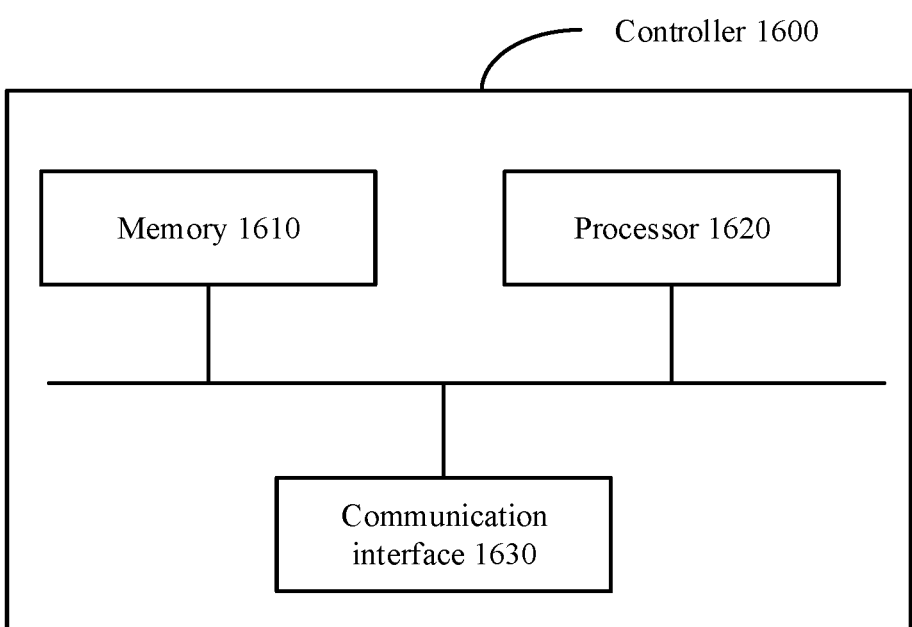
FIG. 16 is a schematic block diagram of a controller according to another embodiment of this application.

In an optional embodiment, the processing unit 1510 may be a processor 1620, the sending unit 1520 may be a communication interface 1630, and a structure of the controller is shown in FIG. 16.

FIG. 16 is a schematic block diagram of a controller according to another embodiment of this application. The controller 1600 shown in FIG. 16 may include a memory 1610, a processor 1620, and a communication interface 1630. The memory 1610, the processor 1620, and the communication interface 1630 are connected by using an internal connection path. The memory 1610 is configured to store instructions. The processor 1620 is configured to execute the instructions stored in the memory 1610, to control the communication interface 1630 to receive/send information. In some embodiments, the memory 1610 may be coupled to the processor 1620 through an interface, or may be integrated with the processor 1620.

It should be noted that, the communication interface 1630 uses an apparatus such as but not limited to an input/output interface (input/output interface), to implement communication between the controller 1600 and another device or a communication network.

In an example process, the operations in the foregoing method can be implemented by using an integrated logic circuit of hardware in the processor 1620, or by using instructions in a form of software. The method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1610, and the processor 1620 reads information in the memory 1610 and completes the operations in the foregoing method in combination with hardware in the processor 1620. To avoid repetition, details are not described herein again.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It should also be understood that in embodiments of this application, the memory may include a read-only memory and a random access memory, and provide an instruction and data to the processor. A part of the processor may further include a non-volatile random access memory. For example, the processor may further store information of a device type.

It should be noted that, a "fluid outlet line" and a "fluid inlet line" mentioned in this application may correspond to different brake lines, or may correspond to a same brake line. The "fluid outlet line" and the "fluid inlet line" are distinguished only based on functions of the brake lines in a braking system. For example, when the "fluid outlet line" and the "fluid inlet line" correspond to a same brake line 1, it may be understood that the brake line 1 in the braking system is used to deliver a brake fluid in a wheel cylinder to a fluid reservoir in a process of depressurizing wheels of an automobile. The brake line 1 may be referred to as a "fluid outlet line". In a process of pressurizing the wheels of the automobile, the brake line 1 is used to provide the brake fluid for the wheels of the automobile, to provide a braking force for the wheels of the automobile. In this case, the first brake line may be referred to as a "fluid inlet line".

In addition, the "fluid inlet valve", the "fluid outlet valve", and a "pressure equalizing valve" used in this application are distinguished only based on functions of the control valves in the braking system. A control valve used to control connection or disconnection of the fluid inlet line may be referred to as a "fluid inlet valve" or a "pressurization valve". A controller configured to control connection or disconnection of a fluid return line may be referred to as a "fluid outlet valve" or a "depressurization valve". A control valve used to isolate a two-stage braking subsystem may be referred to as an "isolation valve". The control valve may be a valve commonly used in an existing braking system, for example, a solenoid valve. This is not specifically limited in embodiments of this application.

In addition, after the control valve is connected to the brake line, a connection port between the control valve and the brake line may be indicated by a first end and a second end, and a flow direction of the brake fluid between the first end and the second end is not limited in this application. For example, the brake fluid may flow from the first end of the control valve to the second end of the control valve when the control valve is in a closed state, or the brake fluid may flow from the second end of the control valve to the first end of the control valve when the control valve is in an open state.

In addition, the "first brake line 110", the "second brake line 120", the "third brake line 130", the "fourth fluid inlet line 140", other brake lines, and the like in this application may be understood as one or more brake lines that implement a function. For example, a first fluid inlet line 130 is a multi-section brake line used to connect a brake master cylinder 3 and a wheel cylinder 151 of a first group of wheels.

In addition, when this application describes an architecture such as a braking system and an automobile with reference to the accompanying drawings, the accompanying drawings schematically show two operating states (open or closed) that each control valve can implement, and do not limit a current operating state of the control valve to that shown in the drawings.

In addition, when this application describes an architecture such as a hydraulic control unit, a braking system, and an automobile with reference to the accompanying drawings, components having a same function in the accompanying drawings corresponding to the embodiments use the same number. For brevity, functions of the components are not described in each embodiment, refer to the description of the functions of the components in the entire text.

In addition, the hydraulic control unit in this application may be a unit configured to adjust brake fluid pressure in the braking system, and includes one or more brake lines described above, and elements such as a control valve and a one-way valve in the brake line. In some embodiments, the hydraulic control unit may further include components such as a hydraulic cylinder, a piston, and an actuator in the hydraulic control apparatus. After the hydraulic control unit is mounted in the braking system, the braking system may include components such as a hydraulic control unit, a wheel cylinder, a fluid reservoir, and a brake pedal.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A hydraulic control unit, comprising a hydraulic control apparatus with a bidirectional pressurization function, wherein the hydraulic control apparatus comprises a first hydraulic chamber and a second hydraulic chamber, wherein the second hydraulic chamber is connected to a first end of a first control valve in a first brake line and is connected to a first end of a second control valve in a second brake line, wherein a first part of a brake fluid in the second hydraulic chamber is configured to flow to a fourth brake line through a seventh brake line, and to flow to the first brake line through the fourth brake line, and wherein a second part of the brake fluid in the second hydraulic chamber is configured to flow to the second brake line through the seventh brake line, wherein the first brake line is configured to provide a first braking force for a first group of wheel cylinders, and the second brake line is configured to provide a second braking force for a second group of wheel cylinders, wherein the first control valve is configured to control a first connected/disconnected state of the first brake line, the second control valve is configured to control a second connected/disconnected state of the second brake line, and the first end of the first control valve is connected to the first end of the second control valve through the fourth brake line, wherein the first hydraulic chamber is connected to the fourth brake line through a third brake line, wherein the first hydraulic chamber and the second hydraulic chamber are formed by separating a hydraulic cylinder of the hydraulic control apparatus by a piston in the hydraulic control apparatus, and wherein the hydraulic control unit further comprises:

an actuator support disposed at an end of the first hydraulic chamber, wherein the actuator support is configured to support an actuator, and the actuator is configured to push the piston to move along a piston stroke in the hydraulic cylinder, a first hydraulic control port disposed on the actuator support, a second hydraulic control port disposed on the actuator, wherein a first end of the second hydraulic control port is connected to the first hydraulic chamber, and a first guide groove with a particular length disposed along an outer periphery of the actuator.

2. The hydraulic control unit according to claim 1, wherein the first hydraulic chamber is connected to the second brake line through the third brake line, and wherein a connection between the third brake line and the second brake line is connected to the first end of the second control valve, and the connection is connected to the fourth brake line.

3. The hydraulic control unit according to claim 1, wherein the first control valve is configured to control the first hydraulic chamber to provide a third braking force for the second group of wheel cylinders through the third brake line and the second brake line that are connected, and wherein the second control valve is configured to control the first hydraulic chamber to provide a fourth braking force for the first group of wheel cylinders through the third brake line and the fourth brake line that are connected.

4. The hydraulic control unit according to claim 1, wherein the second hydraulic chamber is connected to the fourth brake line through a fifth brake line, and a third control valve is disposed on the fifth brake line to control connection and disconnection of the fifth brake line.

5. The hydraulic control unit according to claim 4, wherein the third control valve is connected in parallel to a one-way valve, the one-way valve is configured to allow the brake fluid to flow from the second hydraulic chamber to the fourth brake line, and to block the brake fluid from flowing from the fourth brake line to the second hydraulic chamber.

6. The hydraulic control unit according to claim 1, wherein the second hydraulic chamber is connected to the first brake line through a sixth brake line, and a fourth control valve is disposed on the sixth brake line to control connection and disconnection of the sixth brake line, and wherein the second hydraulic chamber is connected to the second brake line through the seventh brake line, and a fifth control valve is disposed on the seventh brake line to control connection and disconnection of the seventh brake line.

7. The hydraulic control unit according to claim 1, wherein when the piston is located at an inner dead center in the piston stroke, the first hydraulic control port is connected to a second end of the second hydraulic control port; or when the piston is located at a position other than the inner dead center in the piston stroke, the first hydraulic control port is not connected to the second end of the second hydraulic control port.

8. The hydraulic control unit according to claim 7, wherein the first hydraulic control port is connected to a first fluid outlet line, and when the piston is at the inner dead center in the piston stroke, the first fluid outlet line is configured to discharge a brake fluid in the first hydraulic chamber.

9. A braking system, comprising:

a first group of wheel cylinders;

a second group of wheel cylinders; and a hydraulic control unit, the hydraulic control unit comprising a hydraulic control apparatus with a bidirectional pressurization function, wherein the hydraulic control apparatus comprises a first hydraulic chamber and a second hydraulic chamber, wherein the second hydraulic chamber is connected to a first end of a first control valve in a first brake line and is connected to a first end of a second control valve in a second brake line, wherein a first part of a brake fluid in the second hydraulic chamber is configured to flow to a fourth brake line through a seventh brake line, and to flow to the first brake line through the fourth brake line, and wherein a second part of the brake fluid in the second hydraulic chamber is configured to flow to the second brake line through the seventh brake line, wherein the first control valve is configured to control a first connected/disconnected state of the first brake line, the second control valve is configured to control a second connected/disconnected state of the second brake line, and the first end of the first control valve is connected to the first end of the second control valve through the fourth brake line, wherein the first hydraulic chamber is connected to the fourth brake line through a third brake line, wherein the hydraulic control unit is configured to provide a braking force for the first group of wheel cylinders and/or the second group of wheel cylinders, wherein the first hydraulic chamber and the second hydraulic chamber are formed by separating a hydraulic cylinder of the hydraulic control apparatus by a piston in the hydraulic control apparatus, and wherein the hydraulic control unit further comprises:

an actuator support disposed at an end of the first hydraulic chamber, wherein the actuator support is configured to support an actuator, and the actuator is configured to push the piston to move along a piston stroke in the hydraulic cylinder, a first hydraulic control port disposed on the actuator support, a second hydraulic control port disposed on the actuator, wherein a first end of the second hydraulic control port is connected to the first hydraulic chamber, and a first guide groove with a particular length disposed along an outer periphery of the actuator.

10. The braking system according to claim 9, wherein the braking system further comprises a drive apparatus; and wherein the drive apparatus is configured to drive a piston in the hydraulic control apparatus to move along an inner wall of a hydraulic cylinder of the hydraulic control apparatus to form a piston stroke.

11. The braking system according to claim 10, wherein a first hydraulic control port is connected to a first fluid outlet line, and when the piston is at an inner dead center in the piston stroke, the brake fluid in the first group of wheel cylinders and/or the second group of wheel cylinders is configured to flow to the first fluid outlet line through the first hydraulic control port and a second end of a second hydraulic control port that are connected, and to discharge to a fluid reservoir through the first fluid outlet line.

12. A control method for a braking system, wherein the braking system comprises a hydraulic control apparatus with a bidirectional pressurization function, the hydraulic control apparatus comprises a piston, a hydraulic cylinder, and an actuator, and the piston separates the hydraulic cylinder into a first hydraulic chamber and a second hydraulic chamber, wherein the second hydraulic chamber is connected to a first end of a first control valve in a first brake line, and is connected to a first end of a second control valve in a second brake line; a first part of a brake fluid in the second hydraulic chamber is configured to flow to a fourth brake line through a seventh brake line, and to flow to the first brake line through the fourth brake line; a second part of the brake fluid in the second hydraulic chamber is configured to flow to the second brake line through the seventh brake line; the first brake line is configured to provide a first braking force for a first group of wheel cylinders, and the second brake line is configured to provide a second braking force for a second group of wheel cylinders; the first control valve is configured to control a first connected/disconnected state of the first brake line, the second control valve is configured to control a second connected/disconnected state of the second brake line, and the first end of the first control valve is connected to the first end of the second control valve through the fourth brake line, wherein the first hydraulic chamber is connected to the fourth brake line through a third brake line, and wherein the control method comprises:

generating, by a controller, a control instruction, wherein the control instruction is used to control a drive apparatus in the braking system;

sending, by the controller, the control instruction to the drive apparatus, to control the drive apparatus to drive the piston to move along an inner wall of the hydraulic cylinder, to increase or decrease pressure of the brake fluid in the first group of wheel cylinders and/or the second group of wheel cylinders, wherein the first hydraulic chamber and the second hydraulic chamber are formed by separating a hydraulic cylinder of the hydraulic control apparatus by a piston in the hydraulic control apparatus, an actuator support is disposed at an end of the first hydraulic chamber, the actuator support is configured to support the actuator, the actuator configured to push the piston to move along a piston stroke in the hydraulic cylinder, a first hydraulic control port is disposed on the actuator support, a second hydraulic control port is disposed on the actuator, a first end of the second hydraulic control port is connected to the first hydraulic chamber, and a first guide groove with a particular length is disposed along an outer periphery of the actuator.

13. The method according to claim 12, wherein the second hydraulic chamber is connected to the fourth brake line through a fifth brake line, and the fifth brake line is provided with a third control valve to control connection and disconnection of the fifth brake line, and wherein the sending, by the controller, the control instruction to the drive apparatus comprises:

in a process in which the hydraulic control apparatus performs forward pressurization, and when the third control valve is in a closed state, sending, by the controller, the control instruction to the drive apparatus wherein the control instruction is used to control the drive apparatus to drive the piston to compress a volume of the second hydraulic chamber.

14. The method according to claim 13, wherein the sending, by the controller, the control instruction to the drive apparatus comprises:

in a process in which the hydraulic control apparatus performs reverse pressurization, and when the third control valve is in an open state, sending, by the controller, the control instruction to the drive apparatus, wherein the control instruction is used to control the drive apparatus to drive the piston to compress a volume of the first hydraulic chamber.

15. The method according to claim 13, wherein the third control valve is connected in parallel to a one-way valve, the one-way valve is configured to allow the brake fluid to flow from the second hydraulic chamber to the fourth brake line, and to block the brake fluid from flowing from the fourth brake line to the second hydraulic chamber, and wherein the method further comprises:

in a process in which the one-way valve is faulty and the hydraulic control apparatus performs the forward pressurization, controlling, by the controller, the third control valve to be in the closed state, so that the second hydraulic chamber provides a third braking force for the first group of wheel cylinders and/or the second group of wheel cylinders through the fifth brake line.

16. The method according to claim 12, wherein the second hydraulic chamber is connected to the first brake line through a sixth brake line, and a fourth control valve is disposed on the sixth brake line to control connection and disconnection of the sixth brake line, wherein the second hydraulic chamber is connected to the second brake line through the seventh brake line, and a fifth control valve is disposed on the seventh brake line to control connection and disconnection of the seventh brake line, wherein, in a process in which the hydraulic control apparatus performs forward pressurization, the first control valve, the second control valve, the fourth control valve, and the fifth control valve are in a closed state, and wherein the sending, by the controller, the control instruction to the drive apparatus comprises:

sending, by the controller, the control instruction to the drive apparatus, wherein the control instruction is used to control the drive apparatus to drive the piston to compress a volume of the second hydraulic chamber.

17. The method according to claim 16, wherein, when the fourth control valve has a jamming fault, the first control valve, the second control valve, and the fifth control valve are in an open state, and wherein the sending, by the controller, the control instruction to the drive apparatus comprises:

sending, by the controller, the control instruction to the drive apparatus, wherein the control instruction is used to control the drive apparatus to drive the piston to compress the volume of the second hydraulic chamber.

18. The method according to claim 16, wherein, when the fifth control valve has a jamming fault, the first control valve, the second control valve, and the fourth control valve are in an open state, and wherein the sending, by the controller, the control instruction to the drive apparatus comprises:

sending, by the controller, the control instruction to the drive apparatus, wherein the control instruction is used to control the drive apparatus to drive the piston to compress the volume of the second hydraulic chamber.

19. The method according to claim 18, wherein a first part of the brake fluid in the second hydraulic chamber is configured to flow to the fourth brake line through the sixth brake line, and to flow to the second brake line through the fourth brake line, and wherein a second part of the brake fluid in the second hydraulic chamber is configured to flow to the first brake line through the sixth brake line.

* * * * *